US 8,466,826 B2

(12) United States Patent
Charland

(10) Patent No.: US 8,466,826 B2
(45) Date of Patent: *Jun. 18, 2013

(54) METHOD AND DEVICE FOR ESTIMATION OF THE TRANSMISSION CHARACTERISTICS OF A RADIO FREQUENCY SYSTEM

(75) Inventor: Shawn Charland, Ottawa (CA)

(73) Assignee: Sky Industries Inc., Ottawa, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/471,808

(22) Filed: May 15, 2012

(65) Prior Publication Data

US 2012/0225619 A1 Sep. 6, 2012

Related U.S. Application Data

(63) Continuation of application No. 12/044,351, filed on Mar. 7, 2008, now Pat. No. 8,184,036.

(60) Provisional application No. 60/917,368, filed on May 11, 2007.

(51) Int. Cl.
*G01S 7/36* (2006.01)

(52) U.S. Cl.
USPC .......................................................... 342/14

(58) Field of Classification Search
USPC .................................................... 342/13–20
See application file for complete search history.

(56) References Cited

U.S. PATENT DOCUMENTS

| 3,035,229 | A | 5/1962 | Guderian |
| 4,176,357 | A | 11/1979 | Fales, III |
| 4,194,205 | A | 3/1980 | Willmore et al. |
| 4,581,767 | A | 4/1986 | Monsen |
| 5,287,110 | A | 2/1994 | Tran |
| 6,411,946 | B1 | 6/2002 | Chaudhuri |
| 6,792,383 | B2 | 9/2004 | Brouillard et al. |

(Continued)

FOREIGN PATENT DOCUMENTS

| EP | 0465737 | 1/1992 |
| EP | 1014599 | 6/2000 |

(Continued)

OTHER PUBLICATIONS

RF Field Monitor tests the effectiveness of Electronic Counter Measures equipment http://www.securitypark.co.uk/security_article259722.html (Nov. 7, 2007) 2 pages.

*Primary Examiner* — Timothy A Brainard

(57) ABSTRACT

A device and method for estimation of the transmission characteristics of a Radio Frequency system are provided. The device and method calculate a predicted receive power at a given location using a propagation and scenario model. Then a measured receive power at the given location is used to determine a correction value equal to the difference between the calculated and measured receive powers. The correction value and the propagation model are then used with a heuristic method to refine estimates of propagation and scenario parameters. The refined parameter set is used to produce a refined prediction of receive power, which is used to create a refined correction factor. The refined correction factor is used to determine predicted receive powers at a plurality of locations.

46 Claims, 26 Drawing Sheets

U.S. PATENT DOCUMENTS

| | | |
|---|---|---|
| 6,995,660 B2 | 2/2006 | Yannone et al. |
| 7,138,936 B2 | 11/2006 | Duff et al. |
| 8,184,036 B2 * | 5/2012 | Charland .......................... 342/5 |
| 2002/0071408 A1 | 6/2002 | Ogawa et al. |
| 2006/0019679 A1 | 1/2006 | Rappaport et al. |
| 2006/0152405 A1 | 7/2006 | Egri et al. |
| 2006/0267827 A1 | 11/2006 | Ferm et al. |
| 2008/0004042 A1 * | 1/2008 | Dietrich et al. ............ 455/456.1 |

FOREIGN PATENT DOCUMENTS

| | | |
|---|---|---|
| EP | 1881342 | 1/2008 |
| JP | 100620467 | 3/1998 |
| WO | 9803924 | 1/1998 |
| WO | 9857116 | 12/1998 |
| WO | 0127654 | 4/2001 |

* cited by examiner

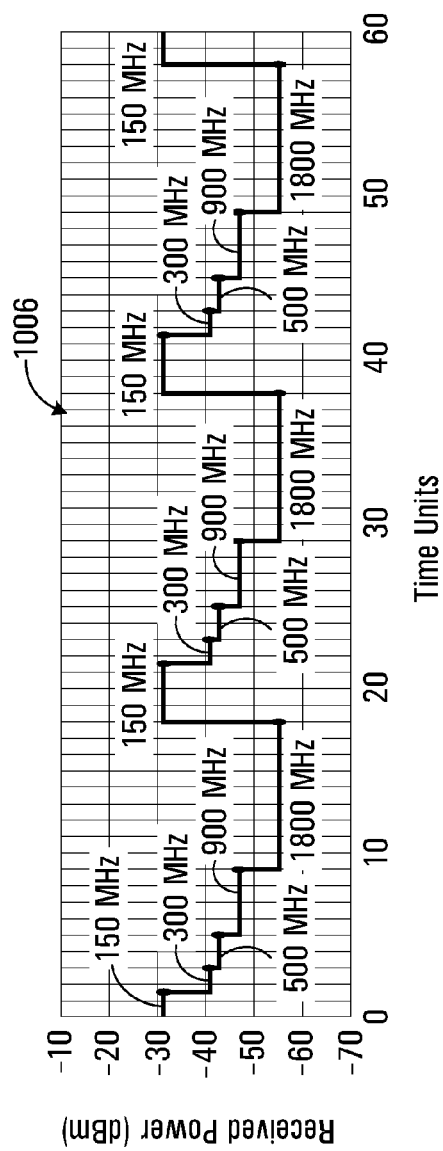
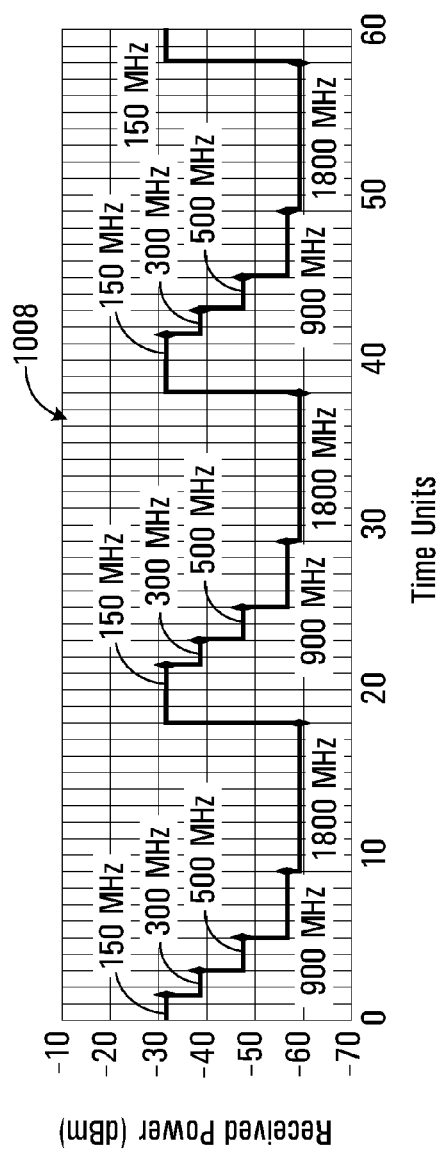
FIG. 20C
FIG. 20D

METHOD AND DEVICE FOR ESTIMATION OF THE TRANSMISSION CHARACTERISTICS OF A RADIO FREQUENCY SYSTEM

RELATED APPLICATIONS

The present patent application is a continuation of U.S. patent application Ser. No. 12/044,351 filed on Mar. 7, 2008, which claims the benefit of U.S. Provisional Patent Application Ser. No. 60/917,368 filed on May 11, 2007, the entire contents of both of which are incorporated herein by reference.

FIELD OF THE PRESENT INVENTION

The present invention pertains to the field of radio frequency signalling and electronic countermeasures.

BACKGROUND OF THE PRESENT INVENTION

Electronic countermeasures (ECM) are a subsection of electronic warfare which includes any sort of electrical or electronic device designed to prevent or disrupt electromagnetic signalling. It may be used both offensively and defensively. ECM often takes the form of jamming, whereby a jamming signal is transmitted by an ECM system to block the reception of other signals within the bandwidth of the jamming signal. However, in general the jamming signal has a finite physical area of effect determined by the area distribution of its radiated energy. Outside this area the jamming may be only partially effective.

Some types of ECM jamming systems are commonly used as part of a convoy of vehicles to protect against hostile use of the electromagnetic spectrum. In these cases, the ECM jamming system provides a mobile area of protection against, for example, remote detonation of an explosive device on or near the convoy's path, while the convoy passes by. Because microwave energy cannot be sensed by involved personnel and ECM operators, determining the real-time, in-situ protection offered by an ECM system is a problem endemic to the use of ECM.

SUMMARY OF THE INVENTION

According to one aspect of the present invention, there is provided a method comprising the steps of: in a device physically remote from a radio frequency (RF) system transmitter: calculating for a first location a predicted received power level of an RF signal generated by the RF system transmitter; measuring at the first location an actual received power level of the RF signal generated by the RF system transmitter; determining a correction value based on the predicted received power level and the measured received power level; and calculating for a second location a predicted received power level of the RF signal using the correction value.

In some embodiments, the method further comprises: calculating for the first location a plurality of predicted received power levels of the RF signal generated by the RF system transmitter, inclusive of calculating the first predicted received power level for the first location, wherein each one of the plurality of predicted received power levels corresponds to a respective frequency component of the RF signal; measuring at the first location a plurality of actual received power levels of the RF signal generated by the RF system transmitter, inclusive of measuring the first actual received power level at the first location, wherein each one of the plurality of actual received power levels corresponds to one of the plurality of predicted received power levels; determining a plurality of correction values based on the plurality of predicted received power levels and the plurality of measured received power levels, inclusive of determining the first correction value based on the first predicted received power level and the first measured received power level; and calculating a plurality of predicted received power levels for the second location using the plurality of correction values, inclusive of calculating the first predicted received power level for the second location using the first correction value.

In some embodiments, the RF signal generated by the RF system transmitter comprises an electronic countermeasures (ECM) signal.

In some embodiments, the method further comprises: predicting probabilistic ability of the RF signal generated by the RF system transmitter to prevent triggering of a potential threat device at the second location based on the predicted received power level of the RF signal at the second location and potential threat device characteristics.

In some embodiments, the potential threat device characteristics comprise a predicted response of the potential threat device to the predicted received power level of the RF signal at the second location.

In some embodiments, the predicted response of the potential threat device to the predicted received power level of the RF signal comprises a predicted response of the potential threat device to a given jamming-to-signal ratio.

In some embodiments, determining the correction value comprises calculating the correction value according to:

$$\Delta P1 = ECM_{meas\_at\_first\_location} - ECM_{unref\_at\_first\_location}$$

where $\Delta P1$ is the correction value, $ECM_{meas\_at\_first\_location}$ is the actual received power level of the RF signal at the first location, and $ECM_{unref\_at\_first\_location}$ is the predicted received power level of the RF signal at the first location, wherein calculating the predicted received RF signal at the second location comprises: calculating an unrefined predicted received power level of the RF signal at the second location; and calculating the predicted received power level of the RF signal at the second location according to:

$$ECM_{ref\_at\_second\_location} = ECM_{unref\_at\_second\_location} + \Delta P1$$

where $ECM_{ref\_at\_second\_location}$ is the predicted received power level of the RF signal at the second location, and $ECM_{unref\_at\_second\_location}$ is the unrefined predicted received power level of the RF signal at the second location.

In some embodiments, the method further comprises: generating a mismatch cost function based on a comparison of the predicted received power level of the RF signal at the first location and the actual measured received power level of the RF signal at the first location; and indicating a fault/anomaly if the mismatch cost function exceeds a threshold value.

In some embodiments, the method further comprises: calculating a respective predicted received power level of the RF signal generated by the RF system transmitter for each location of a plurality of locations in an area around the device using the correction value; and for each location predicting probabilistic ability of the RF signal generated by the RF system transmitter to prevent triggering of the potential threat device at the location based on the respective predicted received power level of the RF signal at the location and the potential threat device characteristics.

In some embodiments, the potential threat device characteristics comprise a predicted response of the potential threat device to the respective predicted received power level of the RF signal for each location of the plurality of locations in the area.

In some embodiments, the method further comprises calculating a protection range of the RF system transmitter by determining a boundary at which the probabilistic ability of the RF signal generated by the RF system transmitter to prevent triggering of the potential threat device is at a safety threshold.

In some embodiments, the method further comprises displaying the protective range of the RF system transmitter.

In some embodiments, calculating each respective predicted received power level of the RF signal comprises: calculating a predicted received power level of the RF signal for each location for each one of a population of N scenario parameter sets to generate N predicted received power levels for each location, wherein for each location the probabilistic ability of the RF signal generated by the RF system transmitter to prevent triggering of the potential threat device at the location is derived from the probabilistic effect of the N predicted received power levels of the RF signal for the location.

In some embodiments, generating the mismatch cost function comprises determining best-case and worst-case predicted received power levels of the RF signal at the first location, wherein the worst-case predicted received power level of the RF signal at the first location is derived from N predicted received power levels of the RF signal at the first location calculated using N scenario parameter sets, and wherein the best-case predicted received power level of the RF signal at the first location is derived from the N predicted received power levels of the RF signal at the first location.

In some embodiments, the method further comprises, for each location: determining an average predicted received power level of the RF signal from the N predicted received power levels of the RF signal; and determining standard deviation of the N predicted received power levels of the RF signal.

In some embodiments, the method further comprises: predicting a worst-case protection range of the RF system transmitter; predicting a predicted protection range of the RF system transmitter; and displaying the worst-case and predicted protection ranges of the RF system transmitter.

In some embodiments, calculating a predicted received power level of the RF signal comprises calculating a predicted received power level of the RF signal using a propagation and scenario model.

In some embodiments, the method further comprises adapting parameters of the model to substantially fit the predicted received power level of the RF signal at the first location to the measured received power level of the RF signal at the first location.

In some embodiments, adaptation of the parameters of the model is accomplished by using an heuristic method to substantially fit the predicted received power level of the RF signal at the first location to the measured received power level of the RF signal at the first location.

In some embodiments, the heuristic method comprises at least one of: a genetic algorithm, an evolutionary algorithm, Tabu search, simulated annealing, and a memetic algorithm.

In some embodiments, the method further comprises: in the RF system transmitter: transmitting at least one pilot signal as part of the RF signal, wherein measuring an actual received power level of the RF signal comprises measuring an actual received power level of the at least one pilot signal transmitted by the RF system transmitter.

In some embodiments, at least one of amplitude, phase, and center frequency of at least one of the at least one pilot signal is adjusted to determine a set of scenario model parameters that, for each one of the at least one pilot signal frequencies, substantially fit the predicted received power level of the RF signal at the first location to the measured received power level of the RF signal at the first location.

In some embodiments, the method further comprises: in the device: communicating with the RF system to control the adjustment of the at least one of amplitude, phase and center frequency of the at least one of the at least one pilot signal.

In some embodiments, the method further comprises: estimating uncertainty associated with at least one parameter of the propagation and scenario model based on discrepancies between the measured received power level of the RF signal at the first location and an average predicted received power level of the RF signal at the first location, wherein the average predicted received power level of the RF signal at the first location is derived from a population of N predicted received power levels of the RF signal at the first location calculated using N scenario parameter sets.

In some embodiments, only a single pilot signal is used at any moment and a center frequency of the single pilot signal is varied across a plurality of frequencies, wherein the model parameters are adapted to: a) substantially fit the predicted received power level of the RF signal at the first location to the measured received power level of the RF signal at the first location for each frequency of the plurality of pilot signal frequencies; and b) estimate uncertainty in at least one model parameter based on discrepancies between the measured received power level of the RF signal at the first location and the predicted received power level of the RF signal at the first location, where the predicted received power level of the RF signal is calculated using the adapted set of model parameters.

According to another broad aspect of the present invention, there is provided a device comprising: receiver circuitry that: receives a radio frequency (RF) from an RF system transmitter physically remote from the device; and measures a received power level of the RF signal at a first location; and a processor that: calculates a predicted received power level of the RF signal at the first location; determines a correction value based on the predicted received power level of the RF signal at the first location and the measured received power level of the RF signal at the first location; and calculates a predicted received power level of the RF signal at a second location using the correction value.

In some embodiments, the RF system transmitter comprises an electronic countermeasures (ECM) system transmitter, and the RF signal generated by the RF system transmitter comprises an ECM signal.

In some embodiments, the processor predicts probabilistic ability of the RF signal at the second location to prevent triggering of a potential threat device at the second location based on the predicted received power level of the RF signal at the second location and potential threat device characteristics.

In some embodiments, the potential threat device characteristics comprise a predicted response of the potential threat device to the predicted received power level of the RF signal at the second location.

In some embodiments, the predicted response of the potential threat device to the predicted received power level of the RF signal comprises a predicted response of the potential threat device to a given jamming-to-signal ratio.

In some embodiments, the receiver circuitry comprises: an antenna system that receives the RF signal; and a spectrum analyzer that measures the received power level of the RF signal.

In some embodiments, the device further comprises a user interface having: a display of the probabilistic ability of the RF signal to prevent triggering of the potential threat device at the second location; and input controls that allow a user to control the display and edit parameters of a propagation and scenario model that the processor uses to calculate the predicted received power level of the RF signal.

In some embodiments, the processor determines the correction value according to:

$$\Delta P1 = ECM_{meas\_at\_first\_location} - ECM_{unref\_at\_first\_location}$$

where $\Delta P1$ is the correction value, $ECM_{meas\_at\_first\_location}$ is the measured received power level of the RF signal at the first location, and $ECM_{unref\_at\_first\_location}$ is the predicted received power level of the RF signal at the first location, wherein the processor: calculates an unrefined predicted received power level of the RF signal at the second location; and calculates the predicted received power level of the RF signal at the second location according to:

$$ECM_{ref\_at\_second\_location} = ECM_{unref\_at\_second\_location} + \Delta P1$$

where $ECM_{ref\_at\_second\_location}$ is the predicted received power level of the RF signal at the second location, and $ECM_{unref\_at\_second\_location}$ is the unrefined predicted received power level of the RF signal at the second location.

In some embodiments, the processor: generates a spectrum mismatch cost function based on a comparison of the predicted RF system spectrum at the first location and the measured RF system spectrum at the first location; and indicates a fault/anomaly if the mismatch cost function exceeds a threshold value.

In some embodiments, the processor: calculates a respective predicted received power level of the RF signal for each location of a plurality of locations in an area around the device using the correction value; and for each location: predicts probabilistic ability of the RF signal at the location to prevent triggering of the potential threat device at the location based on the respective predicted received power level of the RF signal at the location and the potential threat device characteristics.

In some embodiments, the potential threat device characteristics comprise a predicted response of the potential threat device to the respective predicted received power level of the RF signal for each location of the plurality of locations in the area.

In some embodiments, the processor determines a protection range of the RF system by determining a boundary at which the probabilistic ability of the RF signal generated by the RF signal transmitter to prevent triggering of the potential threat device is at a safety threshold.

In some embodiments, the device further comprises a display, wherein the display displays the protection range of the RF system.

In some embodiments, the processor uses a propagation and scenario model to calculate the predicted received power level of the RF signal at each location.

In some embodiments, the receiver circuitry measures the power level of the RF signal by measuring power of at least one pilot signal generated by the RF system transmitter, and wherein the processor adapts parameters of the model to: a) substantially fit the predicted received power level of the RF signal at the first location to the measured received power level of the RF signal at the first location for each of the pilot signal frequencies; and b) estimate uncertainty in at least one of the parameters of the model based on discrepancies between the measured received power level of the RF signal at the first location and the predicted received power level of the RF signal at the first location predicted using the adapted set of model parameters.

In some embodiments, the device communicates, using its receiver circuitry, with the RF system transmitter to adjust at least one of amplitude, phase, and centre frequency of at least one pilot signal generated by the RF system transmitter.

In some embodiments, the adjustment of the at least one pilot signal comprises adjustment of the at least one of amplitude, phase, and center frequency of at least one of the at least one pilot signal, and wherein the processor adapts the parameters of the model to substantially fit the predicted received power level of the RF signal at the first location to the measured received power level of the RF signal at the first location for each of the pilot signal frequencies.

In some embodiments, the processor predicts uncertainty associated with at least one parameter of the propagation and scenario model based on discrepancies between the predicted received power level of the RF signal at the first location and the measured received power level of the RF signal at the first location, wherein the predicted received power level of the RF signal at the first location comprises an average of N predicted received power levels of the RF signal at the first location calculated using N sets of scenario parameters.

In some embodiments, the processor: calculates a predicted received power level of the RF signal for each location N times using a different set of propagation and scenario parameters for each of the N times; and determines an average of the N predicted received power levels of the RF signal for each location, wherein the processor predicts the probabilistic ability of the RF signal to prevent triggering of the potential threat device at each location using the N predicted received power levels of the RF signal at the location.

In some embodiments, the device further comprises a display, wherein: the processor: determines a worst-case predicted received power level of the RF signal at each location from the N predicted received power levels of the RF signal at each location; determines a best-case predicted received power level of the RF signal at each location from the N predicted received power levels of the RF signal at each location; predicts a worst-case predicted RF system protection range; and calculates a predicted RF system protection range; and the display shows the predicted RF system protection range and the worst-case RF system protection range.

In some embodiments, the processor adapts parameters of the propagation and scenario model to substantially fit the predicted received power level of the RF signal at the first location to the measured received power level of the RF signal at the first location.

According to yet another broad aspect of the present invention, there is provided a computer readable medium having recorded thereon statements and instructions for execution by a computer to carry out a method comprising the steps of: calculating a predicted power level of a radio frequency (RF) signal at a first location; determining a correction value based on the predicted power level of the RF signal at the first location and an actual measured received power level of the RF signal measured at the first location; and calculating a predicted power level of the RF signal at a second location using the correction value.

In some embodiments, the RF signal comprises an electronic countermeasures (ECM) signal, and the method further comprises: predicting probabilistic ability of the RF signal to prevent triggering of a potential threat device at the second location based on the predicted power level of the RF signal at the second location and potential threat device characteristics.

According to still another broad aspect of the present invention, there is provided a method for determining a set of scenario model parameters that satisfy an operational criterion, the method comprising the steps of: a) selecting an initial population of candidate parameter sets; b) evaluating fitness of each of the candidate parameter sets; c) determining if the operational criterion is satisfied by at least one of the candidate parameter sets; d) upon determining that at least one of the candidate parameter sets satisfies the operational criterion, selecting one of the at least one candidate parameter sets that satisfies the operational criterion as the set of scenario model parameters; and e) upon determining that none of the candidate parameter sets satisfies the operational criterion: i) generating a next generation of candidate parameter sets from a subset of the most fit candidate parameter sets; and ii) repeating steps a) to e).

In some embodiments, satisfying the operational criterion comprises substantially fitting a predicted power level of a radio frequency (RF) signal calculated using the scenario model to a measured RF signal.

In some embodiments, the measured RF signal comprises at least one pilot signal, and evaluating fitness of each of the candidate parameter sets comprises evaluating a minimum ensemble error function according to:

$$\gamma = \sqrt{\sum_{i=1}^{n} \frac{(P_i^{MEAS} - P_i^{PRED})^2}{n}}$$

Where:
n=number of pilot signals;
γ=fitness value;
$P_i^{MEAS}$=measured power of ith pilot signal; and
$P_i^{PRED}$=predicted power of ith pilot signal.

Other aspects and features of the present invention will become apparent, to those ordinarily skilled in the art, upon review of the following description of the specific embodiments of the invention.

BRIEF DESCRIPTION OF THE DRAWINGS

Embodiments of the present invention will now be described in greater detail with reference to the accompanying diagrams, in which:

FIG. 20C is an example plot of measured power of a single frequency agile pilot signal as a function of time for the varied pilot signal frequency shown in FIG. 20A and the following conditions: Range: 9 m; Transmitter antenna height: 2.2 m; and Receiver antenna height: 1.7 m;

FIG. 20D is an example plot of measured power of a single frequency agile pilot signal as a function of time for the varied pilot signal frequency shown in FIG. 20A and the following conditions: Range: 9 m; Transmitter antenna height: 1.7 m; and Receiver antenna height: 1.9 m.

DETAILED DESCRIPTION

Figure 1:
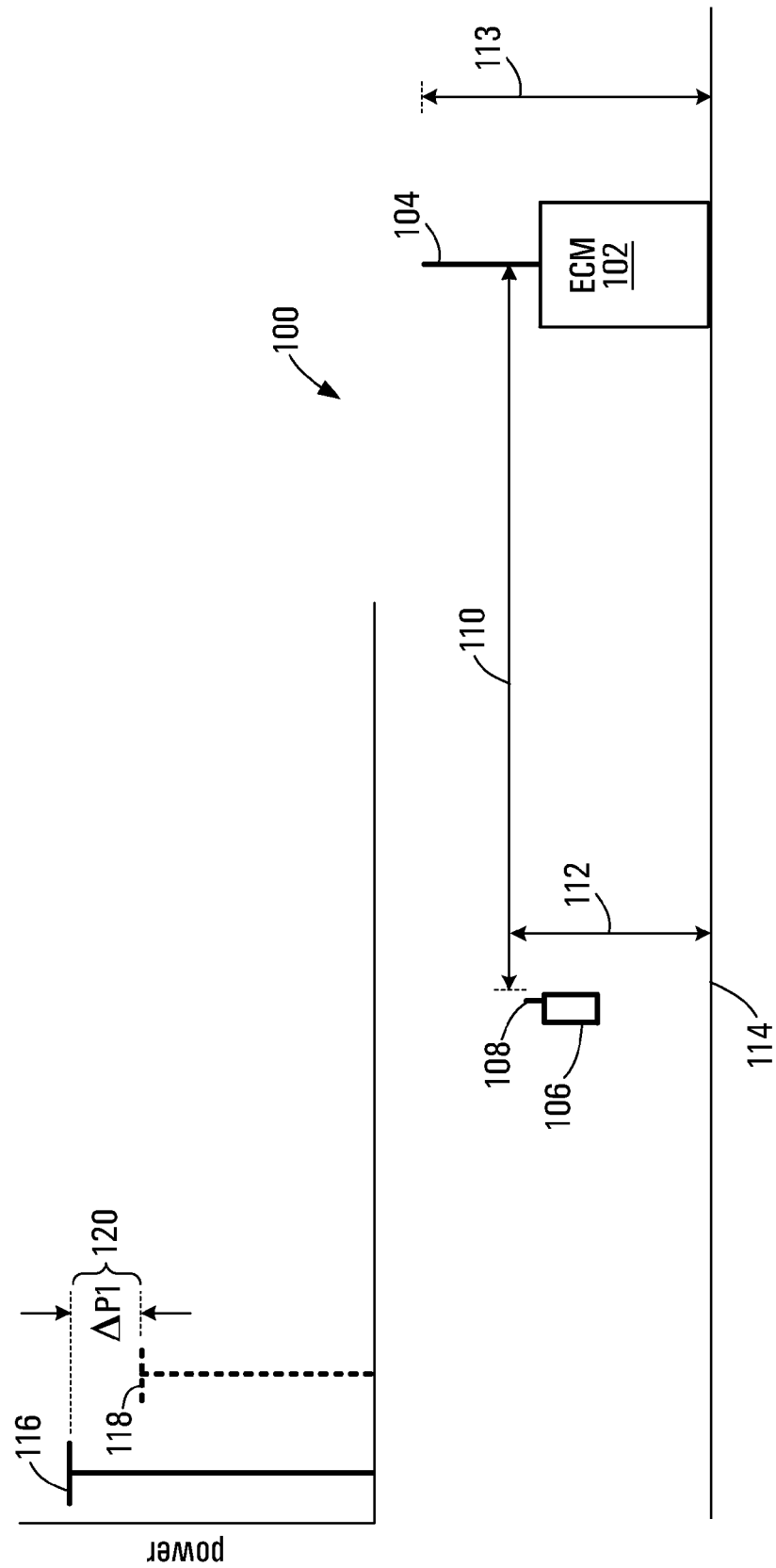
FIG. 1 is a diagram of an arrangement of an ECM Jamming system and a sensing device in accordance with an embodiment of the present invention.

Various devices and methods for predicting the effectiveness of an ECM system in an area around the ECM system are provided. Some embodiments of the methods and devices provide estimation of the protection range of an ECM system in-situ and in real or near-real time. The devices could be implemented as stand-alone units, or as new feature integrated into new or existing equipment. Embodiments of the present invention are not limited to ECM applications. More generally, some embodiments of the present invention provide an estimation of a range at which a Measure of Merit (MoM) is satisfied. For example, for ECM applications, the protection range may be defined by the range at which a probability of preventing triggering of a threat device drops below a threshold value. In other non-ECM implementations, the MoM may simply be the range at which received RF power from an RF transmitter drops below a threshold value.

In some embodiments, the devices and methods determine if there is a fault within the currently operating ECM system.

In some embodiments, the devices and methods indicate whether the currently operating ECM system is capable of service denial for specified threats at a current location.

In some embodiments, the devices and methods indicate whether there is a mismatch between ECM radio frequency coverage and the estimated radio frequency of threat devices according to intelligence information.

In some embodiments, the devices and methods estimate the range to the ECM protection boundary from the current location. That is, the range to the boundary within which the ECM system offers effective protection. This would allow a user to determine whether or not they are within the area of protection, and how far they may be from the protection boundary.

In order to estimate the effectiveness of an ECM system in denying service to different specific threats, the methods may be customized for each particular ECM system and operating environment. For example, the ECM system manufacturer may provide propagation models particular to their systems. In addition, threat characteristics, such as physical or operational characteristics including antenna gains, transmitter powers and receiver sensitivities may be used in conjunction with information regarding the jamming-to-signal ratios required to deny service to a specific threat to evaluate the effectiveness of an ECM system.

In some embodiments, the devices and methods use a software implementation of a mathematical model of microwave propagation to effect a comparison of in-situ ECM spectral measurements and the calculated ECM spectrum including statistical variation of one or more relevant parameters together with (a) threat characteristics including expected statistical variation of one or more relevant threat parameters and (b) expected threat response to the ECM waveform to include the expected statistical variation of one or more relevant threat parameters, in order to predict ECM effectiveness in the area around the device. For example, the predicted statistical variation of a given threat parameter (or any scenario or ECM parameter) may be determined by a combination of two methods: (a) empirically, or if this cannot be done, (b) based on the best available threat and scenario intelligence information, including, but not limited to, best-guess transmitter or receiver architecture, tolerances on electronic components, results of threat exploitation activities, estimated threat deployment doctrine, and/or statistical characteristics of the physical propagation environment including surface type, curvature, and the presence of spurious scatterers.

FIGS. 1 to 4 illustrate an arrangement 100 of a sensing device 106 and an ECM jamming system 102 in accordance with an embodiment of the invention. In FIGS. 1 to 4, the sensing device 106 includes a sensing antenna, generally indicated at 108, and the ECM jamming system 102 includes a transmitter antenna, generally indicated at 104. The sensing antenna 108 of the sensing device 106 is located at a height 112 above ground 114, and a distance or range 110 from the transmitter antenna 104 of the ECM jamming system 102, which is located at a height 113 above ground 114. The height 112, height 113, and distance 110 are application specific. Detailed examples are provided below.

The device 106 performs several power calculation and measurement steps in order to determine the probabilistic effectiveness of the ECM spectrum transmitted by the ECM system 102 to prevent the triggering of a potential threat device 122 at a plurality of locations in an area around the device 106 and/or the ECM system 102. FIGS. 1 to 4 illustrate the scenarios in which the calculations and/or measurements are performed, and include a graphic representation of the power levels calculated and/or measured for each scenario. There are two problems that may potentially be addressed by the device 106:

Problem 1: Estimate the protection range currently created by the ECM system 102. This estimate is based in part on calculations derived from a comparison of measured and predicted ECM power levels.

Problem 2: Determine scenario parameter values to be used to generate the predicted ECM power levels. Some of these parameters can be deduced by transmitting multiple so-called pilot signals of known power through an antenna whose gain, radiation pattern and polarization are well-known, and receiving through an antenna whose gain, pattern and polarization are well-known. By measuring the power in multiple pilot signals it may be possible to determine certain characteristics of the propagation channel.

A description of a series of algorithmic steps that may be executed by the device 106 shown in FIGS. 1 to 4 is provided below for exemplary purposes only, and should not be construed as limiting.

Step 1—Predicted ECM Power at Sensor Antenna:

In operation, in a first step, the sensing device 106 first calculates an unrefined predicted ECM spectrum power at the sensing antenna 108 using a propagation and scenario model that includes, for example, the height 113 of the transmitter antenna 104 of the ECM system 102, the height 112 of the sensing antenna 108 of the device 106 and the range 110 of the sensing antenna 108 of the device 106 from the transmitter antenna 104 of the ECM system 102, and potentially other parameters specific to the propagation model, such as type of ground material, antenna gains or other parameters affecting signal propagation. The propagation model and scenario parameter values used in this calculation represent initial guesses derived from auxiliary measurement equipment such as laser rangefinders, Global Positioning System devices, etc. and possibly from other sources, such as intelligence information, in-situ operator estimates, or deployment doctrine.

The propagation model and scenario parameters are measured or estimated in order to calculate an unrefined predicted ECM spectrum power. Estimation of some of these parameters may involve calculating the predicted received signal power for one or more pilot signals transmitted by the ECM system 102, taking into account the predicted transmit power of each pilot signal. A pilot signal is a signal transmitted by the ECM system 102, and whose purpose is to provide information about the characteristics of the communication channel through which the ECM signals propagate. In FIGS. 1 to 4, the unrefined ECM signal power is generally indicated at 116.

Step 2—Measured ECM Power at Sensor Antenna:

In a second step, the device 106 measures power of the ECM spectrum transmitted by the ECM system's 102 transmitter antenna 104 using the sensor antenna 108 that is part of the device 106. In FIGS. 1 to 4, the actual measured ECM spectrum at the sensing antenna 108 is generally indicated at 118.

Step 3—Error Between Measured and Predicted ECM Power:

In a third step, the device 106 determines the difference $\Delta P1$ between the unrefined predicted ECM power 116 at the device antenna 108 and the measured ECM power 118 at the device antenna 108, according to:

$$\Delta P1 = ECM_{meas\_at\_device} - ECM_{unref\_at\_device}$$

where $ECM_{meas\_at\_device}$ is the actual measured ECM power at the sensing device and $ECM_{unref\_at\_device}$ is the unrefined estimate of ECM power at the sensing device. In FIGS. 1 to 4, the difference $\Delta P1$ between the unrefined predicted ECM power 116 at the sensing antenna 108 and the measured ECM power 118 at the device antenna 108 is generally indicated at 120.

Figure 2:
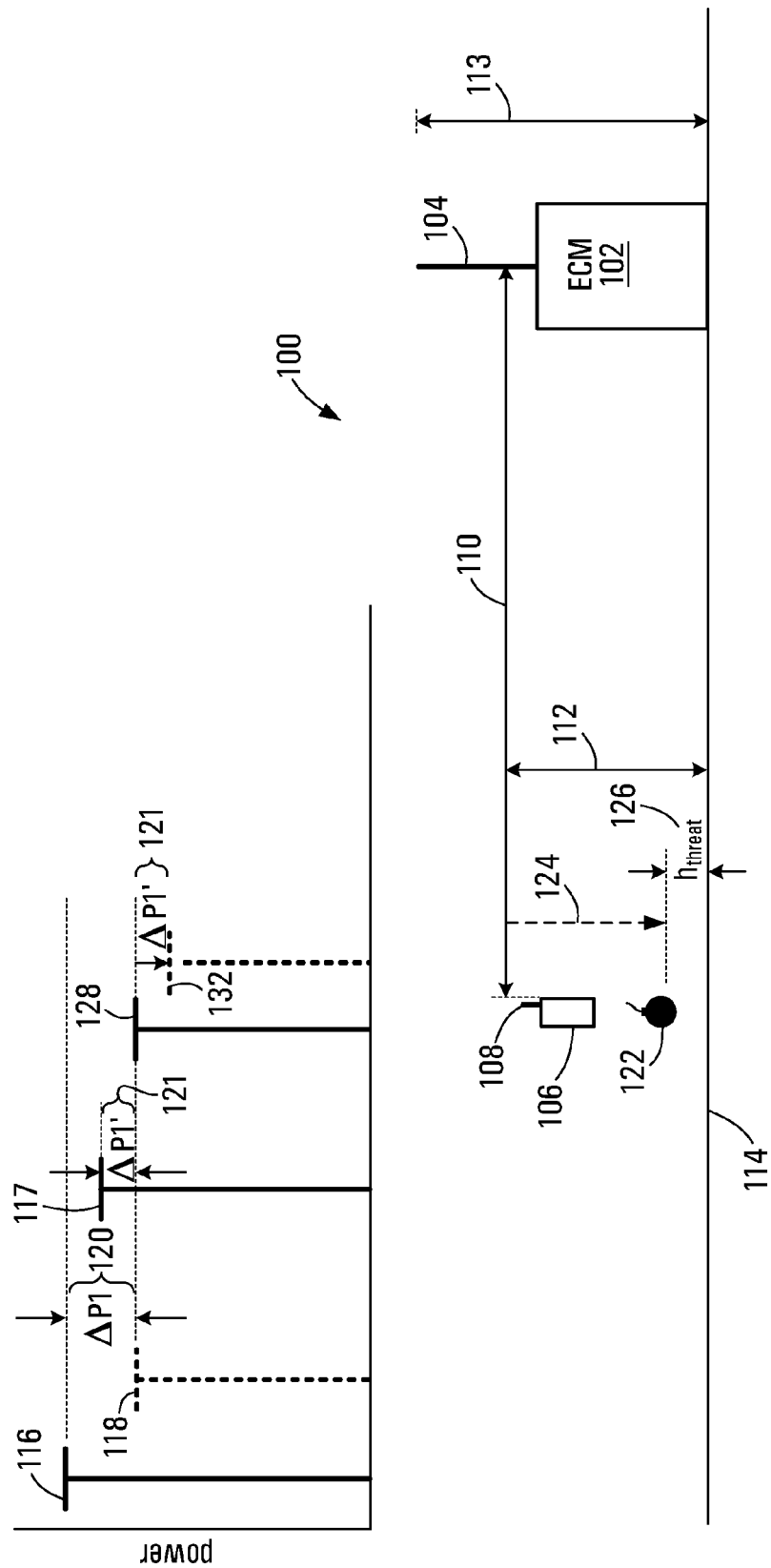
FIG. 2 is a diagram of an arrangement of an ECM Jamming system, threat receiver, and a sensing device in accordance with an embodiment of the present invention.

Step 4—Refine Propagation Model Parameters:

The algorithm proceeds to a fourth step which may or may not be executed or skipped depending on the believed accuracy of scenario parameter estimates. With reference to FIG. 2, if the fourth step is executed, the device 106 then refines the propagation-related scenario model parameters to substantially match the predicted ECM power 116 at the sensor antenna 108 to the measured ECM power 118 at the sensor antenna 108. The propagation and scenario model parameter refinement algorithm is described separately below, and involves the use of pilot signals transmitted by the ECM system 102. This results in a new estimate of ECM power 117 at the sensor antenna 108, and a new difference $\Delta P1'$ 121 between the unrefined predicted ECM power 117 at the sensing antenna 108 and the measured ECM power 118 at the device antenna 108. The difference between the initial power difference $\Delta P1$ 120 and the new power difference $\Delta P1'$ 121 arising from the refined model parameter set may be used iteratively to refine the propagation model parameters as described below for pilot signals, treating the ECM signal effectively as another pilot signal, or to verify the suitability of the refined model parameter set.

Figure 3:
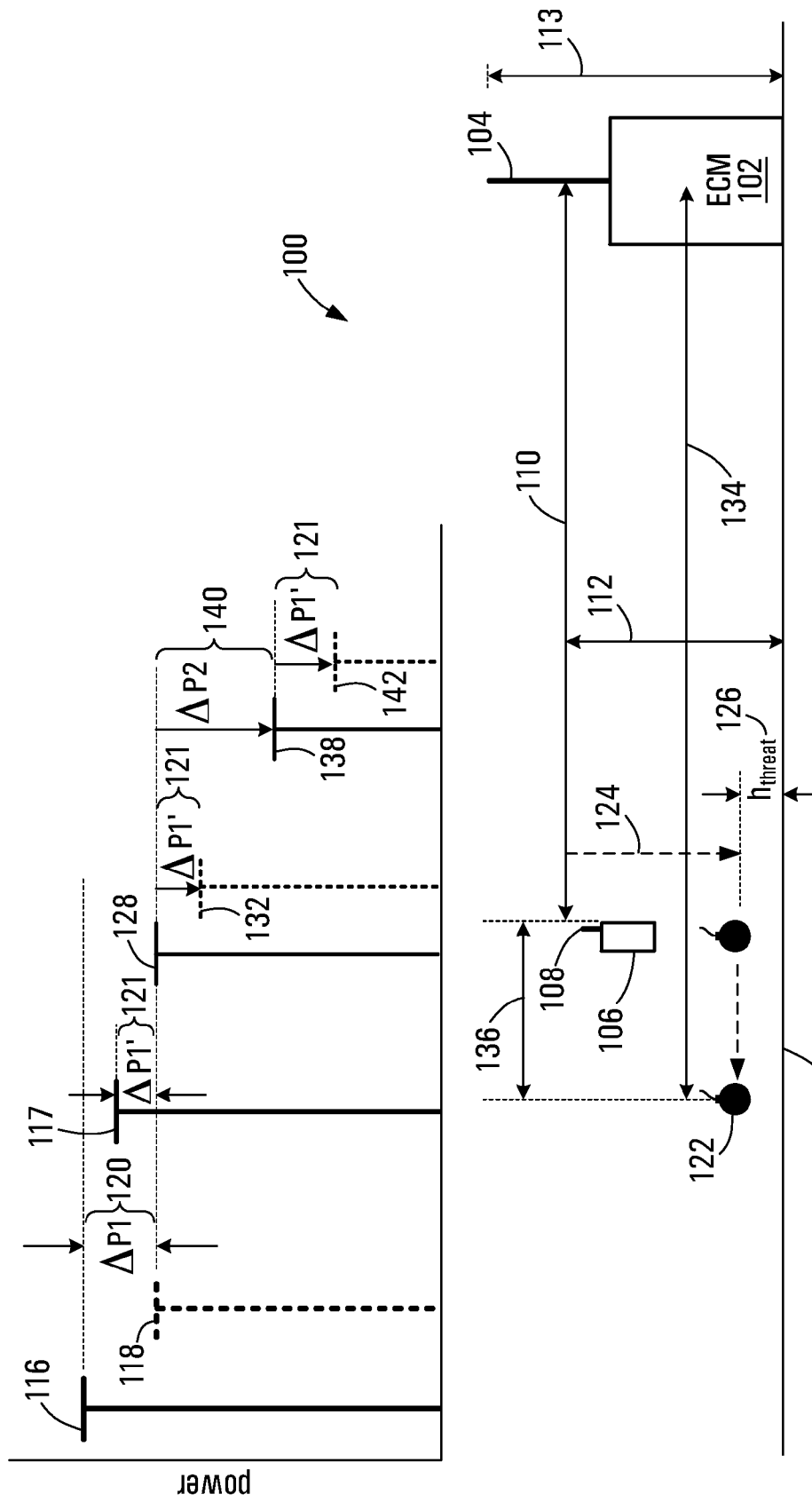
FIG. 3 is a diagram of an arrangement of an ECM Jamming system, threat receiver, and a sensing device in accordance with an embodiment of the present invention.
Figure 4:
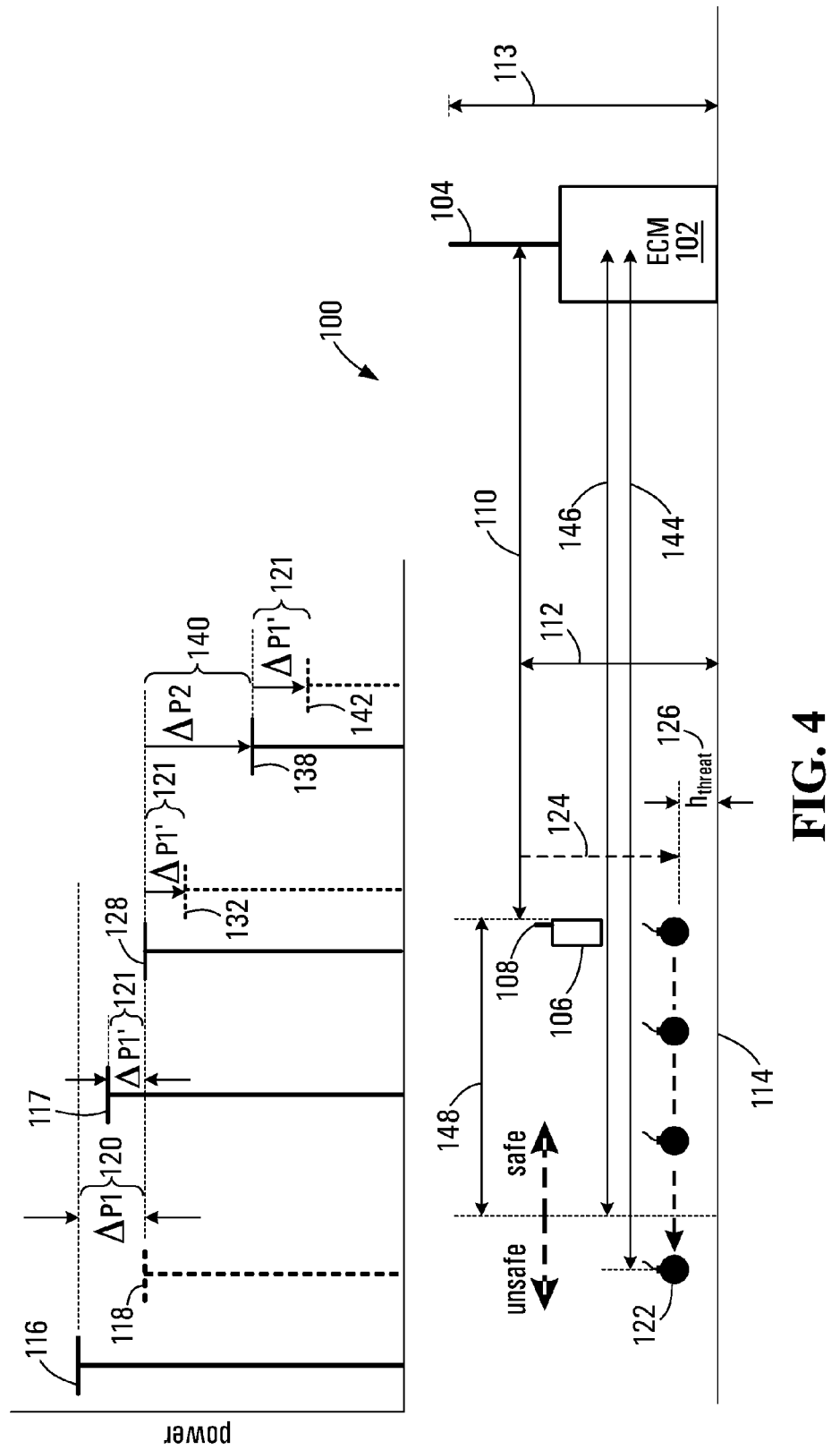
FIG. 4 is a diagram of an arrangement of an ECM Jamming system, threat receiver, and a sensing device in accordance with an embodiment of the present invention.

Step 5—Unrefined Estimate of ECM Power at a Location Co-Range but not Co-Height with Sensor Antenna:

With reference to FIG. 2 again, in a fifth step, the device 106 then calculates an unrefined estimate of ECM power in a potential threat receiver (Rx) 122 located at a different height $h_{threat}$ 126 than the device antenna 108 but at the same range 110 from the ECM system transmitter antenna 104. The calculations are performed using the refined propagation model parameters generated in the fourth step, with exception of parameters specific to the threat Rx, for example the threat Rx height 126 is substituted for the sensor antenna height 112 and the threat Rx antenna gain is substituted for the sensor antenna gain. For example, the device 106 may calculate an unrefined estimate of ECM power in a potential threat Rx located on or near the ground 114 directly below the device. In FIG. 2, the unrefined estimate of ECM power 128 is calculated at a height $h_{threat}$ 126 that is a distance 124 below the device antenna 108. More generally, a potential threat Rx may be assumed to be located at any height above or below the sensing device antenna 108. In FIGS. 2 to 4, the unrefined estimate of ECM power at a different height $h_{threat}$ than the device is generally indicated at 128.

Step 6—Refined Estimate of ECM Power at a Location Co-Range but not Co-Height with Sensor Antenna:

In a sixth step, the device 106 then calculates a refined estimate of the ECM power in the potential threat Rx 122 at the height $h_{threat}$ 126 according to:

$$ECM_{ref\_at\_h_{threat}} = ECM_{unref\_at\_h_{threat}} + \Delta P1'$$

where $ECM_{ref\_at\_h_{threat}}$ is the refined estimate of ECM power in the potential threat Rx at $h_{threat}$, $ECM_{unref\_at\_h_{threat}}$ is the unrefined estimate of ECM power in the potential threat Rx at $h_{threat}$. In FIGS. 2 to 4, the refined estimate $ECM_{ref\_at\_h_{threat}}$ of ECM power in the potential threat Rx at the same range 110 but at a different height $h_{threat}$ 126 than the sensing device 106 is generally indicated at 132.

Step 7—Threat Trigger Power in Threat RX:

In a seventh step, the device 106 calculates the trigger power in the potential threat receiver from a threat trigger transmitter (not shown). For example, the trigger power from a threat trigger transmitter may be calculated in the same or a similar manner as the ECM power. That is, estimates are made of the trigger transmitter's range, height, antenna gain, RF power, and other propagation model parameters, and the calculations proceed. From a mathematical point of view there is no difference between the ECM transmitter antenna 104 of the ECM system 102 and a potential threat transmitter. There is no refinement step for the threat trigger power in the threat Rx 122 since there is no explicit information about the communication channel between the sensor antenna 108 and a potential threat trigger transmitter, nor between the threat Rx 122 and the threat trigger transmitter. There is, however, direct information about the communication channel between the sensor antenna 108 and the ECM transmitter 104, and this information has been used in the sixth step to refine the estimate of ECM power in the threat Rx 122.

In some embodiments, the device 106 calculates the predicted threat trigger signal spectral power at the device using a microwave propagation model that includes the expected height of the threat trigger transmitter, the expected height 126 of the threat Rx 122, the expected range of the threat receiver from the threat transmitter, and other parameters specific to the propagation model.

Step 8—ECM Effectiveness at a Location Co-Range but not Co-Height with Sensor Antenna:

In an eighth step, a prediction of the current ratio of the ECM jamming power at the threat Rx 122 to the trigger signal power at the threat Rx 122 is calculated, and the device 106 uses this value to calculate the probability of success of preventing triggering of the potential threat Rx 122. This calculation is based on an externally-supplied value of jamming-to-signal ratio (JSR) required in the threat Rx 122 to deny service between the threat Rx 122 and the threat trigger transmitter. The JSR to deny service may be estimated by a user by using a variety of sources depending on the available information. Sources could include, but are not limited to, threat intelligence information, results of software simulation, laboratory threat exploitation activities, field experiments, prior field experience, and/or estimates based on an expert's domain knowledge. Like the specific propagation model, JSR to deny service is implementation specific information that may be provided by the end-user. This information is expected generally to be the outcome of various and sundry scientific activities undertaken by the end-user's technical support community.

Step 9—Estimate of ECM Power at a Location not Co-Range and not Co-Height with Sensor Antenna:

With reference to FIG. 3, in a ninth step, the device 106 calculates an unrefined estimate of ECM power in a potential threat Rx 122 at a remote location that has a different height $h_{threat}$ 126 and a different range 134 to the ECM system transmitter antenna 104 than the device antenna 108, such that the potential threat Rx 122 is located at a range 136 from the device antenna 108. In FIGS. 3 and 4, the unrefined estimate of ECM power in a potential threat Rx at a different height $h_{threat}$ 126 and different range 134 than the sensing antenna 108 is generally indicated at 138.

Step 10—Calculation of ΔP2:

In a tenth step, the device 106 calculates the change in power ΔP2 caused by the remote location of the potential threat Rx 122 according to:

$$\Delta P2 = ECM_{unref\_at\_remote} - ECM_{unref\_at\_h_{threat}}$$

where $ECM_{unref\_at\_remote}$ is the unrefined estimate of ECM power in the potential threat Rx at a remote location, for example, height $h_{threat}$ 126 and range 134 from the ECM transmitter antenna 104, and $ECM_{unref\_at\_h_{threat}}$ is the unrefined estimate of ECM power at the same range but different height than the sensing antenna 108. In FIGS. 3 and 4, the difference ΔP2 between the unrefined predicted ECM power 138 at the remote location and the unrefined predicted ECM power 128 at $h_{threat}$ 126 is generally indicated at 140.

Step 11—Refined Estimate of ECM Power at a Location not Co-Range and not Co-Height with Sensor Antenna:

In an eleventh step, the device calculates a refined estimate of the ECM power in the potential threat Rx 122 at the remote location according to:

$$ECM_{ref\_at\_remote} = ECM_{unref\_at\_remote} + \Delta P1' = ECM_{ref\_at\_h_{threat}} + \Delta P1' + \Delta P2$$

where $ECM_{ref\_at\_remote}$ is the refined estimate of ECM power in the potential threat Rx at the remote location, and $ECM_{unref\_at\_remote}$ is the unrefined estimate of ECM power in the potential threat Rx at the remote location. In FIGS. 3 to 4, the refined estimate ECM, $ECM_{ref\_at\_h_{threat}}$ of ECM power in the potential threat Rx at the remote location is generally indicated at 142.

Step 12—Estimate of Trigger Power in Threat Rx at a Location not Co-Range and not Co-Height with Sensor Antenna:

In a twelfth step, the device calculates the threat trigger power in the potential threat Rx at the remote location in the same manner as used in step seven.

Step 13—Estimate of ECM Protection Range:

In a thirteenth step, the device 106 calculates whether the ECM can prevent triggering of the potential threat Rx 122 based on the estimated jamming-to-signal ratio in the threat Rx 122 at the remote location, in the same manner as used in step 8.

With reference to FIG. 4, the device 106 varies the range 144 of the potential threat Rx 122 relative to the ECM system transmitter antenna 104 and repeats steps 9 to 13 above to determine the range at which the prevention of triggering for the potential threat Rx 122 changes from successful to unsuccessful. This is the estimated protection range of the ECM system. Through the thirteen steps described above, the ECM protection range estimate is based on (i) the externally-supplied JSR required to deny service (ii) the estimated JSR in the threat Rx 122 at a plurality of locations calculated using (iii) the best-guess propagation and scenario parameters, which are derived using (iv) in-situ power measurements of ECM signals and pilot signals. For example, in FIG. 4, the effective/not effective boundary is located at a range 146 from the ECM system transmitter 104 and a range 148 from the sensing device 106.

While the sensing antenna 108 is shown as being physically integrated and collocated with the device 106 in FIGS.

1 to 4, in some embodiments, the device 106 may be remote from its sensing antenna. For example, the device be in a remote location receiving measurements via a simple satellite-enabled repeater attached to its receive antenna 108, which could be located on another continent.

Figure 5A:
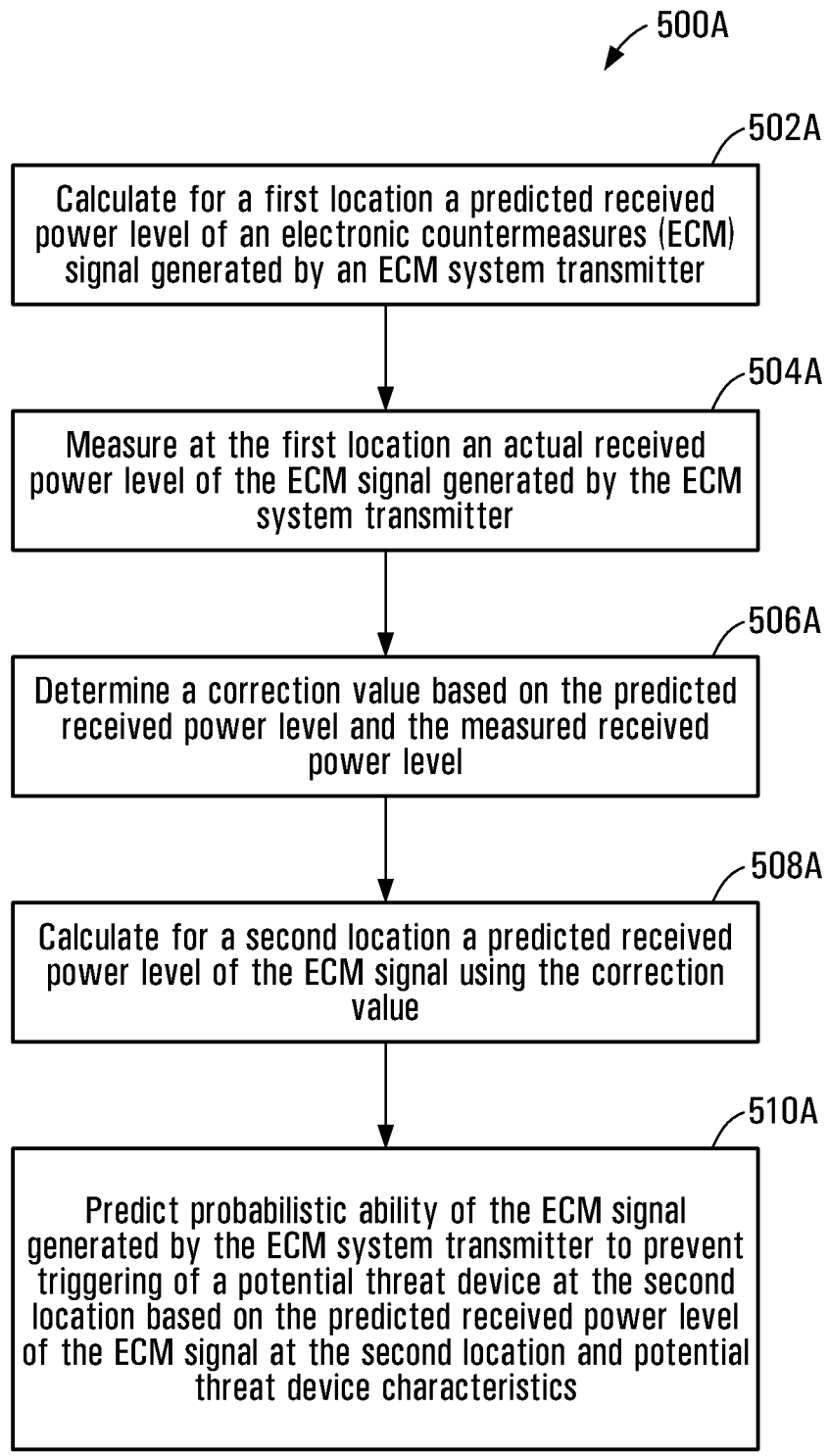
FIG. 5A is a flowchart of an example of a method for predicting the effectiveness of an ECM system in an area around the ECM system in accordance with an embodiment of the present invention.

FIG. 5A is a flowchart that illustrates an example of a method 500A that may be executed by the device 106 shown in FIGS. 1 to 4.

The method 500A begins at step 502A, in which a predicted received power level of an ECM signal generated by an ECM system transmitter is calculated for a first location using a propagation and scenario model.

In step 504A, an actual received power level of the ECM signal generated by the ECM system transmitter is measured at the first location.

In step 506A, a correction value is determined based on the predicted received power level and the measured received power level.

In step 508A, a predicted received power level of the ECM signal at a second location is calculated using the propagation and scenario model and the correction value.

In step 510A, the probabilistic ability of the ECM signal generated by the ECM system transmitter to prevent triggering of a potential threat device at the second location is predicted based on the predicted received power level of the ECM signal at the second location and potential threat device characteristics.

In some embodiments, the potential threat device characteristics include an expected response of the potential threat device to the predicted received power level of the ECM signal at the second location.

In some embodiments, there is an adaptive step after step 506A to adjust parameters of the propagation and scenario model until the predicted and measured received ECM signal power levels substantially agree in order to enhance the accuracy of the predicted received power level of the ECM signal calculated in step 508A. This adaptive step may include the use of genetic algorithms to refine the model parameters in order to improve the model's predicted results, as described herein.

In some embodiments, the device adaptively modifies the internal model of the engagement to align the prediction of the received power with the measured power, and continuously refines the model and the estimates to match ground-truth measurements, while accommodating parameter uncertainties.

In some embodiments, a comparison of measured and predicted power levels is used to generate a spectrum mismatch cost function. If the mismatch cost function exceeds a threshold value, a fault/anomaly may be indicated. Model adaptation may involve adaptation of the nominal model parameters that are judged by the user, or by the device, to most likely be in error. The user may provide information about which parameters are well known, and which are not. The device may record the time history of various estimated parameter values and discrepancies between predicted and measured signal levels in order to derive information about which parameters are well known, and which are not. Model parameters that may have a strong impact on the accuracy of propagating and scenario models include, but are not limited to antenna gains, heights, ranges, and transmitter power levels. In general, the model may be adapted using user-supplied information about uncertainties in the operating environment.

Heuristic methods (e.g Genetic or Evolutionary Algorithms) may be used to determine the optimal propagation model parameters, i.e. the set of model parameters which produce predicted pilot signal power levels that substantially fit the measured levels. These methods generally involve calculation of a "cost", based on a "cost function". The "cost function" is defined as a mathematical formula for calculating the cost. The "cost" is a numerical quantity representing the agreement between predicted and measured power levels. The cost depends on (i) the ground-truth values of all scenario parameters, (ii) the predicted values each of those model parameters which are subject to optimization, and (iii) the radio frequency of the pilot signals.

In some embodiments, two or more pilot signals separated in frequency are used to simultaneously measure multipath effects at different frequencies and the propagation model is adapted until, for example, the RMS error between the predicted and the measured power at all frequencies is minimized or reduced to an acceptable level. The acceptable RMS error is an implementation specific detail.

Adaptation of the propagation model may be used to remove discrepancies between measured and predicted power levels arising from such factors as non-flat terrain (road surface curvature), incorrect signal processing gain values used in the model (e.g. Tx, Rx antenna gains, Tx power, etc.), incorrect range values used in the model, errors in estimated road surface type, and/or incorrect antenna height values used in the model.

Curvature of the road surface, i.e. hills or valleys, can cause the vertical distance of potential threats from the ECM system to differ between potential threats that are the same horizontal distance from the ECM system. Such curvatures may be the first parameter adapted in the algorithm. If the road surface is curved, the height of the ECM system, the height of the sensor, or the height of the potential threat at a remote location could be incorrectly represented in the model. However, in some embodiments, the time history of model adaptations plus known/expected/measured road curvature can be used to eliminate or control the strength of this fact in the adaptation algorithm.

In some embodiments, frequency diversity is used to narrow the range of parameter value uncertainty. In general, the more frequencies that are used, the more uncertainty is removed. In some embodiments, a pattern of signals that vary in frequency and amplitude (and possibly also phase) is radiated such that it is possible to determine one unique solution for the combination of geometry of (a) the propagation environment, and (b) material over which the signal propagates.

Figure 5B:
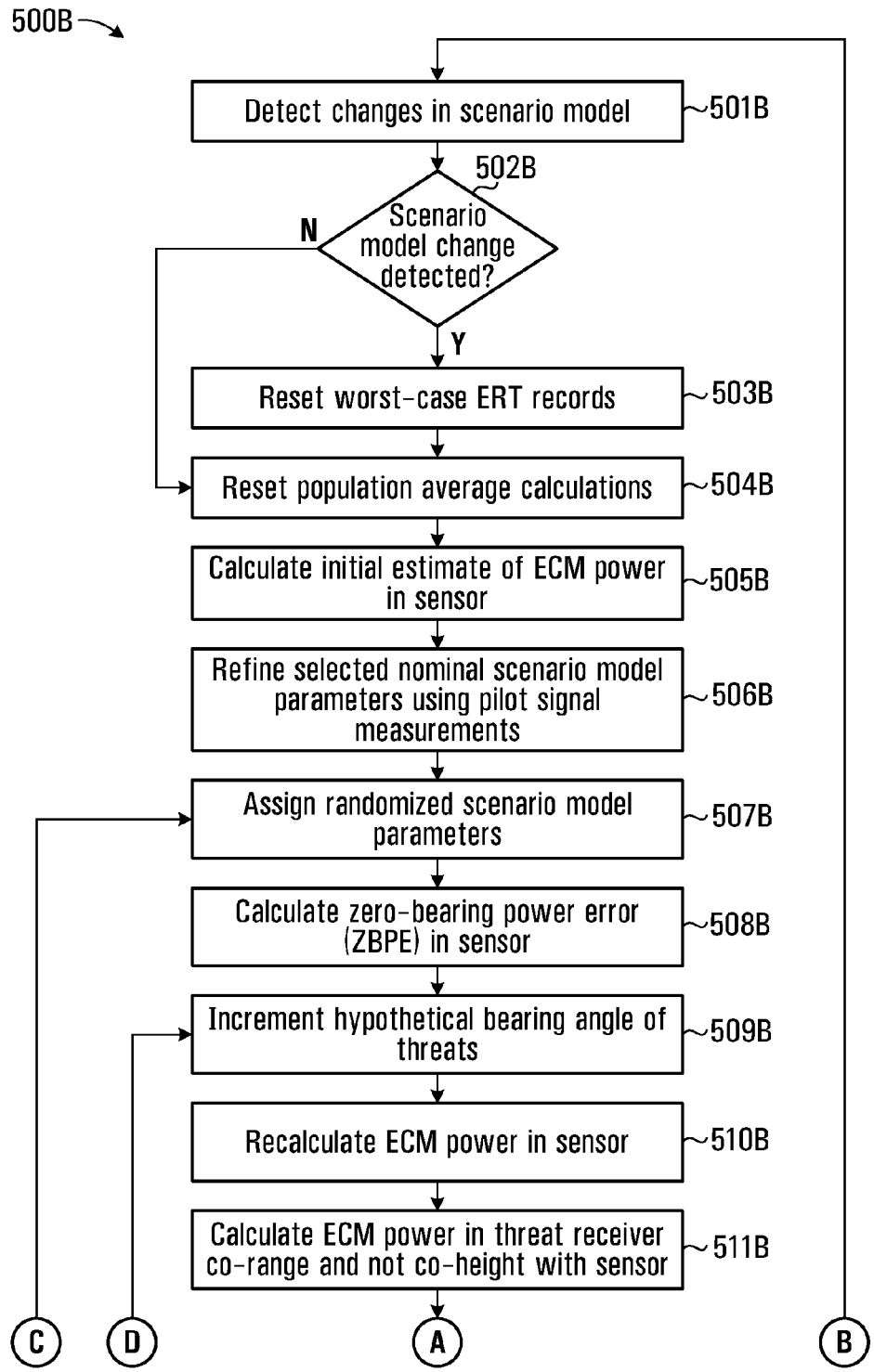
FIGS. 5B and 5BB contain a flowchart of a more detailed example of a method for predicting the effectiveness of an ECM system in an area around the ECM system in accordance with an embodiment of the present invention.
Figure 5B:
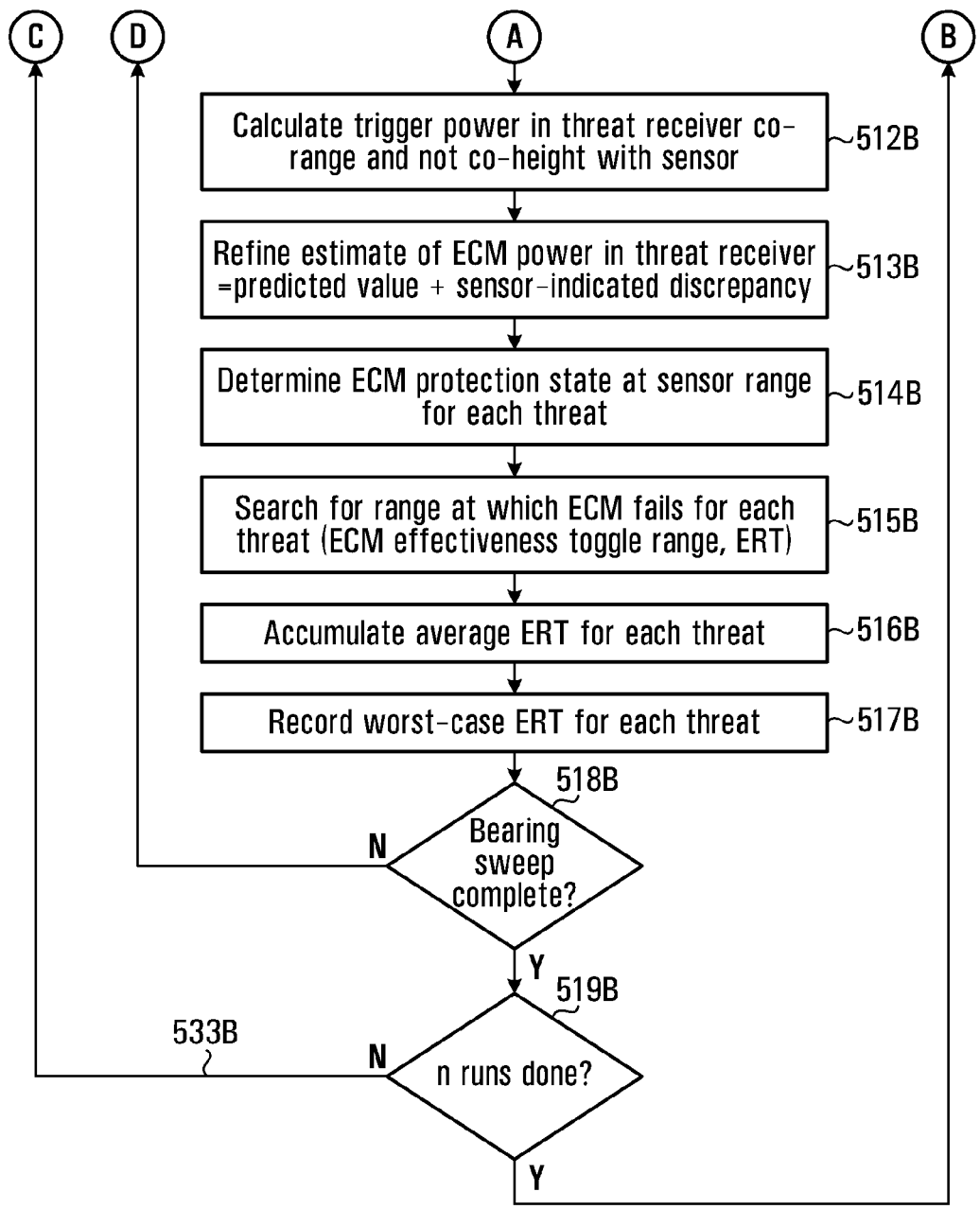

FIGS. 5B and 5BB illustrate a flowchart of a more detailed example of a method that may be executed by the device 106 shown in FIGS. 1 to 4. A detailed description of the meaning of this flow chart is presented below.

The method includes a main computation loop 500B, which may be executed repeatedly and indefinitely. The method involves numerical calculations using the following elements: (i) a model, (ii) a scenario model, (iii) a protection range computational engine PRCE, and (iii) a scenario parameter refinement engine (SPRE).

In some embodiments, the propagation model comprises (a) a mathematical representation of all effects deemed relevant to radio frequency propagation between transmitters, receivers and scatterers of interest, and (b) the algorithm used to solve for the parameters of interest (i.e. the model outputs). The purpose of the propagation model is to relate input parameter to radio frequency power levels at a receiver antenna, for example at the sensor antenna 108.

In some embodiments, the scenario model comprises (a) nominal values and (b) variability values for all the input parameters used by the propagation model and protection range computational engine. The scenario model also includes a parametric description of each possible threat system of interest including nominal and variability values for each parameter, whether or not an ECM has been developed and/or deployed for a given threat. The purpose of the scenario model is to provide inputs to the propagation model and the PRCE. Some parameters in the scenario model may be used only by the propagation model, such as the geometry between receive and transmit antennas. Some parameters of the scenario model may be used only by the PRCE, such as algorithm-specific parameters, the population size for statistical calculations (see step 519B described below) and certain threat-specific parameters including receiver bandwidths and jamming-to-signal ratio (JSR) to deny service between the threat transmitter and threat receiver.

In some embodiments, the PRCE includes an implementation of mathematical relationships, which relate input parameters to estimates of ECM protection range for each threat system. The purpose of the PRCE is to compute various outputs related to the ECM protection range for each threat.

In some embodiments, the SPRE includes a heuristic algorithm based on Genetic Algorithms, as described elsewhere in this document. The purpose of the SPRE is to refine the value of selected scenario parameters based on real-time measurements and inputs.

Step 501B—Model Change Detection:
The main computation loop 500B begins in a first step 501B, in which a current scenario model is compared with a scenario model used in a previous iteration of the main computation loop 500B.

Step 502B—Decision/Reset Worst-Case Records:
In a second step 502B the algorithm implements a decision: a determination is made whether the scenario model has changed since the last iteration of the main computation loop 500B.

Step 503B—Reset Worst-Case Records:
In a third step 503B, proceeding from step 502B, if there has been a change in the scenario model the algorithm sets the worst-case protection range records for each threat to zero. The algorithm then proceeds to step 504B described below.

Step 504B—Reset Population Average Calculations:
In a fourth step 504B, proceeding from step 502B, if there has been no change in the scenario model, the output values calculated for a randomized population of scenario parameter sets are reset, i.e. results of all previous calculations performed by the main computation loop 500B are notionally set to zero. In some implementations, results of previous calculations may be retained for later use to (i) determine the effect of parameter changes on computational results, and (ii) help accelerate and/or refine the output of the main computational loop 500B.

Step 505B—Initial Estimate of ECM Power in Sensor:
In a fifth step 505B, the software calculates the predicted ECM power level at a sensor antenna, such as the sensor antenna 108 shown in FIGS. 1 to 4 and 21, based on an initial estimate of propagation and scenario parameters.

Step 506B—Refinement of Nominal Model Parameters:
In a sixth step 506B, an algorithm is used to refine the current estimate of (i) the nominal value and (ii) expected variation range of selected parameters of the scenario model. Examples of these parameters include nominal ECM transmitter antenna height 113, nominal sensor antenna height 112, and nominal transmitter-sensor antenna range 110. This refinement is accomplished by the use of measured pilot signal power levels and the use of heuristic methods such as Genetic or Evolutionary Algorithms, as described herein.

Step 507B—Model Parameter Randomization:
In an seventh step 507B, each parameter value in the scenario model is assigned a value randomly chosen from within a specified range of variation relative to the nominal value of the parameter. The variation range of each parameter is preset as part of the scenario model, and represents the accuracy with which each parameter is believed to be known.

Step 508B—Zero-Bearing Power Error:
In an eighth step 508B the ECM power at the sensor antenna 108 is recomputed at the sensor bearing angle, i.e. the bearing reference angle or zero bearing, using the scenario parameter values set in step seven. The discrepancy between the measured and predicted ECM powers at the sensor antenna 108 is recorded as the zero-bearing power error (ZBPE).

Figure 21:
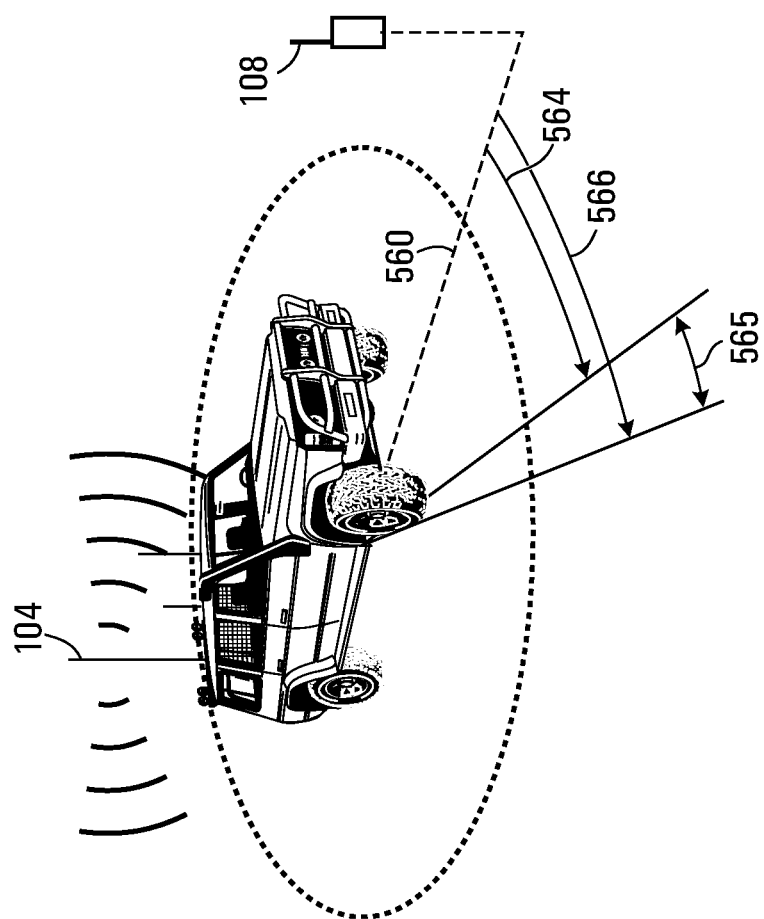
FIG. 21 is a diagram illustrating two propagation model parameters, namely bearing angle and range, for use in predicting radio frequency signal power levels at a plurality of locations in accordance with an embodiment of the present invention.

Step 509B—Bearing Increment:
With reference to FIG. 21, in a ninth step 509B, the bearing angle 564 at which the protection range for each threat is to be calculated is incremented by a preset angle 565, producing a new bearing angle 566. The bearing angle is the azimuth look angle from the ECM transmit antenna 104 in the direction that the ECM protection range will be calculated. This angle is defined relative to the look angle from the ECM transmit antenna 104 to the device sensor antenna 108 bearing reference angle 560, i.e. the line of sight 560 from the ECM transmit antenna 104 to the device sensor antenna 108 is defined to be the zero-bearing angle 560.

Step 510B—Recalculation of ECM Power in Sensor:
In a tenth step 510B, the value of predicted ECM power at the sensor antenna 108 is recalculated based on the scenario parameters set in step 507B.

Step 511B—ECM Power in Threat Receiver Co-Range not Co-Height:
In an eleventh step 511B, the ECM power is calculated at a hypothetical threat receiver 122 which is radially co-range but not co-height with the device sensor antenna 108. The relevance of this computation in determining the ECM protection range is based on the untested hypothesis that the electromagnetic characteristics of the local ground surface around the ECM antenna 104 is invariant with bearing, i.e. propagation effects along the zero-bearing line between the sensor antenna 108 and the ECM antenna 104 apply at all bearings.

Step 512B—Trigger Power in Threat Receiver Co-Range not Co-Height:
In a twelfth step 512B, the threat trigger power is calculated in a hypothetical threat receiver 122 which is co-range but not co-height with the device sensor antenna 108.

Step 513B—Refined Estimate of ECM Power in Threat Receiver Co-Range not Co-Height:
In a thirteenth step 513B, a refined estimate of the ECM power in the threat receiver 122 is calculated using the zero bearing power error (ZBPE) calculated in step 508B and the estimated ECM power in the threat receiver 122. Transference of the ZBPE to the threat receiver power is justified on the basis of the following untested hypotheses: Hypothesis I: the sensor power discrepancy arises from estimation errors which are common to the sensor antenna 108 and the threat receiver 122 at zero bearing, and Hypothesis II: that this error is invariant with bearing.

Hypotheses I and II are predicted to be true if the cause of the ZPBE is attributable to such factors as, for example, misestimation of ECM transmitter power, misestimation of installed ECM antenna gain, misestimation of sensor antenna gain, and mismatch between the polarization of ECM and sensor antennas. If one or both of these hypotheses are not true, step 513B may introduce an error in the calculated ECM protection range. Consequently, in some embodiments, if information is available indicating that Hypothesis I is invalid, step 513B may be omitted altogether. If information is available indicating that Hypothesis II is valid only for certain bearings, in some embodiments, step 513B may be applied selectively, i.e. only for those bearings at which Hypothesis II is known or believed to be true.

Step 514B—ECM Protection State for Threat Co-Range not Co-Height:

In a fourteenth step 514B, the computed ECM and threat trigger power in the threat receiver 122 is used to calculate the estimated jamming-to-signal ratio (JSR) in the threat receiver 122, with the threat receiver 122 at the same radial range from the ECM transmit antenna 104 as the sensor antenna 108, but at a different height. This is compared with the externally-supplied value of JSR to deny service for each threat receiver-transmitter pair, to determine if the ECM is capable of denying service between the threat transmitter and receiver when (a) the threat receiver 122 is radially co-range but not co-height with the device sensor antenna 108, and (b) for the scenario parameters set in step 507B.

Step 515B—Determine ECM Effectiveness Toggle Range (ETR):

In a fifteenth step 515B, the ECM protection range for each threat is computed for the current scenario parameter set (assigned in step 507B). This is accomplished for each threat by re-computing the JSR in the threat receiver at a plurality of hypothetical threat receiver 122 ranges radial from the ECM transmit antenna 104, in which the only parameter of the scenario model varied is the range of the threat receiver 122 from the ECM transmitter antenna 104. For each threat, the computed JSR value is compared with the JSR to deny service, to determine whether the ECM is able to deny service between the threat transmitter and the threat receiver 122, at each of the hypothetical ranges. The results of these calculations are used to determine the range for each threat at which the ability of the ECM to deny service between the threat transmitter and threat receiver 122 changes from successful to unsuccessful, i.e. to determine the so-called ECM effectiveness toggle range (ETR). The ETR for each threat is defined as the computed ECM protection range for (a) the current scenario parameter set assigned in step 507B, and (b) the corresponding threat.

Step 516B—Accumulate Average ETR:

In a sixteenth step 516B, the currently computed ETR for each threat is recorded and used to accumulate an average ETR over a plurality of scenario parameter sets. Other measures of effectiveness are possible instead of average ETR, including, for example, probability of service denial vs. range, and probability of service denial vs. range heuristically weighted by the statistically calculated confidence of the probability (i.e. the weighting is proposed, not derived).

In some embodiments, an average ERT is computed separately for each threat. Additionally, the device 106 may record the predicted ECM spectrum in order to calculate a number of statistical properties of a population of predicted ECM spectra at the device sensor antenna 108, including but not limited to the following:

(i) mean ECM power at each frequency;
(ii) standard deviation of ECM power at each frequency;
(iii) ECM power in the absence of propagation effects;
(iv) lowest predicted ECM power at each frequency; and
(v) highest predicted ECM power at each frequency.

Figure 15:
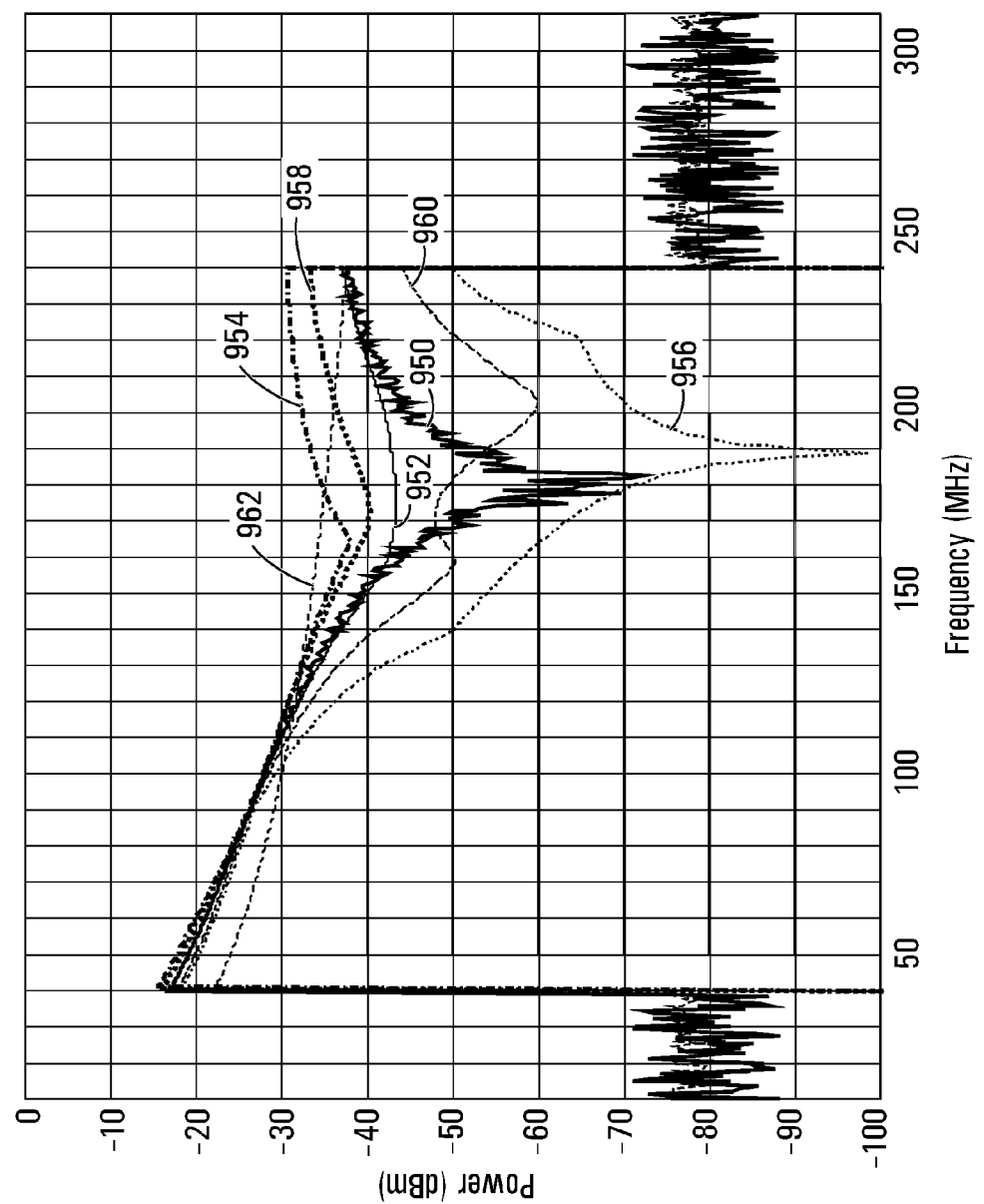
FIG. 15 is an example plot of a measured power level and several calculated power levels as functions of frequency in accordance with an embodiment of the present invention.

Examples of each of these curves are presented in FIG. 15, which is described in detail in a following section.

Step 517B—Update Worst-Case Protection Range Records:

In an seventeenth step 517B, for each threat the computed ETR is compared with the current record of worst-case ETR. If the current value is less than the worst-case ETR, the current value replaces the worst-case ERT for that threat.

Step 518B—Decision/Bearing Increment:

In a eighteenth step 518B, a determination is made whether or not calculations described in steps 511B to 517B have been applied to all bearings of interest. If they have not, the algorithm returns to step 509B. If they have, the algorithm proceeds to a nineteenth step 519B.

Step 519B—Decision/Population Completion:

In a nineteenth step 519B, a determination is made whether or not the ETR has been calculated for a complete population of scenario parameter sets, where the population size is a preset parameter in the scenario model. Steps 507B to 518B inclusive comprise calculation of ETR value versus bearing for each threat, for a single unique set of scenario parameters which were randomly assigned in step 507B based on each parameter's nominal value and expected variability. Because each randomized scenario parameter set is unique, the ETR value versus bearing will generally vary from one scenario parameter set to another and an average set of ETR values versus bearing can be calculated from a population of ETR values versus bearing, considering each threat separately. If a complete population of ETR vs. bearing has been generated for each threat, the algorithm proceeds to step 501B. If the complete population of ETR vs. bearing has not been generated for each threat, the algorithm proceeds to step 507B in order to calculate ETR vs. bearing for another unique scenario parameter set, for each threat.

By inclusion of step 507B, the probabilistic effectiveness of the ECM system to prevent triggering of a potential threat device at the second location is predicted based on probabilistic characteristics of potential threat devices because the scenario parameters used in prediction (a) are randomized, and (b) include threat-specific parameters such as for example threat transmit antenna gain, threat receiver antenna gain, threat transmitter power, threat receiver bandwidth, threat receive antenna polarization, and threat transmit antenna polarization.

Implementation of a Heuristic Method for Parameter Optimization

This section provides a description of the use of a heuristic method for optimization of scenario model parameters for use in predicting radio frequency signal power levels at a plurality of locations.

Figure 5C:
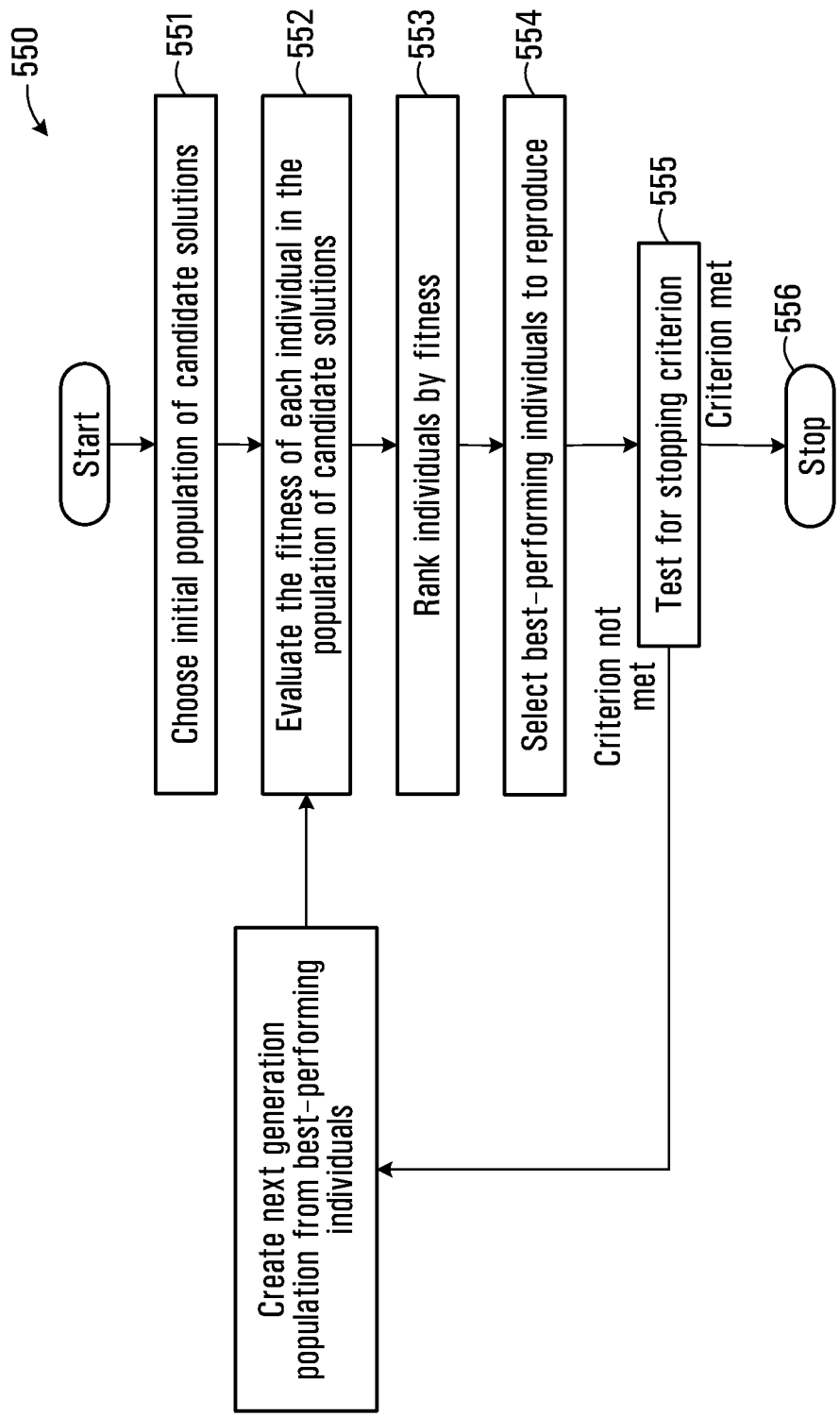
FIG. 5C is a flowchart of an example of a heuristic method for optimization of scenario model parameters for use in predicting radio frequency signal power levels at a plurality of locations in accordance with an embodiment of the present invention.

FIG. 5C is a flowchart of a heuristic method 550C for optimization of scenario model parameters for use in predicting radio frequency signal power levels at a plurality of locations.

With reference to FIG. 5C, the method 550C begins with a first step 551 in which an initial population of candidate solutions is generated.

In a second step 552, the fitness of each candidate in the population is evaluated against a fitness function.

In a third step 553, individuals are ranked according to fitness.

In a fourth step 554, the best-performing individuals are selected as individuals which will be used to create the next generation.

In a fifth step 555, conditions are tested to determine whether a stopping criterion or criteria have been met. If they have been met, the method proceeds to a sixth step 556 in which the search for an optimal solution is terminated and the final solution has been found.

If the stopping criterion or criteria have not been met in the fifth step 555, the method proceeds to a seventh step 557 in which the next generation population of candidate solutions is generated. The method then returns to the second step 552.

In some embodiments, pilot signal power levels are measured and compared with sets of predicted pilot signal power levels, where each set of predicted pilot signal power levels corresponds to an unique combination of candidate scenario parameters. The purpose of the comparison is to determine the ability of individual candidate scenario parameter sets to predict the observed pilot signal power levels. The fittest candidate parameter sets are those which result in small discrepancies between predicted and measured pilot signal power levels, considering all pilot signals collectively. The fitness function is the mathematical expression by which the candidate parameter sets are ranked, considering all pilot signals collectively.

In some embodiments, one or more of the following parameters may be selected for adaptation:
(i) ECM transmitter antenna height;
(ii) Sensor antenna height;
(iii) Range between ECM and sensor antennas; and
(iv) ECM transmitter antenna gain.

The foregoing parameters are provided by way of example only, and should not be construed as limiting.

Many choices are available for implementing the following features of the heuristic method illustrated in FIG. 5C:
(a) the fitness function utilized in step 552;
(b) the algorithm for creating the next generation candidate parameter set in step 557; and
(c) the stopping criteria utilized in step 555.

Specific choices for implementing the foregoing features in some embodiments of the present invention are described below.

Fitness Function:

In some embodiments, the fitness function comprises a minimum ensemble error function according to:

$$\gamma = \sqrt{\sum_{i=1}^{n} \frac{(P_i^{MEAS} - P_i^{PRED})^2}{n}}$$

Where:
n=number of pilot signals;
γ=fitness value;
$P_i^{MEAS}$=measured power of ith pilot signal; and
$P_i^{PRED}$=predicted power of ith pilot signal The formulation above is presented by way of example only, since there is a nearly limitless range of possibilities for the mathematical formulation of the fitness function. For example, in some embodiments, the contribution of each pilot signal frequency is weighted according to the assessed value of the pilot signal frequency in providing parameter set information.

In some embodiments, pilot signals at frequencies for which a null is believed to be formed at or near the device sensor antenna might be weighted differently than others, because nulls typically only form for a narrow set of parameter values. Under these conditions it might be best to apply a relatively low weight to the term associated with this pilot signal frequency in the ensemble cost function. The anticipated effect is to avoid overly penalising a parameter set which may be nearly correct, but which makes a quantitatively large contribution to the ensemble error value because a null occurs near the sensor. Similarly, a relatively high weight could be applied for terms associated with pilot signals at frequencies where a relative maxima is believed to be formed at the device sensor antenna.

Candidate parameter sets for which the fitness function results in a value below a fitness threshold are used to create the next generation of candidate parameter sets.

In some embodiments, the fitness threshold for candidate survival is constant for all generations.

In some embodiments, as the overall fitness of each generation increases, the threshold for contributing to the next generation is adjusted to select only those candidates which are the fittest relative to the overall fitness of the population. This could potentially cause a faster convergence of the solution by reducing the number of sub-optimal candidates in each subsequent generation.

Algorithm for Creating Next Generation:

In some embodiments, one pair of parameter sets which passed the fitness test (referred to as parent parameter sets) may be used to create one new candidate parameter set.

In some embodiments, the new value of each parameter in the new parameter set is formed by taking the algebraic average of the corresponding parameters in two parent parameter sets. Successful parameter sets from the previous generation may be randomly paired to form parent parameter sets.

In some embodiments, the number of children created is equal to the number required to replace the candidate parameter sets which did not pass the fitness test in the previous generation, less for example 10 percent of the population of the previous generation.

In some embodiments, the next generation population also has included in it a number of randomly chosen parameter sets, where the parameter values are chosen to lie within a parameter-specific and implementation-specific range of a parameter-specific and implementation-specific nominal best-guess values.

The nominal value and parameter range from which random candidates are generated may remain constant throughout the optimization process.

In some embodiments, the number of randomly generated parameter sets is for example 10 percent of the population of the previous generation. The randomly chosen parameter sets are included to help promote the discovery of optimal solutions in parameter spaces which become poorly sampled from one generation to the next, because of, for example, possible clustering of parameter sets near solutions which are only locally optimal.

The example algorithms described above for creating a next-generation candidate parameter set are illustrative only; there are a number of possible variations which could be implemented. For example, the parent parameter sets could be assigned according to fitness, e.g. the parameter sets with the lowest score (highest fitness) could be systematically paired with each other. Also, each parent pair may not be limited to creating a single child parameter set, but their productivity could be made proportional to the combined fitness of the parent pair. Alternatively, children could be created from single survivors instead of from parent pairs, or there could be several parents for each child parameter set.

Stopping Criteria:

In some embodiments, the stopping criteria comprise the following:
(i) Solution Convergence: the variability of parameters in the candidate parameter sets has become small enough that the candidates, or candidates within a discrete number of groups, are indistinguishable from each other;
(ii) Population Fitness Threshold: a preset fraction of the population passes the fitness test; and
(iii) Timeout: a maximum allowed number of generations has been executed.

The stopping criteria provided above are for exemplary purposes only, and should not be construed as limiting.

Inclusion of Threat Response:

In some embodiments, the potential threat device characteristics include a predicted response of the potential threat device to the predicted ECM system spectrum at the second location.

Model Parameter Adaptation:

In some embodiments, there is an adaptive step after step 505B to adjust parameters of the scenario model until the predicted and measured power in pilot signals (described below) and the ECM spectrum substantially agree in order to enhance the accuracy of the predicted ECM system spectrum as calculated in steps 510B, 511B, 512B and 515B. This adaptive step may include the use of so-called heuristic methods such as genetic or evolutionary algorithms together with pilot signals to refine the value of selected scenario parameters, in order to improve the model's predictive power, as described herein. Heuristic methods are described in Goldberg, David E.; Genetic Algorithms in Search, Optimization and Machine Learning; Addison-Wesley, Boston, (c) 1989, ISBN 0201157675, which is hereby incorporated by reference in its entirety.

The heuristic methods generally involve optimization according to calculation of a "cost", based on a "cost function". For the purposes of this description, the "cost function" is defined as a mathematical formula representing the agreement between predicted and measured signal power levels. The cost depends on the following:
  (i) the measured power and by extension the ground-truth values of all scenario parameters including transmitted power levels, and
  (ii) predicted powers and by extension the estimated values each of those model parameters which are:
    (a) used to predict power levels; and
    (b) subject to optimization against the cost.

In some embodiments, and for the purposes of this explanation, the following points regarding the cost function also apply:
  (i) The cost is calculated from discrepancies between measured and predicted pilot signal characteristics such as for example power levels,
  (ii) it may be continuously applied in time, and
  (iii) it may use results of previous adaptation activities to accelerate or refine ongoing adaptation activities.

Additionally, adaptation activities may accommodate the uncertainty of a parameter's optimal value by setting:
  (a) a search range for the parameter; and
  (b) a confidence with which the final value is believed to be known, respectively.

The parameters of the scenario model selected for adaptation may be those that are judged by the user (a) to most likely be in error and/or (b) to be known with the lowest confidence. The user may provide information about which parameters are well known, and which are not. Scenario model parameters that may have a strong impact on the accuracy of propagation and scenario calculations include, but are not limited to Tx and Rx antenna gains, relative heights, relative ranges, and transmitter power levels.

Adaptation of the scenario model can also be used to remove discrepancies between measured and predicted power levels arising from such factors as non-flat terrain (road surface curvature), incorrect signal processing gain values used in the model (e.g. Tx, Rx antenna gains, Tx power, etc.), incorrect range values used in the model, errors in estimated road surface type, and/or incorrect antenna height values used in the model.

Curvature of the road surface, i.e. hills or valleys, can significantly affect propagation between the ECM transmit antenna 104 and a receiving antenna. This is due to the following:

1: The effective height of potential threats relative to the effective height of the ECM system is a strong factor in determining multi-path interference between direct and indirect (i.e. reflected) signals.

2: If a ray tracing approach is used to perform multi-path calculations, the effective heights of both the transmitter and receiver are determined by the location and orientation of a tangent plane at the point of specular reflection between the transmit and receive antennas.

3: The road surface curvature partially determines the location and orientation of the tangent plane.

If the road surface is curved, the height of the ECM system, the height of the sensor, or the height of the potential threat at a remote location could be incorrectly represented in the scenario model 630. However, in some embodiments, the time history of model adaptations plus known/predicted/measured road curvature could be used to obviate or assist this aspect of the scenario model 630 adaptation algorithm.

Use of Pilot Signals:

In some embodiments, so-called pilot signals are used to determine the optimal value of selected parameters in the scenario model. The definition of pilot signal presented previously is repeated here for convenience: a pilot signal is a signal transmitted by the ECM system 102, and whose purpose is to provide information about the characteristics of the communication channel through which the ECM signals propagate. There are two ways pilot signals may be used:
  (i) to assist heuristic methods in determining optimal parameter values, and
  (ii) to resolve selected parameter ambiguities.

When used with the heuristic methods for parameter estimation, the pilot signals are used with a cost function to adapt selected parameters in the scenario model 630 until the cost is minimized or reduced to an acceptable level. The cost, which drives the parameter adaptation, is calculated from the difference between the predicted and the measured pilot signal powers.

Figure 8:
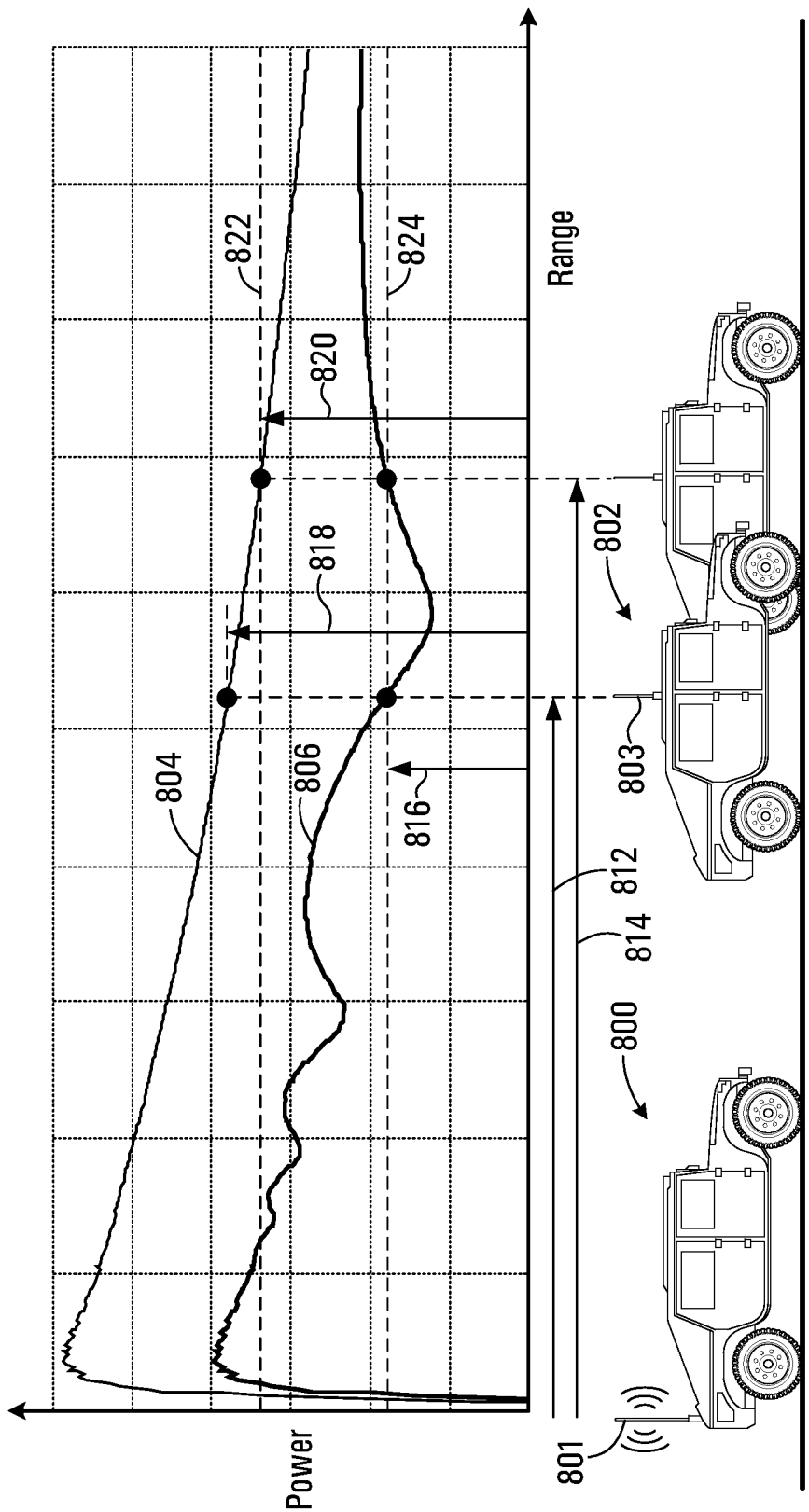
FIG. 8 is an example plot of the variation of received power with frequency for a fixed transmitter position and a variable sensor position for two pilot signal frequencies showing the hypothetical condition in which the same power is received at two different ranges for one pilot frequency, and that this ambiguity may be resolved by referring to the received power at another pilot signal frequency in accordance with an embodiment of the present invention.

When used to resolve parameter ambiguities, the measured pilot signal power levels are compared with predicted values based on one or more possible parameter values. An example of the use of two pilot signals is shown in FIG. 8 for a truck-mounted ECM jamming system 800 with transmit antenna 801 and a truck-mounted sensing device 802 with receive antenna 803. The propagation model and power measurements at multiple frequencies may reduce the range of possible propagation geometry parameters (heights, range, surface curvature, surface type), and in some cases may provide a unique determination of the propagation geometry.

Examples are presented in following sections of the use of pilot signals to:
  (i) possibly resolve range ambiguities;
  (ii) possibly resolve height ambiguities;
  (iii) possibly recognize and accommodate road surface curvature; and
  (iv) possibly identify unrecognized road conditions which could decrease the confidence of the ECM protection range prediction.

In some embodiments, the pilot signals may be present and used in the one or more of the following ways:
  (i) several pilot signals are present and used simultaneously; and
  (ii) a single pilot signal is present and used whose frequency is varied continuously or discretely in time.

Both implementations are equivalent to using the frequency diversity of pilot signals to (a) narrow the range of uncertainty of the final estimated value of selected scenario parameters in the scenario model 630, and (b) improve the confidence of the final estimated values.

In general, as more frequency diversity is used the uncertainty in the final estimated values of adapted scenario parameters becomes less, and the confidence becomes greater. The case of a single pilot signal with variable frequency is discussed in greater detail in a following section with reference to FIGS. 17A-20D.

In some embodiments, pilot signals are radiated in an implementation- and scenario-specific pattern in frequency and amplitude (and possibly also phase) in order to improve the accuracy and confidence of the final parameter values, including for example (a) the geometry of the propagation environment, and (b) material over which the signal propagates. For example, the set of pilot signal frequencies may be chosen and adjusted in order to confirm the location of predicted multipath nulls and/or power peaks at the device sensor antenna 108, to test specific hypotheses regarding transmitter-receiver range, transmitter antenna height, and sensor antenna height, as well as to test hypotheses regarding the variability of selected scenario model parameters a discussed below in association with FIG. 16A and FIG. 16B.

The frequency, amplitude or phase pattern may be (a) pre-scripted, i.e. determined a priori for use under certain recognizable field conditions, or (b) adaptive in time, for example the frequency of one or more pilot signals may be varied in time in order to probe the characteristics of the communication channel between the ECM transmit antenna 104 and the sensor antenna 108. An example is presented in the discussion of FIG. 10 above to justify pre-scripted or adaptive pilot signal frequency selection. A more detailed discussion of pilot signal frequency adaptation is presented below.

Pilot Signal Frequency Adaptation:

Pilot signals at a plurality of frequencies can be used with heuristic methods to find model parameters that more closely match the measured and predicted pilot signal power levels.

Figure 13A:
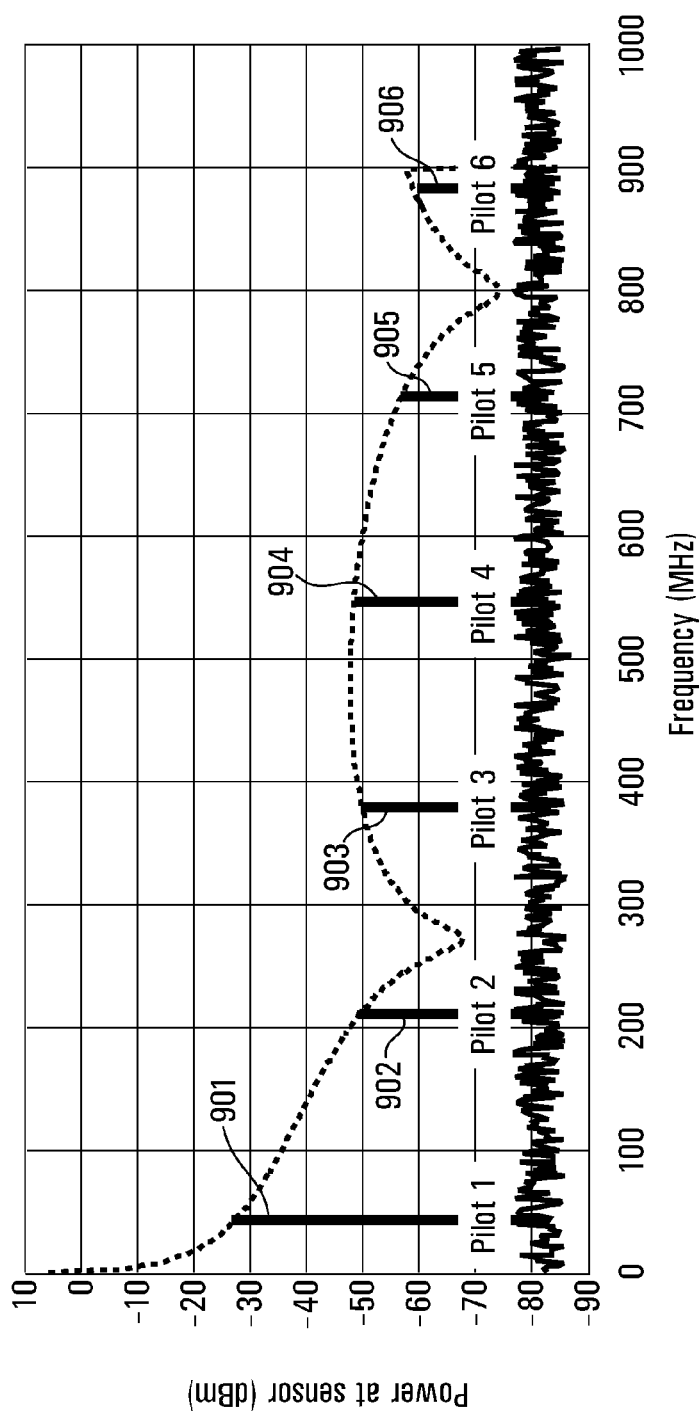
FIG. 13A is an example plot of predicted power at a device sensor antenna versus frequency for an example set of six pilot signals at equally spaced frequencies in accordance with an embodiment of the present invention.
Figure 13A:
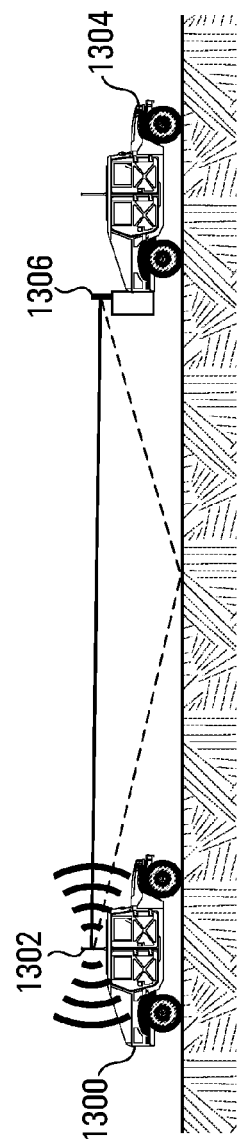
Figure 13B:
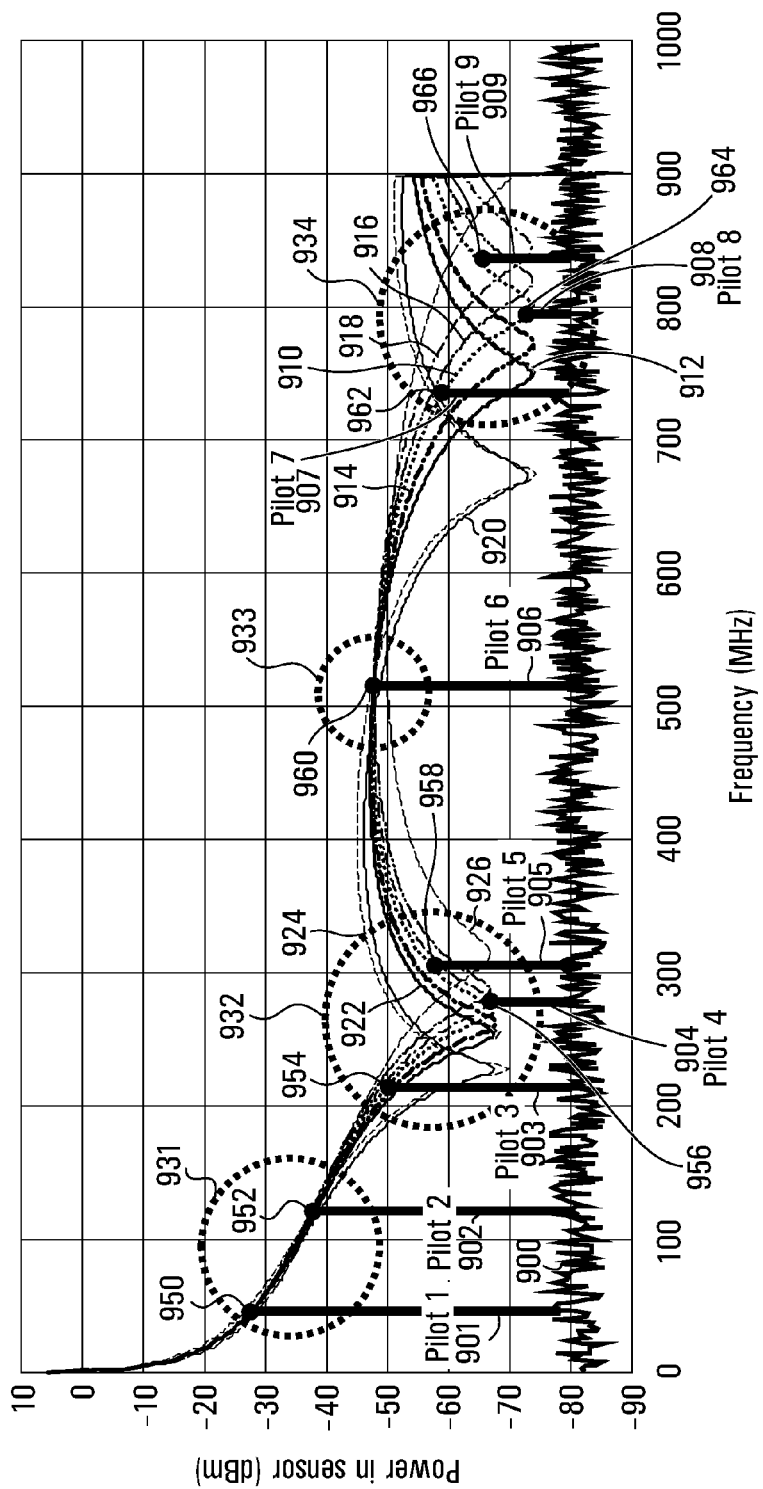
FIG. 13B is an example plot of predicted power at a device sensor antenna versus frequency subsequent to adaptive adjustment of the pilot signals shown in FIG. 13A in accordance with an embodiment of the present invention.
Figure 13B:
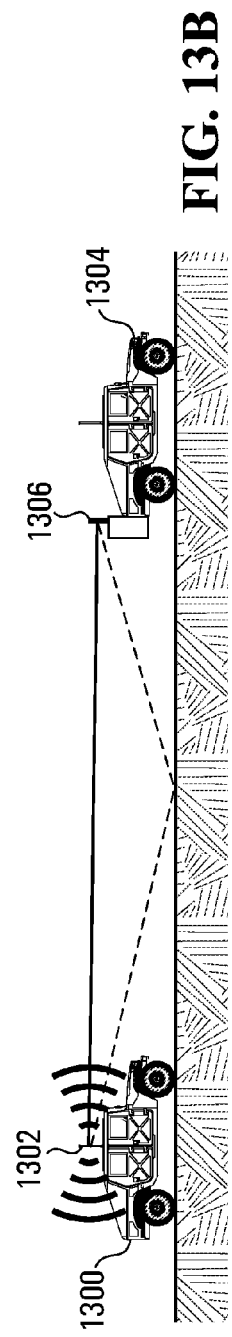

In some embodiments, pilot signal selection is adaptive. An example of adaptive pilot signal selection is illustrated in FIGS. 13A and 13B for a scenario in which an ECM transmit antenna 1302 is located on a first convoy truck 1300 and a device sensor antenna 1306 is located on a second convoy truck 1304 physically remote from the first convoy truck. FIG. 13A illustrates the predicted power at the device sensor antenna 1306 versus frequency for an example set of six pilot signals 901-906 at equally spaced frequencies that might be initially selected. FIG. 13B illustrates the adaptive adjustment of the pilot signals shown in FIG. 13A, i.e. the adjustment of the center frequencies of the six pilot signals 901-906 and the addition of three new pilot signals 907-909.

In addition to the pilot signals 901-906, FIG. 13B also illustrates the predicted received ECM spectral powers 910-926 for nine different parameter sets for the scenario model. The scenario model parameter set for which the measured pilot signal power levels 950-966 most closely match the predicted pilot signal power levels 901-909 represents the optimal set of model parameters for predicting the ECM protection range.

In the example of FIG. 13B the calculated ECM spectrum 910 most accurately predicts the measured powers for the nine pilot signals 901-909. The other predicted ECM spectra 912-926 include some error in one or more of the model parameters, and do not as accurately predict the measured pilot signal powers 950-966 for each of the pilot signals 901-909. Specifically, calculated power spectra 912, 914, 916 and 918 are the result of an error in the range parameter of −3 m, −1.5 m, +1.5 m and +3 m from the true range, respectively, calculated power spectra 920 and 924 are the result of an error in the sensor height parameter of 0.1 m and +0.1 m, respectively, and calculated ECM spectra 922 and 926 are the result of an error in the ECM system height parameter of +0.2 m and −0.2 m, respectively.

As noted above, FIG. 13B illustrates an example of how the selection of the pilot signals might be adaptively adjusted, i.e., how pilot signal frequencies may be changed and/or new pilot signals may be added, and the power levels monitored, in order to confirm the multipath solution by refining the model parameter selection. In some embodiments, adaptively adjusting the pilot signal selection may involve (a) direct, (b) indirect or (c) no communication between the device sensor and the unit that injects the pilot signals into the ECM antenna(s), in order to synchronize the frequencies of the transmitted pilot signals with the pilot signal frequencies predicted by the device 106.

Examples of direct communication include infrared, acoustic, vibration, or radio frequency communications links.

An example of indirect communication link is the use of an external timing reference such as is provided by the Global Positioning System.

An example in which said synchronization is achieved with no communication between the sensor device and the unit that injects the pilot signals might be when a pilot signal acquisition capability is included in the implementation of the sensor device, i.e. the device scans certain frequency bands to acquire a preset number of pilot signals, possibly identified from background signals and made resistant to hostile jamming by frequency or phase modulation.

In FIG. 13B, the pilot signals 901-909 have been arranged in the frequency spectrum in order to accommodate potentially conflicting requirements such as for example (i) maximize the signal-to-noise ratio of the pilot signal and (ii) distinguish the power level predictions of various candidate scenario parameter sets.

In the example of FIG. 13B, pilot signal frequencies have been selected such that (a) more pilot signals are located in a region 931 where the predicted power levels 901-903 are substantially different from one another, (b) more pilot signals are located in regions 932 and 934 where a relative null is predicted, and (c) fewer pilot signals are located in a region 933 where the predicted power 906 is relatively invariant with frequency. For example, only a single pilot signal 906 is used to define the region 933, whereas three pilot signals 907-909 are used to define the region 934 in which many of the predicted spectra 910-926 have propagation "nulls". With more pilot signals, there are more points to fit the predicted spectra to in order to determine a more accurate set of model parameters.

The results shown in FIGS. 13A and 13B are provided by way of example only, and should not be construed as limiting. It should be appreciated that the variation in the predicted ECM spectrum due to parameter variation is dependent on the specific propagation and scenario model used, and measured power levels to which the predicted power levels depend on various and sundry field conditions. Results different from that shown in FIGS. 13A and 13B may be obtained under the same or different circumstances.

Pilot Signals Used to Resolve Range Ambiguity:

In FIG. 8, a graph is presented comprising two curves of predicted received signal power at a sensing device antenna 803 vs. range from the ECM transmit antenna 801 to the sensing device 802. The curves 804 and 804 are generated using a propagation model which uses parameters provided by a scenario model. The first curve 804 represents received power predicted for a pilot signal frequency of 200 MHz. The second curve 806 represents received power predicted for a pilot signal frequency of 1800 MHz.

To illustrate the resolution of a range ambiguity, consider first the received power curve 806 for 1800 MHz in FIG. 8. The received power at a first range 812 is indicated at 816. According to the propagation model used to create the 1800 MHz curve 806, the received power 816 is also observed at a second range 814.

The prediction of an identical power level 816 at 1800 MHz at two different ranges 812 and 814 represents a range ambiguity, i.e. at 1800 MHz there are two ranges 812 and 814 which result in a single value of predicted power 816. To resolve this ambiguity, consider the received power curve 804 for 200 MHz.

The received power at the first range 812 predicted for 200 MHz is indicated at 818, and at the second range is indicated at 820. The power levels 818 and 820 are not equal. If the predicted powers at 1800 MHz and 200 MHz are considered as a data pair valid for a single range between the transmit antenna 801 and the receive antenna 803, then the prediction pair 816 and 818 at the first range 812 is distinct from the prediction pair 816 and 820 at the second range 814. Because the prediction pairs are distinct in range, the range ambiguity in the predicted power 816 at 1800 MHz is resolved.

In the example presented in FIG. 8, measured pilot signal power at 200 MHz 822 and at 1800 MHz 824 most closely match the prediction pair 816 and 820 at the second range 814, revealing that the second range 814 is the best estimate of the true range between the transmit antenna 801 and the receive antenna 803.

Pilot Signals Used to Resolve Height Ambiguity:

Pilot signals at different frequencies may be similarly used to resolve ambiguities in receiver or transmitter heights. In a manner analogous to that described for range ambiguities, it is possible that two height values for a transmit or receive antenna may produce the same power level at a receive antenna at a single pilot signal frequency. As an example of this, consider FIGS. 10A and 10B.

Figure 10A:
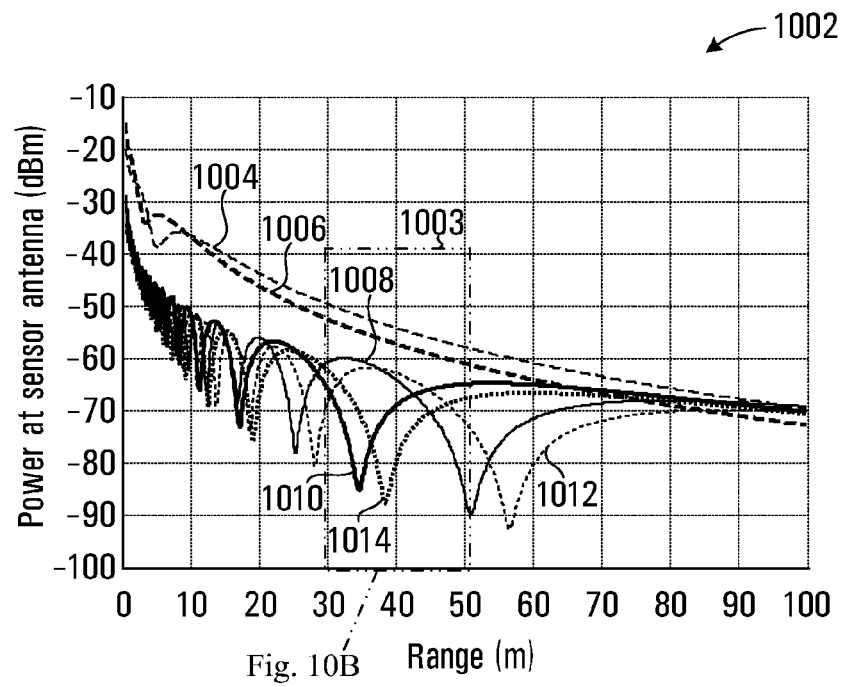
FIG. 10A is an example plot of power received at a device sensor antenna versus range for pilot signals at three frequencies and two candidate heights of an ECM transmit antenna in accordance with an embodiment of the present invention.

FIG. 10A is a graph 1002 of power received at a device sensor antenna versus range for pilot signals at three frequencies and two candidate heights of an ECM transmit antenna. An enlargement 1003 of a portion of the graph 1002 is presented in FIG. 10B for clarity. The graphed lines presented in graphs 1002 and 1003 were calculated using a propagation model with parameter set from a scenario model in which the device sensor antenna height is 1.70 m. Curves representing calculated power at the device sensor antenna vs. range are presented in graphs 1002 and 1003 for the following cases:

1004-200 MHz pilot signal, transmitter antenna height of 2.50 m;
1006-200 MHz pilot signal, transmitter antenna height of 1.70 m;
1008-1800 MHz pilot signal, transmitter antenna height of 2.50 m;
1010-1800 MHz pilot signal, transmitter antenna height of 1.70 m;
1012-2000 MHz pilot signal, transmitter antenna height of 2.50 m; and 1014-2000 MHz pilot signal, transmitter antenna height of 1.70 m.

Figure 10B:
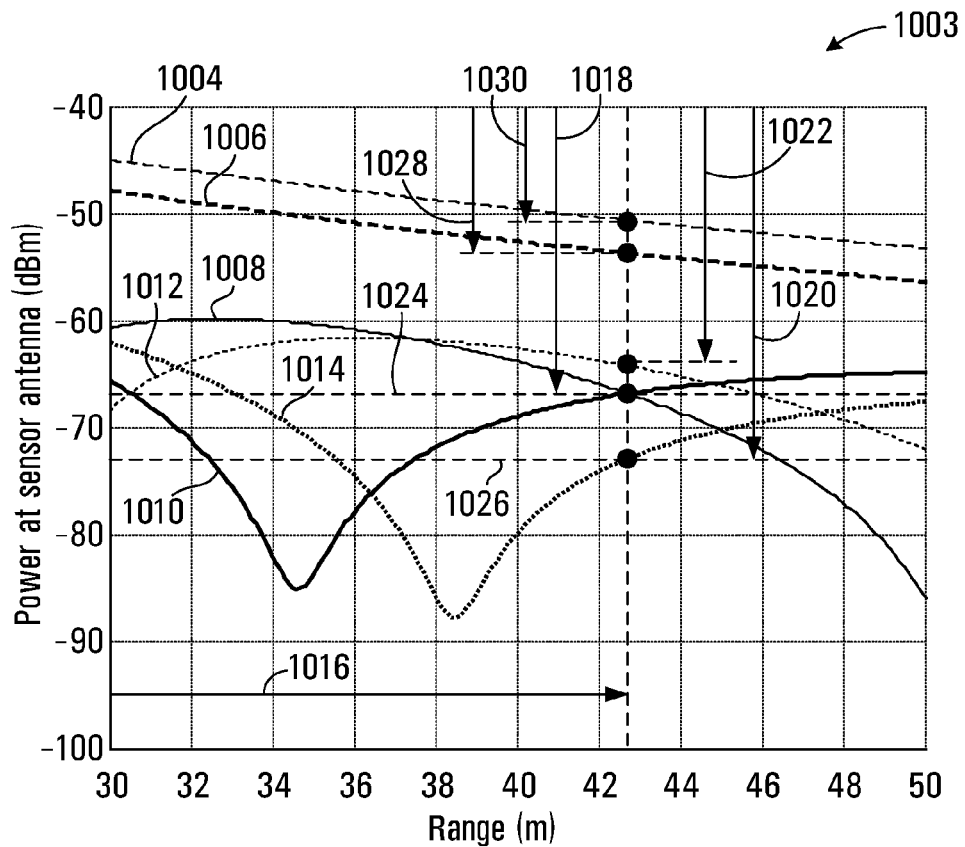
FIG. 10B is a more detailed plot of a portion of the plot shown in FIG. 10A.

In the example of FIGS. 10A and 10B, the power of the 1800 MHz pilot signal at the device sensor antenna at 42.7 m range 1016 is predicted to be −66.5 dBm, generally indicated at 1018, for both candidate transmit antenna heights, i.e. as indicated by the 1800 MHz 2.50 m curve 1008 and the 1800 MHz 1.70 m curve 1010. Because a single power measurement value 1018 is predicted at 1800 MHz for the two different transmit antenna heights, the predicted power level 1018 does not unambiguously determine the height of the transmitter antenna.

This ambiguity can be resolved if a second pilot signal is used. To illustrate this ambiguity resolution, consider the predicted power in the device sensor antenna at 2000 MHz. The predicted received power 1014 for a transmitter antenna height of 1.70 m at a range of 42.7 m is −73 dBm 1020. The predicted received power 1012 for a transmitter antenna height of 1.70 m is −64 dBm 1022. If the predicted powers at 1800 MHz and 2000 MHz are considered as a prediction pair for a sensor range of 42.7 m, then predicted powers for the two Tx height cases 2.50 m and 1.70 m are distinct and the ambiguity is resolved. In the example presented in FIGS. 10A and 10B, measured pilot signal power at 1800 MHz 1024 (−66.5 dBm) and at 2000 MHz 1026 (−73 dBm) most closely match the prediction pair 1018 (−66.5 dBm) and 1020 (−73 dBm) at a range of 42.7 m, revealing that a 1.70 m height is the best estimate of the true ECM transmitter height 113.

The example presented in FIGS. 10A and 10B illustrates a secondary point regarding the selection of pilot signal frequency: that some choices of pilot signal frequency may be better than others for (for example) the purpose of resolving parameter ambiguities. Consider the case in which the frequency of the second pilot signal is chosen to be 200 MHz instead of 2000 MHz. At 42.7 m range 1016 the predicted signal power for an ECM transmitter antenna height of 2.50 m is −50.8 dBm 1030 and the predicted power for an ECM transmitter antenna height of 1.70 m is −53.5 dBm 1028. The difference between the predicted power for the 2.50 m case 1028 and the 1.70 m case 1030 is 2.7 dB. Considering the case presented above where the second pilot signal frequency is 2000 MHz, the difference between the predicted power for the 2.50 m case 1020 (−73 dBm) and the 1.70 m case 1022 (−64 dBm) is 9 dB.

If the accuracy of the measured pilot signal powers is of the order of the power difference predicted for the two heights (e.g. +−2 dBm), then in the example of FIGS. 10A and 10B the use of a second pilot signal at 200 MHz may be less suitable than a pilot signal at 2000 MHz, and may be unsuitable for resolving the ambiguity altogether. This effect may also be seen if pilot signal frequencies are whole number multiples of each other, e.g. parameter ambiguities for a pilot signal at 1800 MHz may be identical to some or all of those for pilot signal at 900 MHz. For this reason, pre-scripted pilot signal frequencies and amplitudes, and adaptive selection of pilot signal frequencies and amplitudes, may be implemented in some embodiments.

Effect of Road Surface Curvature:

Under certain conditions it is possible to use the measured power of pilot signals at different frequencies to detect and/or estimate road surface curvature. Provided that propagation conditions exist in which a ray tracing propagation model is valid, and provided that a model of road curvature applies to the field conditions (e.g. a singly curved concave or convex surface) the effect of road curvature is to alter the effective height of the ECM transmitter antenna and/or the effective height of the device sensor antenna.

Figure 11A:
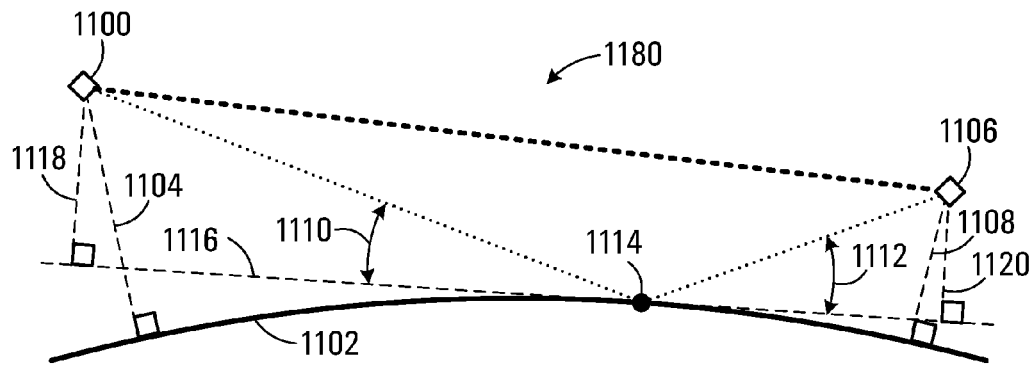
FIG. 11A is a diagram of geometries associated with propagation model parameters in a scenario with a convex road surface in accordance with an embodiment of the present invention.
Figure 11B:
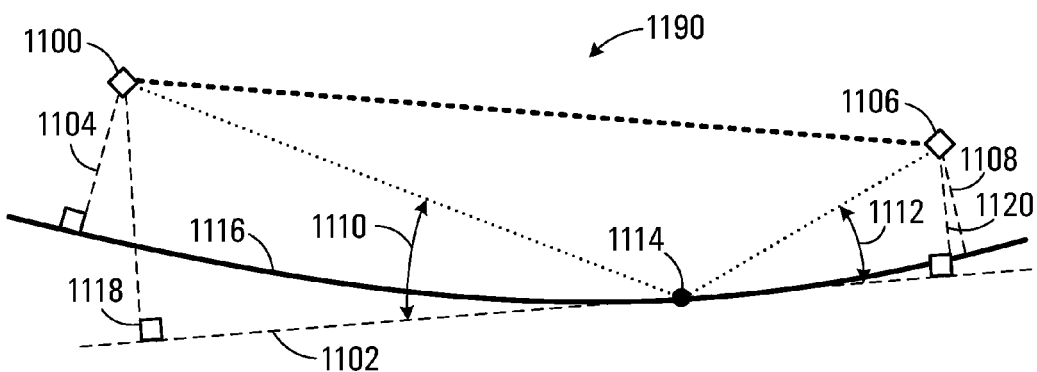
FIG. 11B is a diagram of geometries associated with propagation model parameters in a scenario with a concave road surface in accordance with an embodiment of the present invention.

Referring to FIGS. 11A and 11B, consider two hypothetical cases: (i) a convex road surface 1180, as illustrated in FIG. 11A, and a concave road surface 1190, as illustrated in FIG. 11B. The physical height of a transmit antenna 1100 above the curved road surface 1102 is indicated at 1104, and the physical height for a receiver antenna 1106 is indicated at 1108.

According to a ray tracing propagation model, the interaction of the direct and reflected or multi-path signals over a curved surface can be represented by transforming the curved surface propagation problem into a flat plane propagation problem. This can be accomplished by applying Snell's Law (i.e. equal angles of incidence 1110 and reflection 1112 at the ray reflection point 1114) at a plane 1116 which is tangent to the curved road surface 1102 point of reflection 1112. The transmitter antenna 1100 is at an effective height 1118 above the tangent plane, and the receiver antenna 1106 is at an effective height of 1120 above the tangent plane. In these cases, the effect of road curvature may be determined by using multiple pilot signals in the manner already described for height ambiguities, referring to FIGS. 10A and 10B and the discussion related to FIGS. 10A and 10B.

The use of Snell's Law to transform a curved surface propagation problem into a flat plane propagation problem is described in Hirsch, H. and Grove, C.; Practical Simulation of Radar Antennas and Radomes, Artech House, 685 Canton St., Norwood, Mass. USA 02062, 1987, ISBN 0-89006-237-4, p. 189, which is hereby incorporated by reference in its entirety.

Detection of Unrecognized Propagation Conditions:

Under certain conditions it may not be possible to create a scenario model which matches the current operating conditions, i.e. there may be no set of scenario parameters which match the operating conditions sufficiently well to produce an adequately confident estimate of ECM protection range. Such conditions could include, but may not be limited to, any or all of the following:

(i) an unrecognizably irregular road surface, i.e. a road surface which is topologically distinct from the class of road surfaces which can be represented by parameter sets in the scenario model, for example a multiply curved surface which may not be adequately represented by a singly curved surface or a flat surface;

(ii) the presence of spurious transmitters in the environment;

(iii) the presence of spurious scatterers in the environment; and (iv) defects or alterations in ECM- or device-related equipment.

It may be possible for a sensor device in accordance with an embodiment of the present invention to detect, and in some cases identify, the existence of such conditions and take remedial action, for example, issue a warning to the user(s).

Figure 12A:
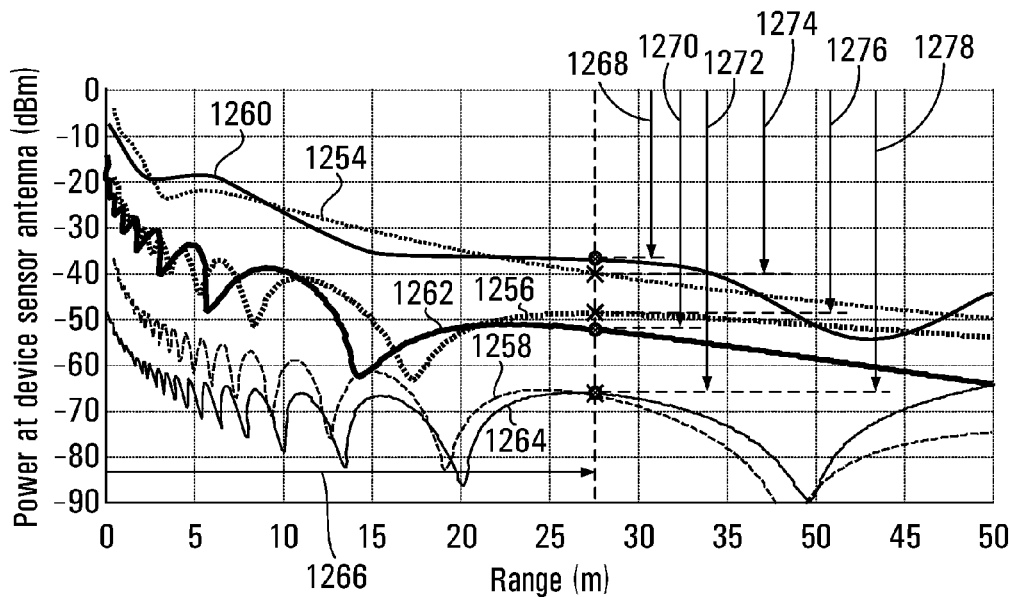
FIG. 12A is an example plot of pilot signal power in a device sensor antenna versus range from an ECM system transmit antenna for multiple pilot signal frequencies and a variety of propagation model parameter candidate sets in accordance with an embodiment of the present invention.
Figure 12B:
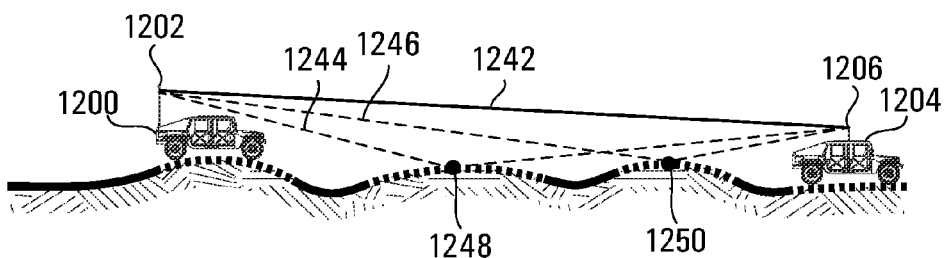
FIGS. 12B and 12C are example diagrams of geometries associated with the propagation model parameter candidate sets used to determine the received pilot signal power illustrated in FIG. 12A.
Figure 12C:
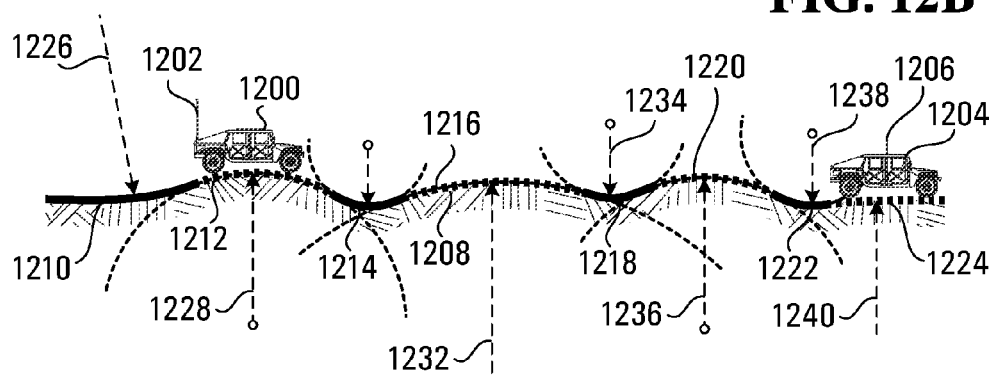

As an illustration of this, consider FIGS. 12A, 12B and 12C. FIGS. 12B and 12C include the following principal features:

1. A vehicle 1200 equipped with an ECM system 102 and ECM transmit antenna 1202.
2. A vehicle 1204 equipped with the device 106 and device sensor antenna 1206.
3. An irregular road surface 1208 comprising a series of road surface segments 1210-1224 whose shape in each case is represented by a segment of the circumference of a circle having a specific radius 1226-1240 respectively.

A single direct propagation 1242 path is shown separately for clarity in FIG. 12B, together with two hypothetical indirect propagation paths 1244 and 1246 corresponding to specular reflection points 1248 and 1250, respectively.

A hypothetical graph is presented in FIG. 12A representing pilot signal power in the device receiver antenna 1206 versus range, comprising several curves:

(i) predicted pilot signal power 1254 for a pilot signal at a first frequency, assuming a flat road surface;

(ii) predicted pilot signal power 1256 for a pilot signal at a second frequency, assuming a flat road surface;

(iii) predicted pilot signal power 1258 for a pilot signal at a third frequency, assuming a flat road surface;

(iv) actual pilot signal power 1260 for a pilot signal at a first frequency;

(v) actual pilot signal power 1262 for a pilot signal at a second frequency; and (vi) actual pilot signal power 1264 for a pilot signal at a third frequency.

Consider an example test range 1266. The predicted pilot signal power levels at the three pilot signal frequencies are 1268, 1270 and 1272 respectively, based on curves 1254, 1256 and 1258, respectively.

The pilot signal power levels observed at the test range 1266 are 1274, 1276 and 1278 respectively based on the actual pilot signal power curves 1260, 1262 and 1264 respectively. There are discrepancies between the measured and predicted pilot signal power levels at the test range 1266.

For the purposes of this example, the pilot signal power measurement error is assumed to be smaller than the discrepancies between the predicted and measured pilot signal power levels. Under these conditions, the device 104 may indicate to an operator by a suitable signal that unrecognized conditions have been sensed, i.e. the characteristics of the discrepancies between the predicted and measured pilot signals are sufficient to indicate a high probability of unrecognized operating conditions, which in the example of FIGS. 12A, 12B and 12C arises from an irregular road surface, and consequently the confidence of the ECM protection range prediction is reduced.

Following the example of FIGS. 12A, 12B and 12C further, if a scenario model can be used which allows for two (or more) specular reflection points, it may be possible for a sensor device in accordance with an embodiment of the present invention to deduce the correct scenario model for the operating conditions, increasing the confidence of the ECM protection range prediction.

ECM Fault/Anomaly Detection:

In some embodiments, a comparison of measured and predicted ECM spectra is used to generate a spectrum mismatch cost. The mismatch cost may indicate excessive or insufficient ECM power relative to the expected ECM power as established for example by (a) specifications published by the manufacturer of the ECM equipment and/or (b) the believed performance of the scenario parameter estimation calculations and/or (c) unexpected irregularities in the propagation environment such as for example occlusion of the ECM transmit antenna from the sensor antenna by another vehicle or vehicles, the presence or sudden appearance of hill(s), ditch(es), vehicles, or man-made object(s) as the ECM vehicle moves through terrain.

If the mismatch cost function exceeds a threshold value, a fault and/or anomaly may be indicated. A fault is defined as a state in which the measured ECM spectral power is significantly below the predicted minimum value, for example, a state in which the predicted ECM radio frequency power over a spectral window is below the predicted value by a margin which may be user-defined or calculated by the sensor device. The definition of an anomaly is identical to that of a fault except the measured power significantly exceeds the predicted maximum value over a spectral window, by a similarly defined margin. This is illustrated qualitatively in FIG. 9.

Figure 9:
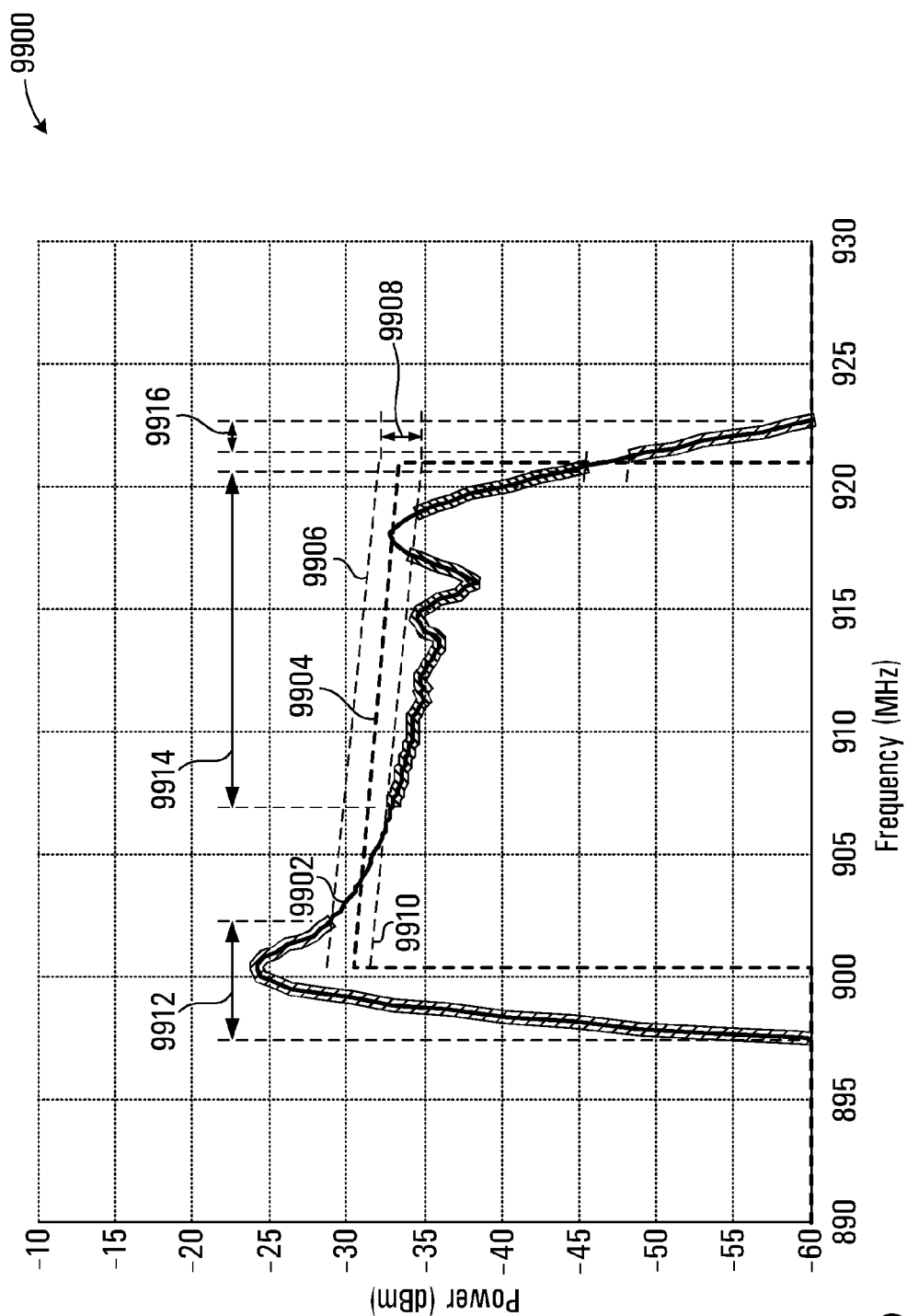
FIG. 9 is an example plot of radio frequency power vs. radio frequency for a scenario in which discrepancies between a measured radio frequency power and a predicted, minimum and/or maximum radio frequency power potentially indicate a fault/anomaly in accordance with an embodiment of the present invention.

FIG. 9 is a graph 9900 of radio frequency power vs. radio frequency on which several graphed lines are presented. These lines include the following:

(a) measured power 9902 at a device antenna;

(b) predicted power 9904 at the device antenna as calculated by the device;

(c) the maximum power 9906 predicted at the device antenna as calculated by the device based on the predicted variability 9908 of the predicted power 9904 where the variability 9908 is derived for example from the ECM manufacturer's specifications and the calculated cumulative effects of various and sundry uncertainties in the scenario model; and (d) the minimum power 9910 at the device antenna defined similarly as the maximum power 9906.

In the example of FIG. 9, the following fault and anomaly regions are evident:

(i) two regions of anomaly 9912 and 9916, in which the measured ECM power is greater than the predicted ECM power by a margin greater than, for example, half the calculated power variability 9908; and (ii) one region of fault 9914 in which the measured ECM power is less than the predicted ECM power by a margin greater than for example half the calculated power variability 9908.

In practice, the thresholds for maximum and minimum predicted ECM power may be statistically derived from one or more populations of predicted ECM power at the device sensor antenna, calculated from one or more populations of scenario parameter sets. These scenario parameter sets may be generated as described previously in Step 507B of the method illustrated in FIG. 5B. The maximum and minimum thresholds, as well as other curves derived from the population(s), may be calculated as described above with reference to Step 516B of the method illustrated in FIG. 5BB.

An example of the maximum and minimum thresholds derived from a population of scenario parameter sets is presented in FIG. 15. FIG. 15 shows an example plot of the variation of a measured ECM power 950 and several calculated ECM power levels as a function of frequency. The calculated power levels include the following:

(i) an ideal received power (no propagation loss) 962 at each frequency;

(ii) a best-case received power 954 at each frequency;

(iii) a worst-case received power 956 at each frequency;

(iv) a mean plus standard deviation received power 958 at each frequency;

(v) a mean minus standard deviation predicted power 960 at each frequency; and (vi) a mean predicted power 952 at each frequency.

In FIG. 15, the calculated power levels 952-962 are derived from a population of 26 predictions of the ECM spectrum at the device sensor antenna 108 in accordance with an embodiment of the present invention. For example, results such as those in FIG. 15 may be calculated after N number of repetitions of the method illustrated in FIGS. 5B and 5BB, where the best-case and worst-case ECM spectral powers are updated in Step 516B for each scenario parameter set. Statistical information on the measured and calculated ECM power levels, such as the results plotted in FIG. 15 may be more valuable to a community of supporting technical people rather than to the in situ end-users of a sensing device. For example, the information could be used in any or all of the following ways:

(i) Forensic Evidence: recorded continuously as forensic evidence to be used after an attack;

(ii) Trouble Shooting: used to either confirm the health of a given device unit, or to diagnose faults;

(iii) Trials Support: as a diagnostic tool in planning and executing proving trials to demonstrate operational readiness;

(iv) Product Development and Enhancement: during software and hardware product development; and (v) Marketing: to provide technical credibility that the device operates.

Parameter Uncertainty Estimation:

In some embodiments, a sensing device estimates not only the value of certain parameters in a scenario model, but also (a) assesses the suitability of the variation range (i.e. the uncertainty) assigned to the parameter(s) in the scenario model and (b) corrects the variation range if it is assessed to be unsuitable. A description of an example method by which this could be accomplished is presented below.

In order to accommodate uncertainty in various scenario parameters, the predicted power levels calculated by a sensing device may be average values based on a population of unique scenario model parameter sets, for example, ECM antenna height, sensor antenna height, ECM-sensor range, and ECM antenna gain. Each member of the population comprises a unique combination of values for these scenario parameters, created by a random assignment of scenario parameters based on the scenario model including (i) a nominal value for each parameter, and (ii) the variability assigned to each parameter. For example, the randomization of parameter values may be performed in a step similar to step 507B in FIG. 5B, and the average ECM power may be calculated in a step similar to step 516B in FIG. 5BB.

If the true scenario parameters produce a propagation null in the measured signal power at the device sensor antenna for a given pilot signal frequency there can be a large discrepancy between the mean predicted pilot signal power level and the measured pilot signal power level. This could potentially occur because only a specific and narrow range of parameters produces a relative propagation null, so most of the scenario parameter sets from which the mean power level is derived will not produce a null at the device sensor antenna. The effect of averaging over many possible scenario parameter sets results in an average predicted pilot signal power which is significantly higher than the measured value. If the measured power indicates that the device sensor antenna is in or near a propagation null, then a relatively large discrepancy between the measured and mean predicted pilot signal power levels may suggest that the variability of one or more scenario model parameters is excessively large.

Under certain circumstances it may be possible to reduce the discrepancy by adjusting the variability of various scenario model parameters without changing the nominal value of said parameters.

By this method it may be possible for the device to use the heuristic methods referenced previously or other methods to adaptively estimate the variability (uncertainty) of various scenario model parameters as well as the best estimate of their nominal value, particularly if pilot signal frequency is adapted, i.e. varied in a controlled manner to, for example, attempt to observe a propagation null at the device sensor antenna.

Figure 16A:
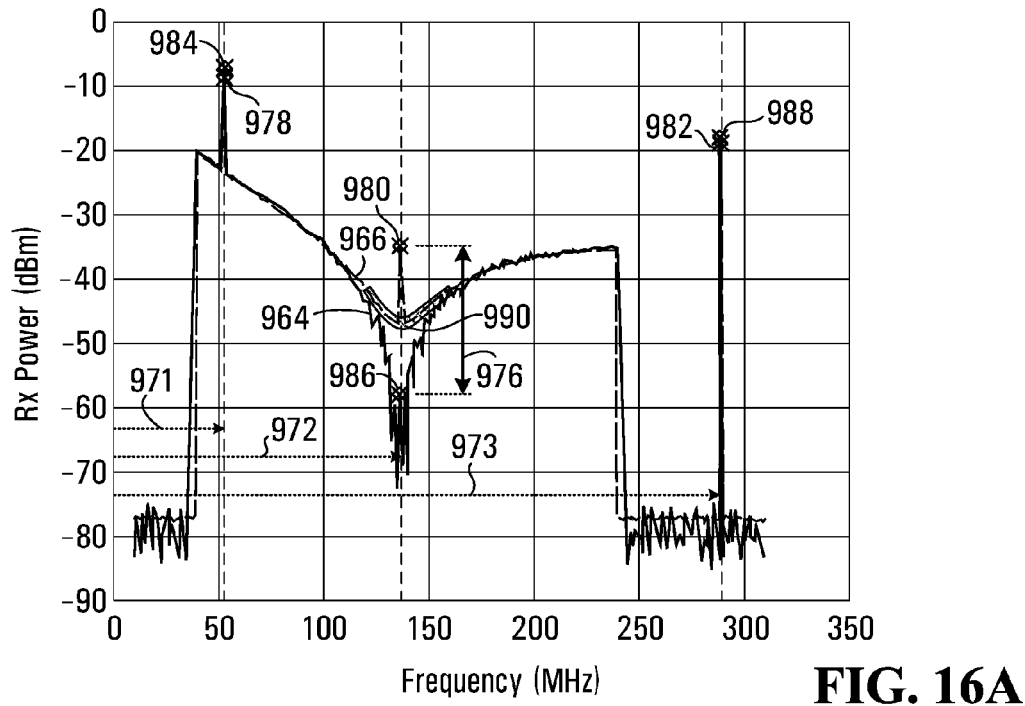
FIG. 16A is an example plot of a measured power level and an average calculated power level as functions of frequency, illustrating the discrepancy between measured and average predicted powers near a propagation null, caused by model parameter uncertainty, in accordance with an embodiment of the present invention.

FIG. 16A is an example plot of a measured ECM power spectrum 964 and an average calculated ECM power spectrum 966, each graphed as a function of frequency. The ECM spectrum includes pilot signals at three frequencies 971, 972 and 973. The measured ECM power spectrum 964 has a propagation null at the frequency 972 of one of the pilot signals. The calculated ECM power spectrum 966 in FIG. 16A is the average result for a sensor range uncertainty of +/−3 meters, with a uniform probability density function.

In general there is a discrepancy between the average calculated pilot signal powers 978, 980, 982 978 and the measured pilot signal powers 984, 986, 988 respectively. Consider the discrepancy 976 for the pilot signal frequency 972 for which, in this example, a propagation null occurs for the given set of scenario parameters. The discrepancy 976 (23 dB) between measured pilot signal power 986 (−58 dBm) and average pilot signal power 980 (−35 dBm) is large relative to that at the other pilot signal frequencies 971 and 973 (23 dB discrepancy compared with approximately 2 dB and 2 dB discrepancies respectively) because only narrow ranges of scenario model parameters produce power nulls. For this reason, the calculated average power levels may exhibit relative power minima 990 near nulls which exist for specific parameter sets but will not show well-formed power nulls if they are calculated from populations of candidate model parameter sets in which parameters vary across relatively broad value ranges.

The difference 976 between the measured 986 and calculated mean 980 pilot signal power levels may be reduced or eliminated by iteratively adjusting (a) nominal model parameter values and (b) the uncertainty associated with each parameter that is used to generate the population on which the average predicted power is based. By minimizing the difference between measured and average predicted power levels for each pilot signal, an estimate is obtained for each model parameter as well as the uncertainty associated with the estimate.

Figure 16B:
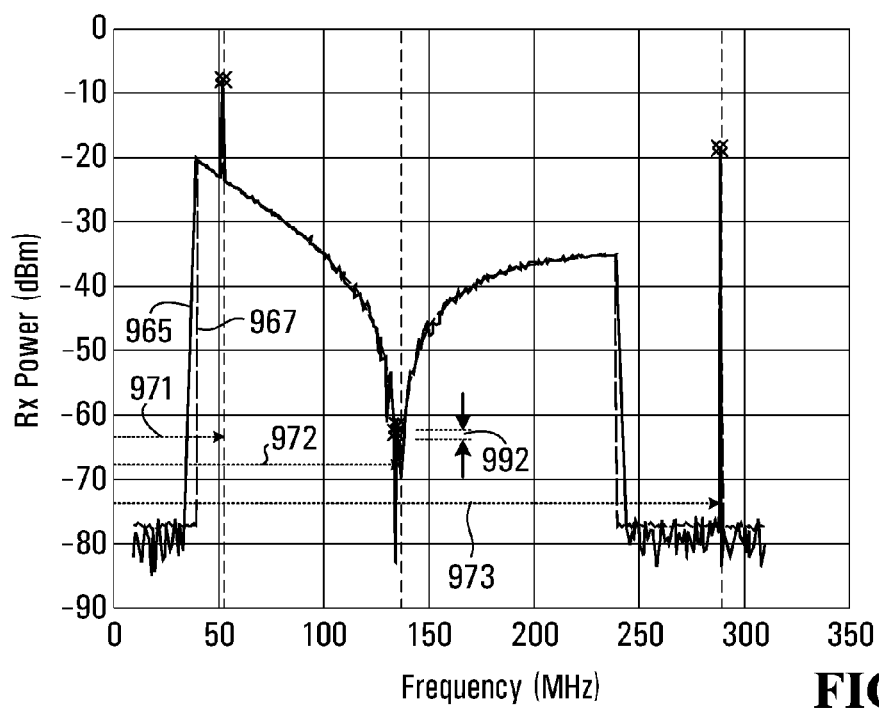
FIG. 16B is an example plot of a measured power level and an average calculated power level near a propagation null as functions of frequency, illustrating the effect that reducing model parameter uncertainties has on the agreement between measured and average predicted power levels in accordance with an embodiment of the present invention.

FIG. 16B shows an example plot of a measured ECM power level 965 and a calculated ECM power level 967 in which the discrepancy 992 at the pilot signal frequency 972 has been reduced by (i) adjusting the value of the sensor range parameter in the scenario model to match the true range value, and (ii) reducing the uncertainty associated with this parameter from +−3 m to +−0 m (i.e. no uncertainty).

Pilot Signal Frequency Variation:

In some implementations, only a single pilot signal is used at any moment, i.e., an ECM system generates only a single pilot signal that a sensing device in accordance with an embodiment of the present invention can use to characterize the propagation channel and refine the propagation and scenario model parameters.

In some embodiments, the centre frequency of the single pilot signal is varied in time either in discrete steps or continuously. The purpose of this temporal frequency variation is to (a) refine the set of propagation model parameters which result in a model output that substantially matches the measurement observations at all frequencies, and (b) estimate the uncertainty in the best-estimate of each parameter based on the discrepancies between the measured and best-estimate predicted power.

Variation of the pilot signal frequency produces a profile of pilot signal power vs. frequency. Assuming the reflecting surface between the transmitter and receiver is flat, or locally flat at the single specular reflection point, this profile may be assumed to be unique for the physical attributes of the propagation channel, i.e., it is unique for a single combination of transmitter height, receiver height, transmitter-receiver range and surface type. For proper device operation the power vs. frequency profile need only be unique within the range of admissible scenario model parameter values. This range of values is application specific, e.g. if the observed pilot signal power corresponds to sensor heights of for example 1m, 25 m, 33 m, and 38 m and if, for example, sensor heights above 2 m are computationally inadmissible, then the measured pilot signal power effectively corresponds to a unique sensor height.

Figure 17A:
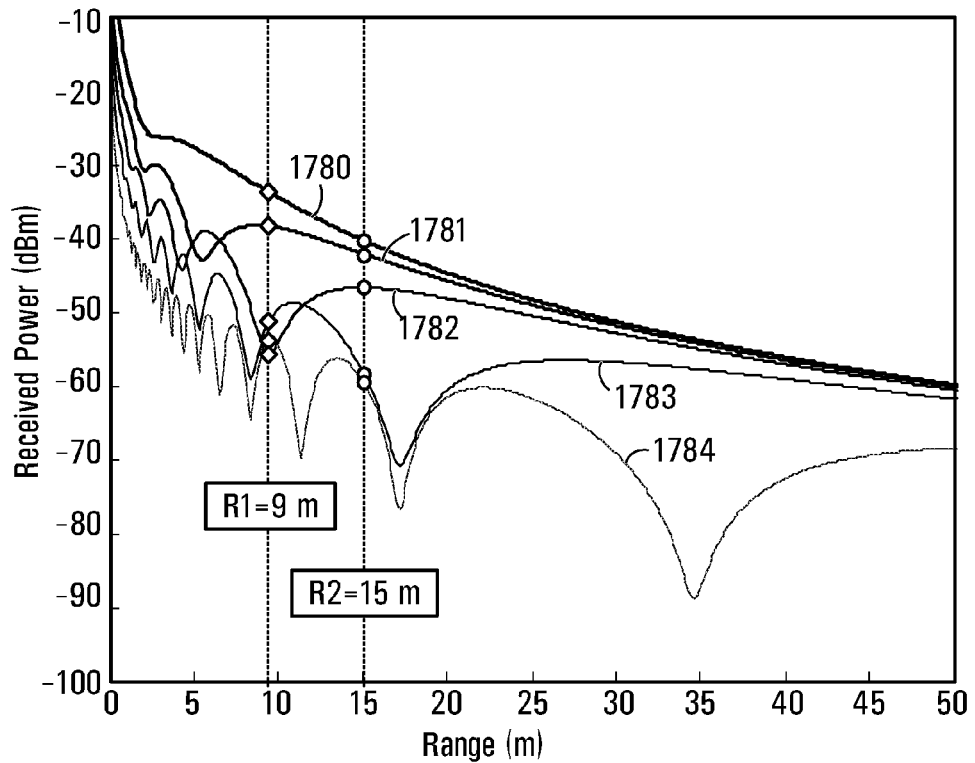
FIG. 17A is an example plot of five calculated power levels for five pilot signal frequencies as functions of range to an ECM system transmitter in accordance with an embodiment of the present invention.
Figure 17B:
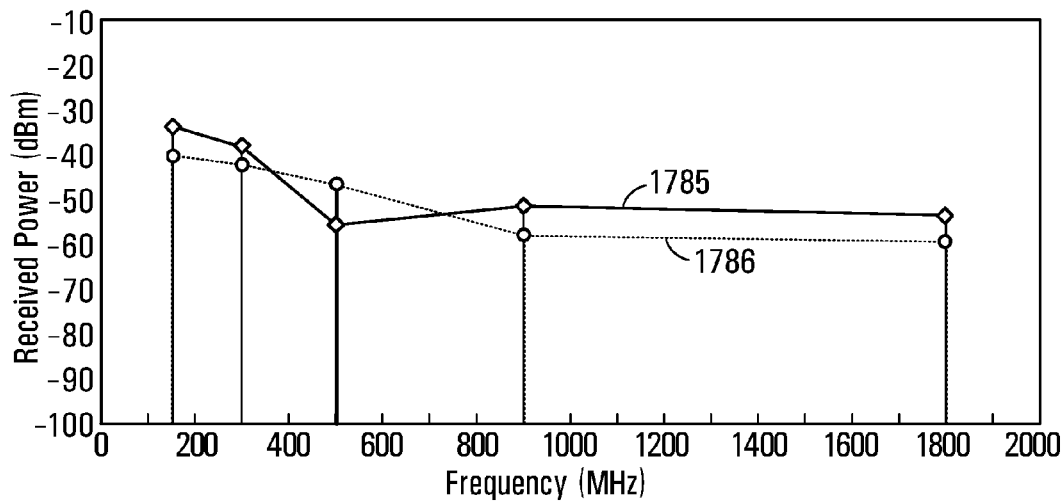
FIG. 17B is an example plot of two sequences of calculated power levels as functions of pilot signal frequency, for two range values in accordance with an embodiment of the present invention.

FIGS. 17A and 17B are example graphs showing the power profile at a device sensor antenna at five arbitrarily chosen frequencies as a function of transmitter-receiver range for a fixed transmitter antenna height of 1.7 m and a fixed device sensor antenna height of 1.7 m. Referring to FIG. 17A, the received power curves 1780, 1781, 1782, 1783, and 1784 correspond to pilot frequencies of 150 MHz, 300 MHz, 500 MHz, 900 MHz and 1800 MHz, respectively. FIG. 17B comprises an example plot of received powers 1785 and 1786 as a function of pilot signal frequency for two ranges R1=9 m and R2=15 m respectively. Differences between the two received power curves 1785 and 1786 indicate that the measurements were taken at different ranges. If the received power curves 1785 and 1786 are unique, i.e. no other combination of model parameters yields the same received power vs. pilot frequency result, and the bounds on the range parameter are set to include R1 and R2, then the received power vs. frequency results can be used to uniquely define a single set of propagation model parameters such that the model output matches the measurement observations at each pilot frequency.

Figure 18A:
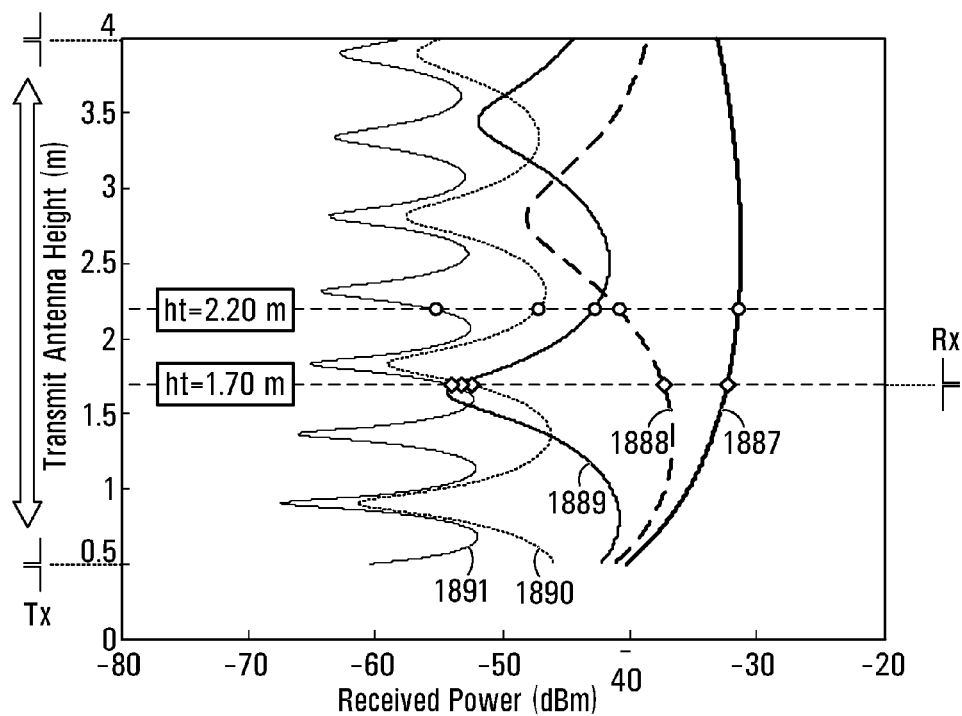
FIG. 18A is an example plot of five calculated power levels for five pilot signal frequencies as functions of ECM transmit antenna height in accordance with an embodiment of the present invention.
Figure 18B:
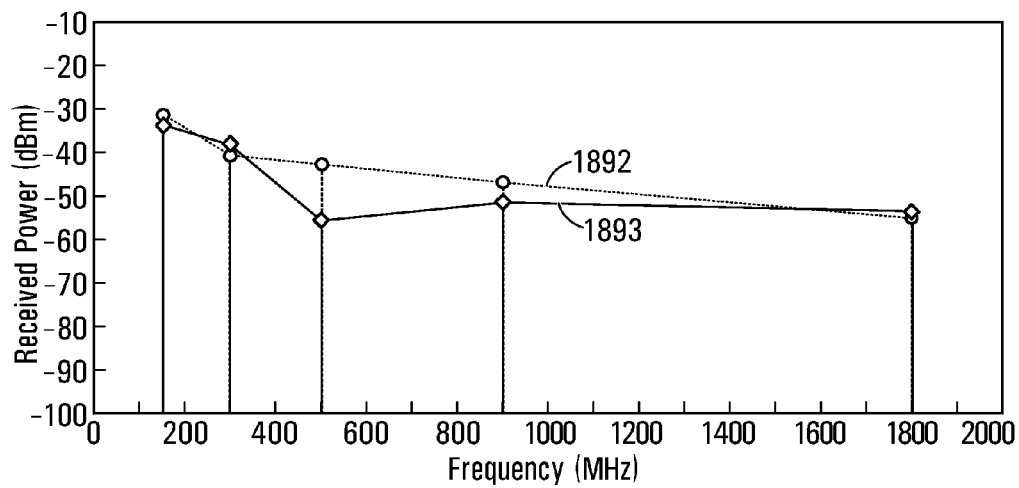
FIG. 18B is an example plot of two sequences of calculated power levels as functions of pilot signal frequency for two ECM transmit antenna heights in accordance with an embodiment of the present invention.

A similar example for transmitter antenna height variation is presented in FIGS. 18A and 18B. FIG. 18A comprises received power curves 1890, 1891, 1892, 1893 and 1894 as a function of transmit antenna height for pilot signal frequencies corresponding to 150 MHz, 300 MHz, 500 MHz, 900 MHz and 1800 MHz, respectively. FIG. 18B is an example plot of received power 1892 and 1893 vs. pilot signal frequency at two transmit antenna heights corresponding to 2.2 m and 1.7 m, respectively, taken from the received power curves 1890, 1891, 1892, 1893 and 1894 of FIG. 18A. Because the curves 1892 and 1893 are distinct, they represent distinct observation sets for the two cases of transmitter antenna height.

If the admissible values of transmitter antenna height are suitably constrained in the scenario model according to a specific implementation of the device, then as described above for variation of transmitter-receiver range in FIG. 17A and FIG. 17B the observations are unique as well as distinct with respect to transmitter antenna height.

Figure 19A:
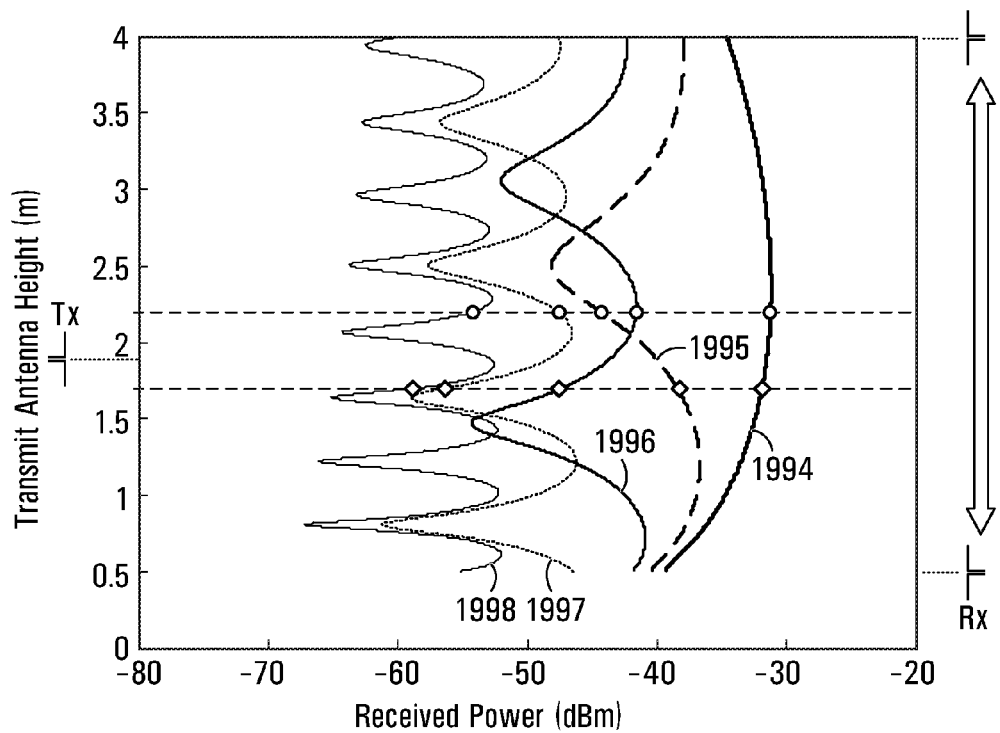
FIG. 19A is an example plot of five calculated power levels for five pilot signal frequencies as functions of receive antenna height in accordance with an embodiment of the present invention.
Figure 19B:
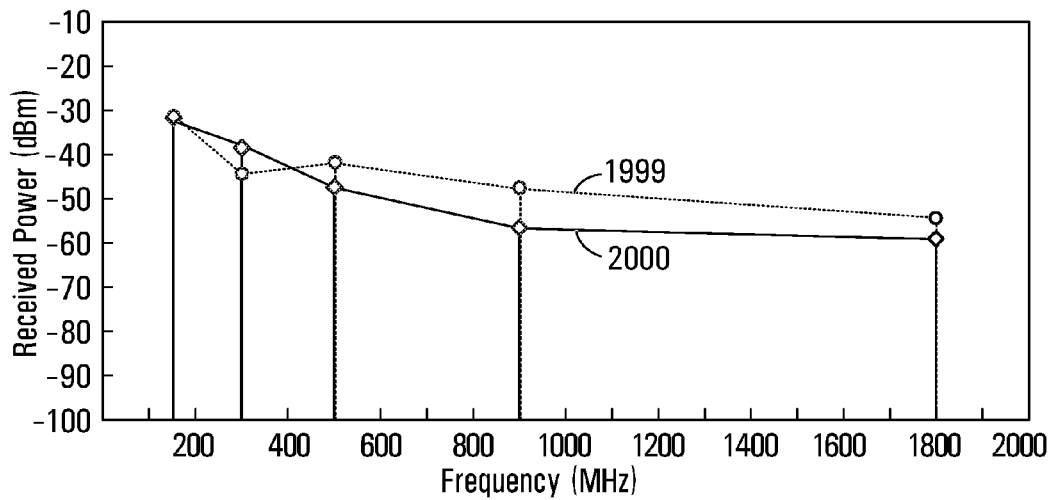
FIG. 19B is an example plot of two sequences of calculated power levels as functions of pilot signal frequency for two receive antenna heights in accordance with an embodiment of the present invention.

FIGS. 19A and 19B depict similar plots for variations in receiver antenna height. In FIG. 19A, received powers 1994, 1995, 1996, 1997 and 1998 are plotted as a function of receiver antenna height for pilot signal frequencies of 150 MHz, 300 MHz, 500 MHz, 900 MHz and 1800 MHz, respectively. The received powers 1999 and 2000 for two values of receiver antenna height corresponding to 2.2 m and 1.7 m as a function of pilot signal frequency are plotted in FIG. 18B. Because the curves 1999 and 2000 are distinct, they represent distinct observation sets for the two cases of receiver antenna height.

If the admissible values of receiver height are suitably constrained in the scenario model according to a specific implementation of the device, then as described above for variation of transmitter-receiver range in FIG. 17A and FIG. 17B and transmitter height in FIG. 18A and FIG. 18B, the observations are unique and distinct with respect to receiver antenna height.

In FIGS. 17B, 18B and 19B, the graphs of received power vs. pilot signal frequency are equally graphs of power vs. time as the single pilot frequency is scanned from, for example, low frequency to high. The variation of the centre frequency of a single pilot signal is represented graphically in FIGS. 20A to 20D for the three cases illustrated in FIGS. 17A, 17B, 18A, 18B, 19A and 19B, which, results in a distinct pattern of received pilot signal power level vs. frequency/time. As noted above for FIGS. 17B, 18B and 19B, if the admissible values of the respective scenario parameters are suitably constrained in the scenario model according to a specific implementation of the device, then the graphs of power vs. time are unique and distinct and so uniquely determine scenario parameters.

Figure 20A:
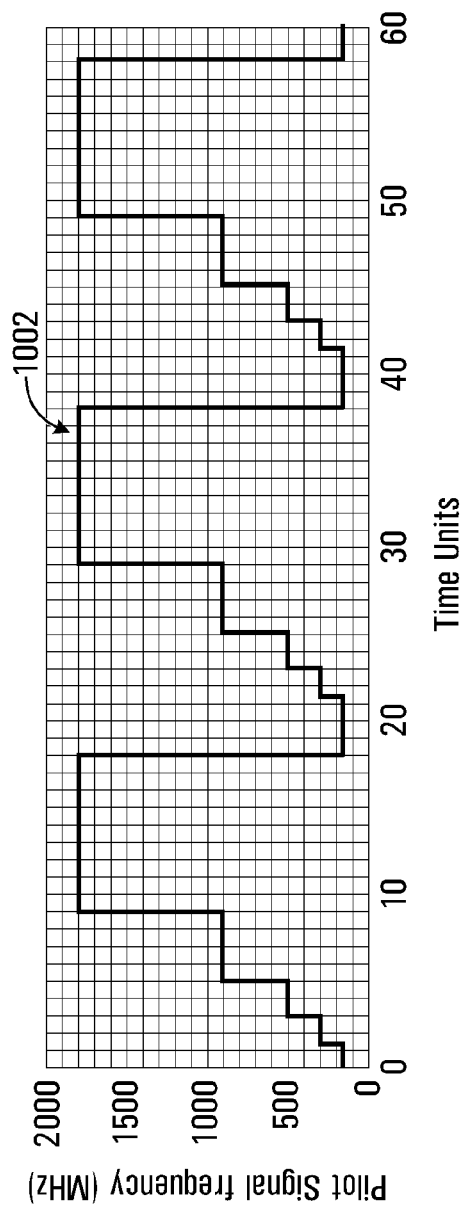
FIG. 20A is an example plot of frequency variation of a single pilot signal as a function of time in accordance with an embodiment of the present invention.
Figure 20B:
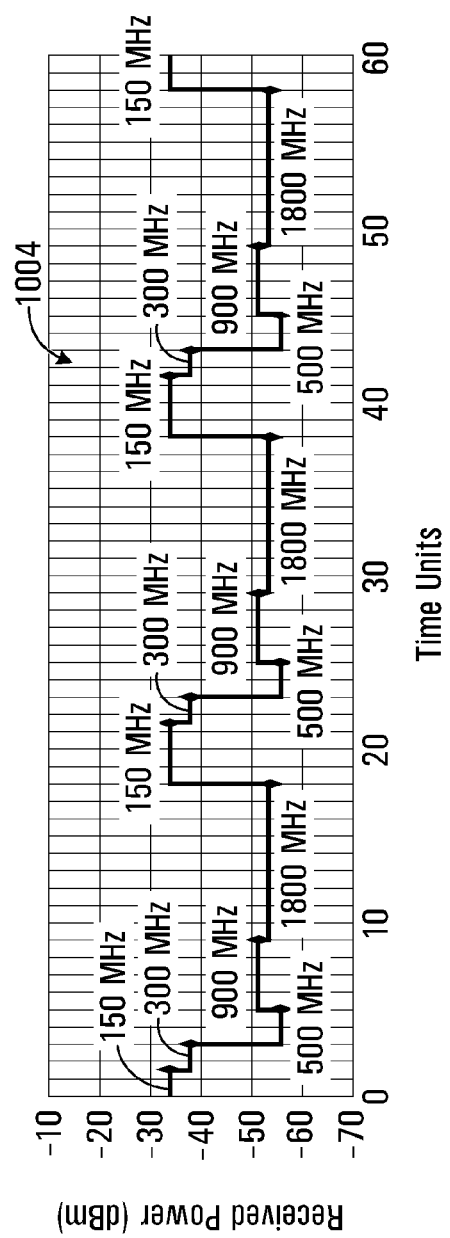
FIG. 20B is an example plot of measured power of a single frequency agile pilot signal as a function of time for the varied pilot signal frequency shown in FIG. 20A and the following conditions: Range: 9 m; Transmitter antenna height: 1.7 m; and Receiver antenna height: 1.7 m.

FIG. 20A illustrates the step-wise variation of pilot signal frequency 1002 as a function of time through the five pilot signal frequencies: 150 MHz, 300 MHz, 500 MHz, 900 MHz and 1800 MHz. FIG. 20B shows the received pilot signal power 1004 as a function of time as predicted for the following specific scenario model parameters:
 (i) transmitter-receiver range=9 m;
 (ii) transmitter antenna height=1.7 m; and
 (iii) receiver antenna height=1.7 m.

The received pilot signal power curve 1004 illustrated in FIG. 20B corresponds to the received pilot signal power curve 1785 illustrated in FIG. 17B.

FIG. 20C shows the received pilot signal power 1006 as a function of time as predicted for the following specific scenario model parameters:
 (i) transmitter-receiver range=9 m;
 (ii) transmitter antenna height=2.2 m; and
 (iii) receiver antenna height=1.7 m.
The received pilot signal power curve 1006 illustrated in FIG. 20C corresponds to the received pilot signal power curve 992 illustrated in FIG. 18B.

FIG. 20D shows the received pilot signal power 1008 as a function of time as predicted for the following specific scenario model parameters:
 (i) transmitter-receiver range=9 m;
 (ii) transmitter antenna height=1.7 m; and
 (iii) receiver antenna height=1.9 m.

Referring to the graphs presented in FIGS. 20A, 20B, 20C and 20D, because the time axis is common to the graphs in all four figures, each time value in FIGS. 20B-20D corresponds to a single value of pilot signal frequency and pilot signal power, i.e. each time value in FIGS. 20B-20D defines an ordered pair of power and frequency. These samples can be used to drive Genetic or Evolutionary Algorithms to determine optimal parameters for the propagation model, in the manner already described, i.e. the ordered pairs are predictions which may be matched to real-world observations by finding a set of scenario model parameters that results in predicted power levels that substantially match measured power levels. The predicted power levels at all frequencies are thereby matched to the measured pilot signal power levels by a set of propagation model parameters.

A sensing device in accordance with an embodiment of the present invention will now be described with reference to FIGS. 6, 7 and 14.

Figure 6:
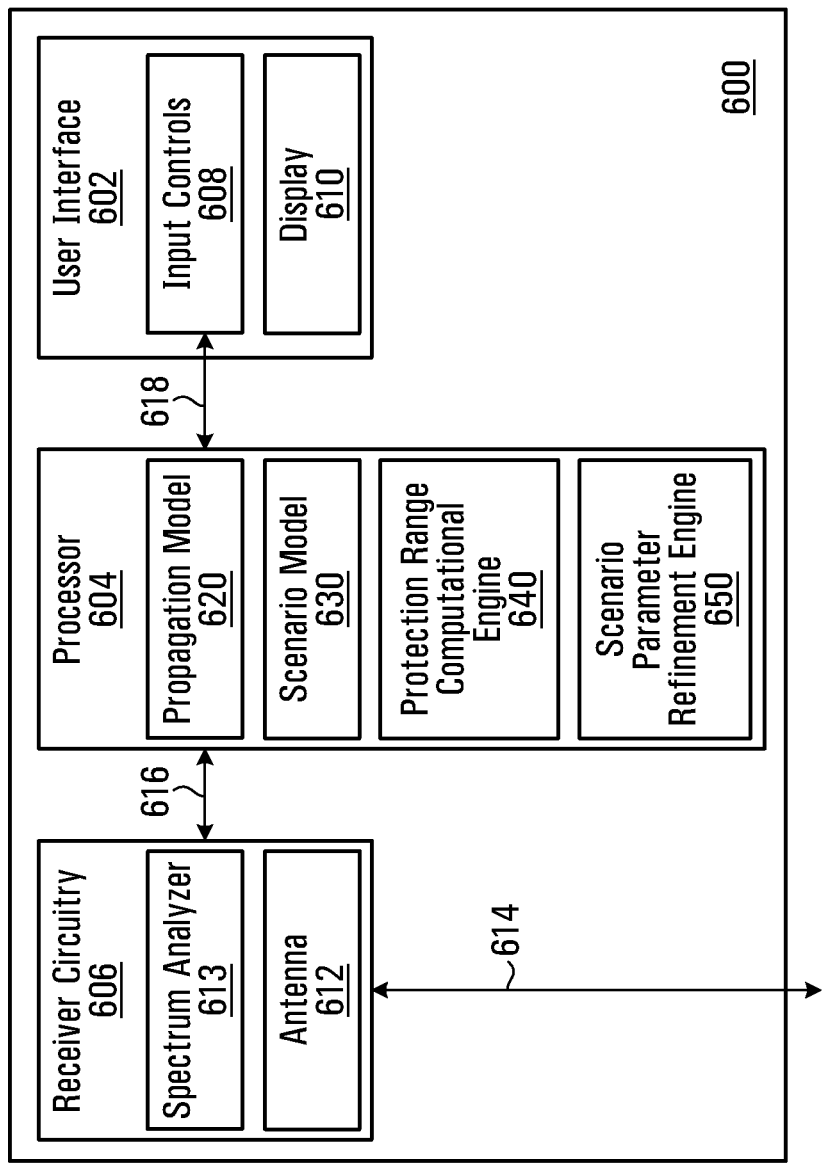
FIG. 6 is a block diagram of an example of a sensing device in accordance with an embodiment of the present invention.

FIG. 6 is a block diagram of a sensing device 600 in accordance with an embodiment of the present invention. The sensing device 600 includes a user interface 602, a processor 604 and receiver circuitry 606. In some embodiments the processor includes a propagation model 620, a scenario model 630, a protection range computational engine (PRCE) 640, and a scenario parameter refinement engine (SPRE) 650.

Elements 620, 630, 640 and 650 may be included in sensing devices designed to implement, for example, the method 500B illustrated in FIGS. 5B and 5BB, but should not be construed as limiting, as many possible implementations and functional organizations are contemplated and possible for the sensing device 600.

The user interface 602 includes input controls 608 and a display 610. The receiver circuitry 606 includes an antenna 612 and a device 613 able to measure the power in the radio frequency spectrum (for example a spectrum analyzer). The sensing device 600 has a communication port 614 that is connected to the receiver circuitry. The processor 604 is functionally connected to the receiver circuitry 606 and the user interface 602 via data paths 616 and 618, respectively.

In operation, the scenario model may be initialized by (i) user entered data via the input controls 608 of the user interface 602, and/or initialization values may be recovered from a previously created data file and/or the values may be hard-coded. The model parameters are passed to the processor 604 via the data path 618 and the processor 604 calculates a predicted ECM system spectrum at a first location using the propagation and scenario model.

The antenna 612 receives at least one pilot signal generated by an ECM system on the communication port 614 and the spectrum analyzer 613 determines the signal power of the at least one pilot signal and passes the signal power value to the processor 604 via the data path 616.

The processor 604 uses the measured pilot signal power to estimate the best scenario parameter set to predict power at the antenna 612, and re-computes the predicted power at the antenna 612. The processor 604 compares the predicted and measured ECM system spectra to determine a correction value.

Using the correction value, the processor 604 calculates a predicted ECM system spectrum at a second location remote from the first location, and predicts probabilistic effectiveness of the ECM system to prevent triggering of a potential threat device at the second location based on the characteristics of the potential threat device, such as the predicted response of the potential threat device to the predicted ECM system spectrum at the second location.

The probabilistic effectiveness of the ECM system may be passed to the user interface 602 and displayed on the display 610, such that the user is provided with an indication of the area of protection established by the ECM system.

As described herein, the initial scenario model may be heuristically refined continuously in time to more closely match the predicted ECM system spectrum to the actual measured ECM system spectrum.

In some embodiments, once the protection range of the ECM system has been determined, the device plots the protection range on the display 610 so that a user can see the range of protection relative to the ECM system transmitter, for example represented as a polar plot or as an isometric view of the engagement area. An example of such a display is shown in FIG. 14, representing a polar plot. In FIG. 14, example graphs are presented for the average 1446 and worst case 1444 protection ranges for an ECM system transmitter 1440, considering protection from a single threat system (not shown). The plot also includes a polar plot of the installed antenna pattern 1442 for the particular antenna and vehicle used with the ECM transmitter 1440. Hybrid displays are also possible, in which wire frame or rendered visualizations of the engagement area may be combined with selected data represented digitally or in analog form.

Figure 14:
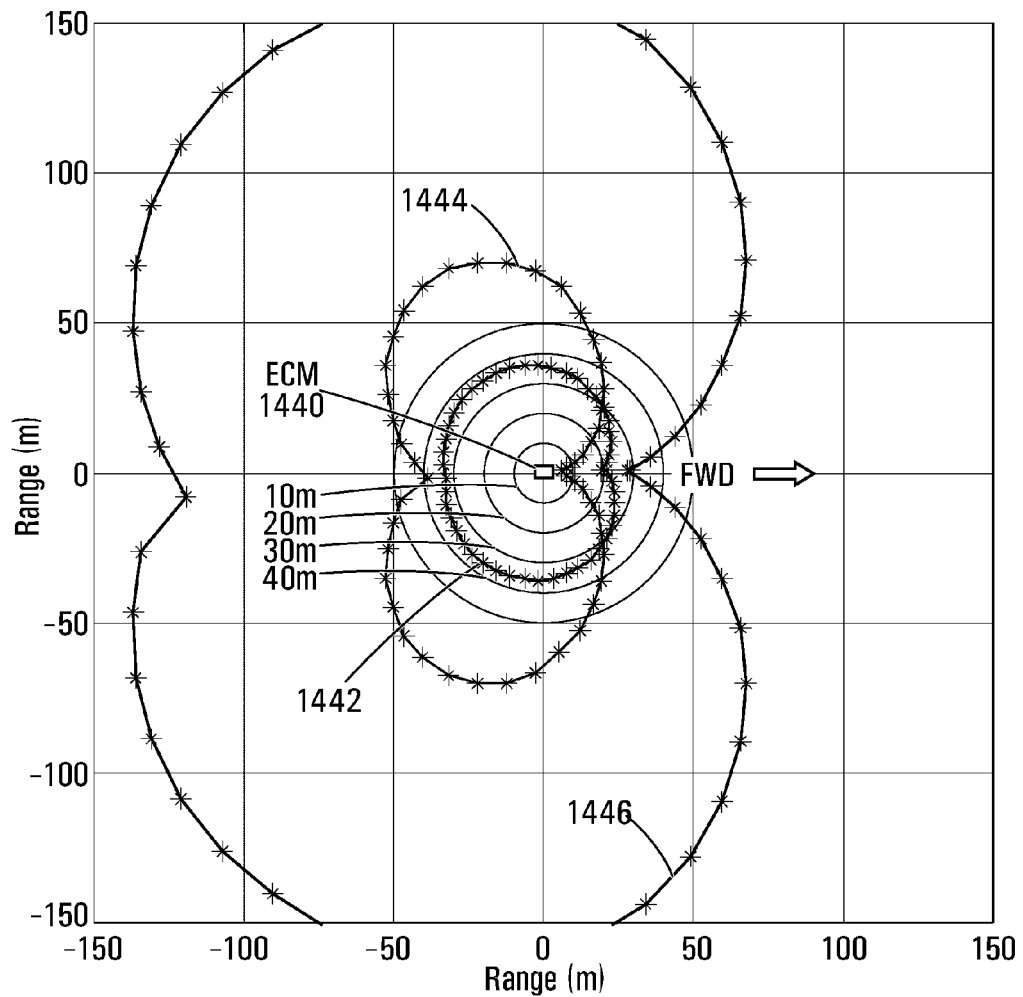
FIG. 14 is an example polar plot of (a) the estimated average and worst-case protection ranges and (b) the antenna pattern of an ECM system in accordance with an embodiment of the present invention.

In some embodiments, the display 610 may also include a marker showing the location of the sensing device 600 in relation to the ECM system transmitter 1440 in a plot such as the one shown in FIG. 14.

In some embodiments, the location of the device and of the ECM system transmitter may be determined by position-sensing systems such as a laser range finder or global positioning systems that are included as part of the device and the ECM system.

Figure 7:
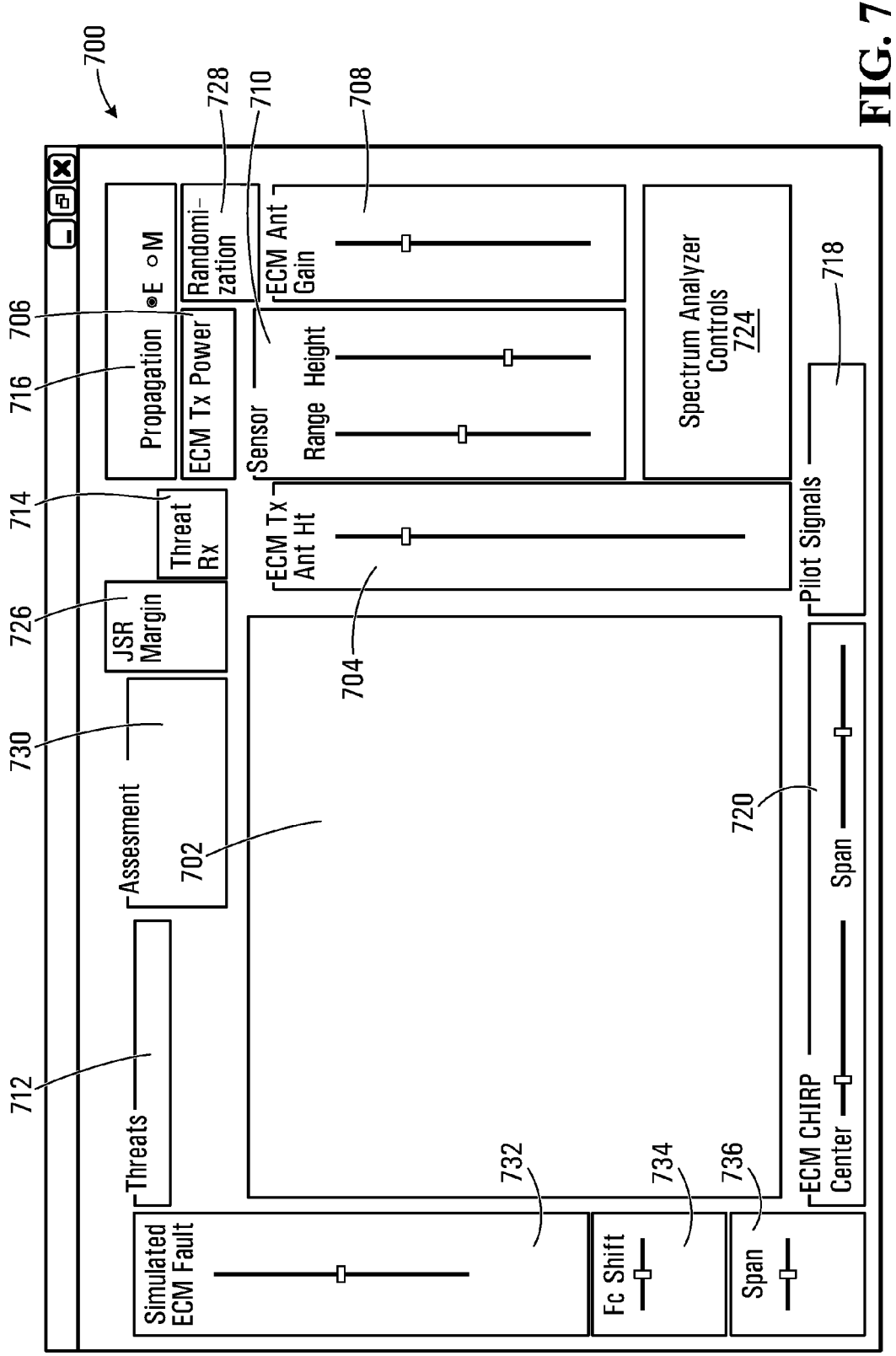
FIG. 7 is a diagram of an example of a graphic user interface in accordance with an embodiment of the present invention.

FIG. 7 shows an example of an extensive user interface 700 that may be used to implement the user interface 602 in the sensing device 600 illustrated in FIG. 6. The example presented in FIG. 7 may be more illustrative of a technician's display than a field user's display, since it provides much more information and control than may be included for some embodiments for field users.

The user interface 700 includes a display 702 and several input controls 704-736 that allow the user to adjust the threat characteristics such as electrical parameters, engagement geometry parameters, road surface type and transmitter powers. Specifically, the user input controls include a threat listing 712 that allows the user to select one or more threats to include in the scenario model, an ECM transmitter antenna height input, that allows the user to select the nominal height of the ECM transmitter antenna height, as well as the uncertainty associated with the height, sensor configuration inputs 710 that include nominal range and height settings for the sensor, as well as their associated uncertainties, and an ECM antenna gain input that allows the user to set the nominal gain of the ECM system transmit antenna and the associated uncertainty.

The nominal transmit power of the ECM system transmitter and its associated uncertainty can be set via ECM Tx Power controls 706. The number of runs over which an average is taken when determining the probabilistic effectiveness of the ECM system can be set via a randomization control 728. One of two propagation models can be selected using a propagation control 716. The display 702 can be set to display the average, worst case, or both average and worst case results for the probabilistic effectiveness of the ECM system, or can be configured to present an isometric view of the engagement area showing protection ranges and the current sensor location relative to the ECM vehicle. Spectrum analyzer controls 724 allow the user to configure the spectrum analyzer. For example, the spectrum analyzer controls 724 may include settings for the bandwidth, center frequency, reference level and dynamic range of the spectrum analyzer. Pilot signal controls 718 allow the user to select the frequency of the pilot signals that are to be measured.

The ECM system operating parameters such as center chirp frequency and span can be set using ECM chirp controls 720. The effect of an ECM system fault can be included in the propagation and scenario model using the simulated ECM fault controls 732, which allow a user to enter a fault power level, as well as a level fault margin for system diagnostic purposes. A shift in the center frequency or span of the ECM system spectrum can also be added using the Fc Shift control 734 and the Span control 736, respectively.

The probabilistic operating effectiveness of the ECM system is summarized in the Assessment display 730, which indicates the effectiveness of the ECM system at the sensor, and the safety boundary location relative to both the sensor and the ECM system transmitter, for each of the threats selected using the threats controls 712. A version of the Assessment display 730 is possibly the only display that needs to be provided to a field user. The user interface 700 also includes a jamming-to-signal ratio (JSR) display 726 that displays the JSR margin for each of the selected threats.

FIGS. 6 and 7 depict very particular embodiments of a sensing device and user interface. It should be understood that they are provided by way of example only, as many other implementations are possible, and therefore they should not be construed as limiting in any way.

While the foregoing embodiments have been described in the context of an electronic countermeasures transmission system, embodiments of the invention are equally applicable to applications involving any type of radio frequency transmitter. For example, embodiments of the present invention may be used to measure installed antenna patterns (determining transmitted signal power levels at a plurality of locations) or to characterize telecommunications channels (determining propagation model parameters using the heuristic methods described herein).

In general, embodiments of the present invention may be used in any application in order to determine the transmission characteristics of a radio frequency transmitter and/or the radio frequency transmitter's environment.

What has been described is merely illustrative of the application of the principles of the present invention. Other arrangements and methods can be implemented by those skilled in the art without departing from the spirit and scope of the present invention.

The invention claimed is:

1. A method comprising:
using an RF transmission characteristic estimation device to perform steps of:
calculating for a first location a predicted received power level of an RF signal generated by a RF system transmitter;
determining a correction value based on the predicted received power level and a measured received power level of the RF signal at the first location; and
calculating for a second location a predicted received power level of the RF signal using a correction value based on the correction value at the first location.

2. The method of claim 1, further comprising:
calculating for the first location a plurality of predicted received power levels of the RF signal generated by the RF system transmitter, inclusive of calculating the first predicted received power level for the first location, wherein each one of the plurality of predicted received power levels corresponds to a respective frequency component of the RF signal;
determining a plurality of correction values based on the plurality of predicted received power levels and a plurality of measured received power levels of the RF signal measured at the first location, inclusive of determining the first correction value based on the first predicted received power level and the first measured received power level; and
calculating a plurality of predicted received power levels for the second location using a plurality of correction values based on the correction values at the first location, inclusive of calculating the first predicted received power level for the second location using the first correction value.

3. The method of claim 1, wherein the RF signal generated by the RF system transmitter comprises an electronic countermeasures (ECM) signal.

4. The method of claim 1, further comprising:
predicting a probabilistic ability of the RF signal generated by the RF system transmitter to prevent triggering of a potential threat device at the second location based on the predicted received power level of the RF signal at the second location and potential threat device characteristics.

5. The method of claim 4, wherein the potential threat device characteristics comprise a predicted response of the potential threat device to the predicted received power level of the RF signal at the second location.

6. The method of claim 5 wherein the predicted response of the potential threat device to the predicted received power level of the RF signal comprises a predicted response of the potential threat device to a given jamming-to-signal ratio.

7. The method of claim 1, wherein determining the correction value comprises calculating the correction value according to:

$$\Delta P1 = ECM_{meas\_at\_first\_location} - ECM_{unref\_at\_first\_location}$$

where ΔP1 is the correction value, $\text{ECM}_{meas\_at\_first\_location}$ is the actual received power level of the RF signal at the first location, and $\text{ECM}_{unref\_at\_first\_location}$ is the predicted received power level of the RF signal at the first location, wherein
calculating the predicted received RF signal at the second location comprises:
calculating an unrefined predicted received power level of the RF signal at the second location; and
calculating the predicted received power level of the RF signal at the second location' according to:

$$\text{ECM}_{ref\_at\_second\_location} = \text{ECM}_{unref\_at\_second\_location} + \Delta P1$$

where $\text{ECM}_{ref\_at\_second\_location}$ is the predicted received power level of the RF signal at the second location, and $\text{ECM}_{unref\_at\_second\_location}$ is the unrefined predicted received power level of the RF signal at the second location.

8. The method of claim 1 further comprising:
generating a mismatch cost function based on a comparison of the predicted received power level of the RF signal at the first location and the measured received power level of the RF signal at the first location; and
indicating a fault/anomaly if the mismatch cost function exceeds a threshold value.

9. The method of claim 1 further comprising:
calculating a respective predicted received power level of the RF signal generated by the RF system transmitter for each location of a plurality of locations in an area using a correction value based on the correction value at the first location; and
for each location predicting probabilistic ability of the RF signal generated by the RF system transmitter to prevent triggering of a potential threat device at the location based on the respective predicted received power level of the RF signal at the location and the potential threat device characteristics.

10. The method of claim 9, wherein the potential threat device characteristics comprise a predicted response of the potential threat device to the respective predicted received power level of the RF signal for each location of the plurality of locations in the area.

11. The method of claim 10 further comprising calculating an effective range of the RF system transmitter by determining a boundary at which the probabilistic ability of the RF signal generated by the RF system transmitter to prevent triggering of the potential threat device is at a threshold.

12. The method of claim 11 further comprising displaying the protective range of the RF system transmitter.

13. The method of claim 11, wherein calculating each respective predicted received power level of the RF signal comprises:
calculating a predicted received power level of the RF signal for each location for each one of a population of N scenario parameter sets to generate N predicted received power levels for each location,
wherein for each location the probabilistic ability of the RF signal generated by the RF system transmitter to prevent triggering of the potential threat device at the location is derived from the probabilistic effect of the N predicted received power levels of the RF signal for the location.

14. The method of claim 8 wherein generating the mismatch cost function is based on best-case and/or worst-case predicted received power levels of the RF signal at the first location,
wherein the worst-case and/or best case predicted received power level of the RF signal at the first location is derived from N predicted received power levels of the RF signal at the first location calculated using a population of N scenario parameter sets, and
wherein the best-case predicted received power level of the RF signal at the first location is derived from the population of N predicted received power levels of the RF signal at the first location.

15. The method of claim 13, further comprising, for each location:
determining an average predicted received power level of the RF signal from the N predicted received power levels of the RF signal; and
determining standard deviation of the N predicted received power levels of the RF signal.

16. The method of claim 13, further comprising:
predicting a worst-case and/or best-case protection range of the RF system transmitter;
predicting a nominal protection range of the RF system transmitter; and
displaying the worst-case and/or best-case and/or predicted ranges of the RF system transmitter.

17. The method of claim 1 wherein calculating a predicted received power level of the RF signal comprises calculating a predicted received power level of the RF signal using a propagation and scenario model.

18. The method of claim 17 further comprising adapting model parameters to substantially fit the predicted received power level of the RF signal at the first location to the measured received power level of the RF signal at the first location.

19. The method of claim 18, wherein adapting the parameters of the model comprises using a heuristic method to substantially fit the predicted received power level of the RF signal at the first location to the measured received power level of the RF signal at the first location.

20. The method of claim 19, wherein the heuristic method comprises at least one of: a genetic algorithm, an evolutionary algorithm, Tabu search, simulated annealing, and a memetic algorithm.

21. The method of claim 18, wherein:
the RF signal comprises at least one pilot signal; and
the measured received power level of the RF signal comprises the measured receive power level of the at least one pilot signal transmitted by the RF system transmitter.

22. The method of claim 21, further comprising:
determining a set of scenario model parameters that, for each one of the at least one pilot signal frequencies, substantially fit the predicted received power level of the RF signal at the first location to the measured received power level of the RF signal at the first location, wherein the determination of the set of scenario model parameters is based at least in part on an adjustment of at least one of amplitude, phase, and center frequency of at least one of the at least one pilot signal.

23. The method of claim 22, wherein the adjustment of at least one of amplitude, phase, and center frequency of the at least one pilot signal is based on signalling from a device physically remote from the RF system transmitter.

24. The method of claim 18, further comprising estimating uncertainty associated with at least one parameter of the propagation and scenario model based on discrepancies between the measured received power level of the RF signal at the first location and one or more statistical properties of a population of predicted received power levels of the RF signal at the first location, wherein the statistical properties of predicted received power levels of the RF signal at the first location is derived from a population of N predicted received power levels of the RF signal at the first location calculated using N scenario parameter sets.

25. The method of claim 21, wherein only a single pilot signal is used at any moment and a center frequency of the single pilot signal is varied across a plurality of frequencies, wherein the model parameters are adapted to:
   a) substantially fit the predicted received power level of the RF signal at the first location to the measured received power level of the RF signal at the first location for each frequency of the plurality of pilot signal frequencies; and
   b) estimate uncertainty in at least one model parameter based on discrepancies between the measured received power level of the RF signal at the first location and the predicted received power level of the RF signal at the first location, where the predicted received power level of the RF signal is calculated using the adapted set of model parameters.

26. A device comprising:
   a processor configured to:
   calculate for a first location a predicted received power level of an RF signal generated by an RF system transmitter;
   determine a correction value based on the predicted received power level and a measured received power level of the RF signal at the first location; and
   calculate for a second location a predicted received power level of the RF signal using a correction value based on the correction value determined for the first location.

27. The device of claim 26, further comprising:
   receive circuitry configured to receive a signal from another device indicating the measured received power level of the RF signal at the first location.

28. The device of claim 26, wherein the RF signal comprises an electronic countermeasures (ECM) signal generated by an ECM system transmitter.

29. The device of claim 26, wherein the processor predicts probabilistic ability of the RF signal at the second location to prevent triggering of a potential threat device at the second location based on the predicted received power level of the RF signal at the second location and potential receiver characteristics.

30. The device of claim 29, wherein the potential receiver characteristics comprise a predicted response of the potential receiver to the predicted received power level of the RF signal at the second location.

31. The device of claim 30 wherein the predicted response of the potential receiver to the predicted received power level of the RF signal comprises a predicted response of the potential receiver to a given jamming-to-signal ratio.

32. The device of claim 29, further comprising a user interface having:
   a display that displays the probabilistic ability of the RF signal to prevent triggering of a potential threat device at the second location; and
   input controls that allow a user to control the display and edit parameters of a propagation and scenario model that the processor uses to calculate the predicted received power level of the RF signal.

33. The device of claim 26, wherein the processor determines a correction value according to:

$$\Delta P1 = ECM_{meas\_at\_first\_location} - ECM_{unref\_at\_first\_location})$$

where $\Delta P1$ is the correction value, $ECM_{meas\_at\_first\_location}$ is the actual received power level of the RF signal at the first location, and $ECM_{unref\_at\_first\_location}$ is the predicted received power level of the RF signal at the first location, wherein
   the processor is configured to:
   calculate an unrefined predicted received power level of the RF signal at the second location; and
   calculate the predicted received power level of the RF signal at the second location according to:

$$ECM_{ref\_at\_second\_location} = ECM_{unref\_at\_second\_location} + \Delta P1$$

where $ECM_{ref\_at\_second\_location}$ is the predicted received power level of the RF signal at the second location, and $ECM_{unref\_at\_second\_location}$ is the unrefined predicted received power level of the RF signal at the second location.

34. The device of claim 26, wherein the processor is configured to:
   generate a spectrum mismatch cost function based on a comparison of the predicted RF system spectrum at the first location and the measured RF system spectrum at the first location; and
   indicate a fault/anomaly if the mismatch cost function exceeds a threshold value.

35. The device of claim 29 wherein the processor is configured to:
   calculate a respective predicted received power level of the RF signal for each location of a plurality of locations in an area using a correction value based on the correction value determined for the first location; and
   for each location:
   predict probabilistic ability of the RF signal at the location to prevent triggering of a potential threat device at the location based on the respective predicted received power level of the RF signal at the location and the potential threat device characteristics.

36. The device of claim 35, wherein the potential threat device characteristics comprise a predicted response of the potential threat device to the respective predicted received power level of the RF signal for each location of the plurality of locations in the area.

37. The device of claim 36, wherein the processor determines an effective range threshold of the RF system by determining a boundary at which the probabilistic ability of the RF signal generated by the RF signal transmitter to prevent triggering of a potential threat device.

38. The device of claim 37, further comprising a display, wherein the display displays the effective range threshold of the RF system.

39. The device of claim 36, wherein the processor uses a propagation and scenario model to calculate the predicted received power level of the RF signal at each location.

40. The device of claim 39, wherein:
   the RF signal comprises at least one pilot signal; and
   the processor is configured to adapt parameters of the propagation and scenario model to:
   a) substantially fit the predicted received power level of the RF signal at the first location to the measured received power level of the RF signal at the first location for each of the pilot signal frequencies; and
   b) estimate uncertainty in at least one of the parameters of the model based on discrepancies between the measured received power level of the RF signal at the first location and the predicted received power level of the RF signal at the first location predicted using the adapted set of model parameters.

41. The device of claim 40, further comprising communication circuitry, wherein the device communicates, using its communication circuitry, with the RF system transmitter to adjust the at least one pilot signal generated by the RF system transmitter.

42. The device of claim 41, wherein the adjustment of the at least one pilot signal comprises adjustment of at least one of amplitude, phase, and center frequency of at least one of the at least one pilot signal, and wherein the processor is configured to adapt the parameters of the model to substantially fit the predicted received power level of the RF signal at the first location to the measured received power level of the RF signal at the first location for each of the pilot signal frequencies.

43. The device of claim 39, wherein the processor is configured to predict uncertainty associated with at least one parameter of the propagation and scenario model based on discrepancies between the predicted received power level of the RF signal at the first location and the measured received power level of the RF signal at the first location, wherein the predicted received power level of the RF signal at the first location comprises one or more statistical properties of a population of N predicted received power levels of the RF signal at the first location calculated using N sets of scenario parameters.

44. The device of claim 39, wherein the processor is further configured to:
 calculate a predicted received power level of the RF signal for each location N times using a different set of propagation and scenario parameters for each of the N times; and
 determine one or more statistical properties of the population of N predicted received power levels of the RF signal for each location, wherein the processor predicts the probabilistic ability of the RF signal to prevent triggering of a potential threat device at each location using one or more statistical properties of the population of N predicted received power levels of the RF signal at the location.

45. The device of claim 44, further comprising a display, wherein:
 the processor is configured to:
  determine a worst-case predicted received power level of the RF signal at each location from the N predicted received power levels of the RF signal at each location;
  determine a best-case predicted received power level of the RF signal at each location from the N predicted received power levels of the RF signal at each location;
  predict a worst-case and/or best-case predicted RF system effective range threshold; and
  calculates a nominal predicted RF system effective range threshold; and
 the display is configured to:
  show the nominal predicted RF system effective range threshold and/or the worst-case RF system effective range threshold, and/or the best-case RF system effective range threshold.

46. The device of claim 39 wherein the processor is configured to adapt parameters of the propagation and scenario model to substantially fit the predicted received power level of the RF signal at the first location to the measured received power level of the RF signal at the first location.

* * * * *

UNITED STATES PATENT AND TRADEMARK OFFICE
CERTIFICATE OF CORRECTION

PATENT NO. : 8,466,826 B2  Page 1 of 1
APPLICATION NO. : 13/471808
DATED : June 18, 2013
INVENTOR(S) : Shawn Charland It is certified that error appears in the above-identified patent and that said Letters Patent is hereby corrected as shown below:

In the claims

Column 39, claim 7, line 11, "...location' according to: ..." should be --...location according to: ...--.

Signed and Sealed this
Twenty-sixth Day of August, 2014

Michelle K. Lee
*Deputy Director of the United States Patent and Trademark Office*